United States Patent
Lawal et al.

(10) Patent No.: US 12,275,654 B1
(45) Date of Patent: Apr. 15, 2025

(54) SUSTAINABLE BRINE TREATMENT SYSTEM AND PROCESS

(71) Applicant: KING FAHD UNIVERSITY OF PETROLEUM AND MINERALS, Dhahran (SA)

(72) Inventors: Dahiru Umar Lawal, Dhahran (SA); Osman Mohamed Osman Shamet, Dhahran (SA); Mohamed Abdelkarim Antar, Dhahran (SA); Suhaib Mustafa Alawad Ahmed, Dhahran (SA); Isam Hassan Aljundi, Dhahran (SA); Syed Mohammad Zubair Zubair, Dhahran (SA); Sani Isah Abba, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/798,410

(22) Filed: Aug. 8, 2024

(51) Int. Cl.
*C02F 1/14* (2023.01)
*C02F 1/04* (2023.01)
(Continued)

(52) U.S. Cl.
CPC ................ *C02F 1/14* (2013.01); *C02F 1/048* (2013.01); *C02F 1/52* (2013.01); *C02F 2001/5218* (2013.01); *C02F 2101/10* (2013.01)

(58) Field of Classification Search
CPC .... C02F 1/048; C02F 1/14; C02F 1/52; C02F 2101/10
See application file for complete search history.

(56) References Cited

U.S. PATENT DOCUMENTS

| | | | | |
|---|---|---|---|---|
| 8,496,234 | B1 * | 7/2013 | Govindan | ............ B01D 5/0051 |
| | | | | 261/157 |
| 8,647,477 | B2 * | 2/2014 | Govindan | ................ B01D 1/16 |
| | | | | 95/204 |

(Continued)

FOREIGN PATENT DOCUMENTS

| | | |
|---|---|---|
| CN | 116813007 A | 9/2023 |
| WO | WO 2016/187601 A2 | 11/2016 |

OTHER PUBLICATIONS

Chen, Q. et al., "A zero liquid discharge system integrating multi-effect distillation and evaporative crystallization for desalination brine treatment", Desalination, vol. 502, 2021, total 12 pages.

*Primary Examiner* — Jonathan Miller
(74) *Attorney, Agent, or Firm* — Oblon, McClelland, Maier & Neustadt, L.L.P.

(57) ABSTRACT

A zero liquid brine desalination and crystallization system includes a humidification dehumidification (HDH) desalination system and includes a crystallization system. The HDH system includes a humidifier configured to humidify a carrier gas using saline water, and a dehumidifier configured to dehumidify the carrier gas to obtain desalinated water. The crystallization system is configured to receive the saline water from the HDH desalination system and includes an evaporation chamber configured to produce salt crystals and water vapor from the saline water, and a condenser configured to condense the water vapor. Herein, the HDH desalination system and the crystallization system are connected at the condenser for heat exchange between the water vapor and at least one selected from the group consisting of the saline water and the carrier gas.

20 Claims, 38 Drawing Sheets

(51) Int. Cl.
*C02F 1/52* (2023.01)
*C02F 101/10* (2006.01)

(56) References Cited

U.S. PATENT DOCUMENTS

| | | | | |
|---|---|---|---|---|
| 8,727,325 | B2* | 5/2014 | Sparrow | B01D 5/003 261/157 |
| 8,820,723 | B1* | 9/2014 | Sparrow | B01D 5/003 261/36.1 |
| 8,857,798 | B1* | 10/2014 | Sparrow | B01D 5/0039 261/106 |
| 9,643,102 | B2* | 5/2017 | Al-Sulaiman | B01D 1/26 |
| 9,834,454 | B2* | 12/2017 | Frolov | B01D 3/007 |
| 10,143,935 | B2* | 12/2018 | Govindan | B01D 1/14 |
| 10,207,935 | B2* | 2/2019 | Beitelmal | B01D 1/0035 |
| 10,294,123 | B2* | 5/2019 | Lam | B01F 23/23123 |
| 10,513,445 | B2* | 12/2019 | Govindan | B01D 5/006 |
| 10,829,913 | B1* | 11/2020 | Ahmed | B01D 61/025 |
| 10,981,082 | B2* | 4/2021 | Govindan | C02F 1/04 |
| 11,142,468 | B2* | 10/2021 | Qasem | B01D 5/0051 |
| 11,365,894 | B2* | 6/2022 | Qasem | F24F 3/1417 |
| 11,761,644 | B1* | 9/2023 | Qasem | F24F 3/1411 62/92 |
| 2014/0197022 | A1* | 7/2014 | Antar | C02F 1/14 202/174 |
| 2015/0353377 | A1* | 12/2015 | Al-Sulaiman | C02F 1/043 261/114.2 |
| 2016/0339357 | A1* | 11/2016 | Govindan | C02F 1/10 |
| 2018/0155210 | A1 | 6/2018 | Frolov et al. | |
| 2019/0084842 | A1* | 3/2019 | St. John | C02F 1/10 |
| 2021/0107807 | A1* | 4/2021 | Qasem | C02F 1/16 |
| 2021/0254844 | A1* | 8/2021 | Qasem | F24F 3/1417 |

* cited by examiner

SUSTAINABLE BRINE TREATMENT SYSTEM AND PROCESS

STATEMENT REGARDING PRIOR DISCLOSURE BY THE INVENTORS

Aspects of the present disclosure were published in O. Shamet, et. al, "Multi-stage humidification-dehumidification system integrated with a crystallizer for zero liquid discharge of desalination brine," Energy Conversion and Management, Volume 307, (2024), 118340.

BACKGROUND

Technical Field

The present disclosure is directed to systems and methods for desalination and crystallization, specifically to a zero liquid brine desalination and crystallization system that integrates humidification dehumidification (HDH) desalination with a crystallization process to achieve zero liquid discharge (ZLD).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Desalination systems have been widely implemented to address the global challenge of freshwater scarcity. Various methods, including reverse osmosis, multi-stage flash distillation, and electrodialysis, have been developed to convert saline water into potable water. These technologies are widely used in regions where freshwater resources are limited, to enable the production of large quantities of desalinated water to meet industrial, agricultural, and domestic needs. However, a significant problem associated with conventional desalination methods is the generation of brine as a byproduct. Brine is a concentrated saline solution that poses environmental challenges when discharged into the ocean or other water bodies. The high salinity of brine leads to increased salinity levels, which can adversely affect marine ecosystems and harm aquatic life. Furthermore, the disposal of brine incurs additional costs and regulatory hurdles for desalination plants.

To mitigate the environmental impact of brine discharge, zero liquid discharge (ZLD) technology has been developed. ZLD systems aim to eliminate liquid waste by recovering all water and converting the remaining brine into solid salts. Conventional ZLD solutions include thermal evaporation, crystallization, and membrane-based processes. These methods aim to improving water recovery while reducing the volume of residual waste. Despite the advancements in ZLD technologies, conventional solutions face several limitations. Thermal evaporation and crystallization processes are energy-intensive and require substantial capital investment for infrastructure and maintenance. Membrane-based systems, such as reverse osmosis, are prone to fouling and scaling, which reduces their efficiency and increases operational costs. Additionally, these systems often require extensive pre-treatment of the saline feed water to prevent damage to the membranes.

Lu et al. [See: Lu K J, Cheng Z L, Chang J, Luo L, Chung T S. Design of zero liquid discharge desalination (ZLDD) systems consisting of freeze desalination, membrane distillation, and crystallization powered by green energies. *Desalination* 2019; 458:66-75] proposed a theoretical model for a zero-liquid discharge desalination system integrating membrane distillation-crystallization and freeze desalination. The objective was to achieve zero waste generation, high water recovery, and valuable salt production to mitigate global water scarcity. The study explored the feasibility of employing green energy sources to power hybrid systems. Results indicated that, with optimized conditions for a lab-scale setup, a significant portion of the heating energy could be supplied by solar panels, while cooling energy could be derived from liquefied natural gas re-gasification. However, the system faces certain drawbacks, including reliance on lab-scale data, which raises concerns about scalability and practical implementation on a larger scale. Additionally, its dependence on LNG for cooling energy introduces potential limitations regarding availability and environmental concerns, underscoring the need to investigate alternative green cooling methods.

Chen et al. [See: Chen Q, Burhan M, Shahzad M W, Ybyraiymkul D, Akhtar F H, Li Y, et al. A zero liquid discharge system integrating multi-effect distillation and evaporative crystallization for desalination brine treatment. *Desalination* 2021; 502:114928, incorporated herein by reference in its entirety] introduced a zero-liquid discharge system, including evaporative crystallization and multi-effect distillation, designed for treating concentrated brine with a salinity of 70 g/L. Initially, they conducted a thermodynamic analysis of the hybrid system, which revealed the specific heat transfer area, specific heat consumption, and second-law efficiency within ranges of 110-340 $m^2/(L/s)$, 600-1100 kJ/kg, and 10-17%, respectively. The study confirmed the effectiveness of reducing heat consumption by increasing the number of evaporators in the multi-effect distillation system, while noting a significant decrease in the specific heat transfer area with higher heat source temperatures. Following the thermodynamic analysis, a techno-economic assessment was performed, yielding a specific cost of 4.17$/$m^3$. Strategies for cost reduction, such as reducing heat consumption, utilizing cost-effective heat sources, and system scaling, were investigated. The authors concluded that the proposed ZLD system demonstrated greater competitiveness compared to existing brine treatment methods, particularly through the sale of freshwater and salt crystals.

Lv et al. [See: Lv Y, Wu S, Liao J, Qiu Y, Dong J, Liu C, et al. An integrated adsorption- and membrane-based system for high-salinity aniline wastewater treatment with zero liquid discharge. *Desalination* 2022; 527:115537] introduced a zero-liquid discharge system incorporating bipolar membrane electrodialysis, macroporous resin adsorption and desorption, and electrodialysis. The study focused on investigating the resin adsorption capacity and desorption solution concentration, along with parameters such as the volume ratio, power supply, and membrane type in BMED/ED systems. Additionally, a techno-economic analysis was conducted, alongside calculation of water recovery rate, demonstrating the promising potential of the process for industrial applications. Results showed that a 4% NaOH solution was optimal for eluting the resin, achieving a desorption rate of approximately 98%. Acid/base concentrations in the BMED system reached up to 1.25 mol/L and 0.85 mol/L, respectively. The ED process resulted in a final NaOH concentration of about 0.14 mol/L, with a 93.3%

COD rejection rate. Production costs for the BMED and ED processes were $0.79/kg and $0.21/kg, respectively, while water recovery rates stood at 96% and 83%, respectively.

Panagopoulos [See: Panagopoulos A. Energetic, economic and environmental assessment of zero liquid discharge (ZLD) brackish water and seawater desalination systems. *Energy Convers Manag* 2021; 2355:113957] conducted an assessment encompassing economic, energetic, and environmental aspects of a zero-liquid discharge system including reverse osmosis, brine crystallizer, and brine concentrator. Two scenarios were examined: a brackish water ZLD system and a seawater ZLD system, both aimed at generating mixed solid salt and marketable freshwater. The study revealed that energy consumption in the former scenario was 2.38 times lower than in the latter due to significantly lower feed salinity. This disparity in energy efficiency was reflected in associated costs, with the seawater scenario being 1.24 times costlier. Both scenarios proved to be three times more cost-effective than evaporation pond disposal, placing them in a comparable cost range with deep-well injection and land application. Profits ranged from $215.05 to $302.55 daily, regardless of whether only freshwater or both mixed solid salt and freshwater were sold.

In another study, Panagopoulos [See: Panagopoulos A. Process simulation and techno-economic assessment of a zero liquid discharge/multi-effect desalination/thermal vapor compression (ZLD/MED/TVC) system. *Int J Energy Res* 2020; 44:473-95]proposed a multi-effect distillation with thermal vapor compression for treating concentrated brine solutions exceeding 70,000 mg/L. A theoretical model was developed for a techno-economic analysis of a 10 $m^3$ per day MED-TVC unit in two configurations: a two-effect MED-TVC system and a four-effect MED-TVC system. The four-effect system operating at 120° C. feed temperature exhibited a minimum production cost of $3/$m^3$ and a payback time of 3.04 years, whereas the two-effect system at the same feed temperature had a minimum production cost of $1.69/$m^3$ and a shorter payback time of 1.71 years.

In yet another study, Panagopoulos [See: Panagopoulos A. Techno-economic assessment of zero liquid discharge (ZLD) systems for sustainable treatment, minimization and valorization of seawater brine. *J Environ Manage* 2022; 306:114488, incorporated herein by reference in its entirety] conducted a techno-economic analysis of ZLD desalination system, comparing wind-aided intensified evaporation and brine crystallizer methods. BCr achieved higher water recovery (approximately 99%) compared to WAIV (85.75%). Energy and cost requirements for BCr were 22.15 kWh/m3 and US$100.5 per day, respectively, while WAIV consumed 15.34 kWh/m3 with 85.3 $/day. Schwantes et al. [See: Schwantes R, Chavan K, Winter D, Felsmann C, Pfafferott J. Techno-economic comparison of membrane distillation and MVC in a zero liquid discharge application. *Desalination* 2018; 428:50-68] presented a techno-economic analysis of vacuum air gap membrane distillation and air gap membrane distillation for zero-liquid discharge process, comparing costs with mechanical vapor compression. Membrane distillation was 40% more cost-effective than MVC, rising to approximately 75% if powered by waste heat. For 100 $m^3$/day capacity, specific costs ranged between 9 and 9.8 €/$m^3$ for membrane distillation, compared to 24 €/$m^3$ for MVC.

In the landscape of zero-liquid discharge systems, focus has primarily been on membrane-based desalination processes such as reverse osmosis, forward osmosis, and electrodialysis, as well as thermal-based desalination systems like multi-effect distillation. However, addressing highly concentrated brine streams presents challenges such as membrane fouling and scaling in membrane-based systems, and scaling issues in MED. These challenges can reduce efficiency and increase operational costs of ZLD system.

WO2016187601A2 describes a desalination method where a salt-containing water stream encounters cold air bubbles, so heat and mass (e.g. water vapor) are transferred from the salt-containing water stream to the air bubbles, resulting in a cooled, concentrated salt-containing water stream that then flows to a precipitation apparatus. This method, while effective in brine concentration, primarily focuses on the initial cooling and bubble interaction without addressing a ZLD approach integrating both humidification and crystallization systems.

US20190084842A1 describes a humidification dehumidification (HDH) desalination system including a bubble column humidifier, a bubble column dehumidifier and a crystallization tank. While this configuration achieves basic desalination and crystallization, it lacks the integrated and enhanced heat exchange mechanisms between the HDH system and the crystallizer for optimizing energy use and improving overall system efficiency.

Chen et al. ("A zero liquid discharge system integrating multi-effect distillation and evaporative crystallization for desalination brine treatment") study and review multi-effect distillation combined with freeze crystallization such as an air gap membrane distillation module coupled with an evaporative crystallizer and direct contact membrane distillation coupled with a salinity gradient solar pond. While this research explores various ZLD configurations, it does not specifically address the integration of HDH with crystallization in a unified system.

Each of the aforementioned references suffers from one or more drawbacks hindering their adoption. Accordingly, it is one object of the present disclosure to provide a system offering integrated approach by combining HDH desalination with a crystallization process. Such integration improves energy efficiency and ensures complete brine treatment and resource recovery, therefore addressing the limitations of the existing technologies.

SUMMARY

In an exemplary embodiment, a zero liquid brine desalination and crystallization system is described. The zero liquid brine desalination and crystallization system includes a humidification dehumidification (HDH) desalination system including a humidifier configured to humidify a carrier gas using saline water, and a dehumidifier configured to dehumidify the carrier gas to obtain desalinated water. The zero liquid brine desalination and crystallization system also includes a crystallization system configured to receive the saline water from the HDH desalination system and including an evaporation chamber configured to produce salt crystals and water vapor from the saline water, and a condenser configured to condense the water vapor. Herein, the HDH desalination system and the crystallization system are connected at the condenser for heat exchange between the water vapor and at least one selected from the group consisting of the saline water and the carrier gas.

In some embodiments, the evaporation chamber includes a top structure including a solar-absorbing material and a bottom structure including a parabolic reflector.

In some embodiments, the condenser includes a heat exchanger for heat exchange between the water vapor and the carrier gas exiting from the humidifier.

In some embodiments, the condenser includes a heat exchanger for heat exchange between the water vapor and the saline water exiting from the dehumidifier.

In some embodiments, the HDH desalination system includes a U-shaped structure. The U-shaped structure includes the humidifier, a first connection portion and the dehumidifier serially connected.

In some embodiments, the HDH desalination system further includes a second connection portion between the humidifier and the dehumidifier so that the humidifier, the first connection portion. The dehumidifier and the second connection portion are configured to define a closed path cycle for the carrier gas.

In some embodiments, the crystallization system further includes a separator configured to separate the salt crystals from the saline water.

In some embodiments, the HDH desalination system further includes a fan. The dehumidifier, the fan and the humidifier are configured to define a closed path cycle for the carrier gas.

In some embodiments, the humidifier includes a spray tower humidifier, a bubble column humidifier, a wetted-wall tower humidifier or a packed bed tower humidifier.

In some embodiments, the dehumidifier includes a bubble column dehumidifier. The bubble column dehumidifier includes a sparger configured to receive and sparge a humidified carrier gas into a column of desalinated water above the sparger. The bubble column dehumidifier further includes a tube going in and out of the bubble column dehumidifier and including a coil portion that is configured to be in contact with the column of desalinated water, while in operation, for heat exchange between the saline water in the tube and the column of desalinated water.

In some embodiments, the humidifier includes a multi-stage humidifier. Further, the dehumidifier includes a multi-stage dehumidifier.

In some embodiments, the zero liquid brine desalination and crystallization system includes a plurality of the HDH desalination systems connected in series. Also, the plurality of the HDH desalination systems and the crystallization system are connected at the condenser for heat exchange so that the condenser is configured to provide heat for the plurality of the HDH desalination systems.

In some embodiments, the HDH desalination system further includes a heater to heat the saline water, the carrier gas or both.

In another exemplary embodiment, a zero liquid brine desalination and crystallization system is described. The zero liquid brine desalination and crystallization system includes a humidification dehumidification (HDH) desalination system including a humidifier configured to humidify a carrier gas using saline water. The zero liquid brine desalination and crystallization system also includes a crystallization system configured to receive the saline water from the HDH desalination system and including an evaporation chamber configured to produce salt crystals and water vapor from the saline water. The zero liquid brine desalination and crystallization system further includes a dehumidifying condenser. The dehumidifying condenser is configured to receive the carrier gas from the humidifier and the water vapor from the evaporation chamber to obtain desalinated water.

In some embodiments, the zero liquid brine desalination and crystallization system further includes a mixing chamber configured to receive the carrier gas from the humidifier and the water vapor from the evaporation chamber to form a gas mixture and discharge the gas mixture to the dehumidifying condenser.

In some embodiments, the dehumidifying condenser includes a bubble column dehumidifier. The bubble column dehumidifier includes a sparger configured to receive and sparge the gas mixture into a column of desalinated water above the sparger. The bubble column dehumidifier also includes a tube going in and out of the bubble column dehumidifier and including a coil portion that is configured to be in contact with the column of desalinated water, while in operation, for heat exchange between the saline water in the tube and the column of desalinated water.

In some embodiments, the evaporation chamber includes a top structure including a solar-absorbing material and a bottom structure including a parabolic reflector.

In some embodiments, the crystallization system further includes a separator configured to separate the salt crystals from the saline water.

In some embodiments, the HDH desalination system further includes a fan. The dehumidifying condenser, the fan and the humidifier are configured to define a closed path cycle for the carrier gas.

In some embodiments, the humidifier includes a spray tower humidifier, a bubble column humidifier, a wetted-wall tower humidifier or a packed bed tower humidifier.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
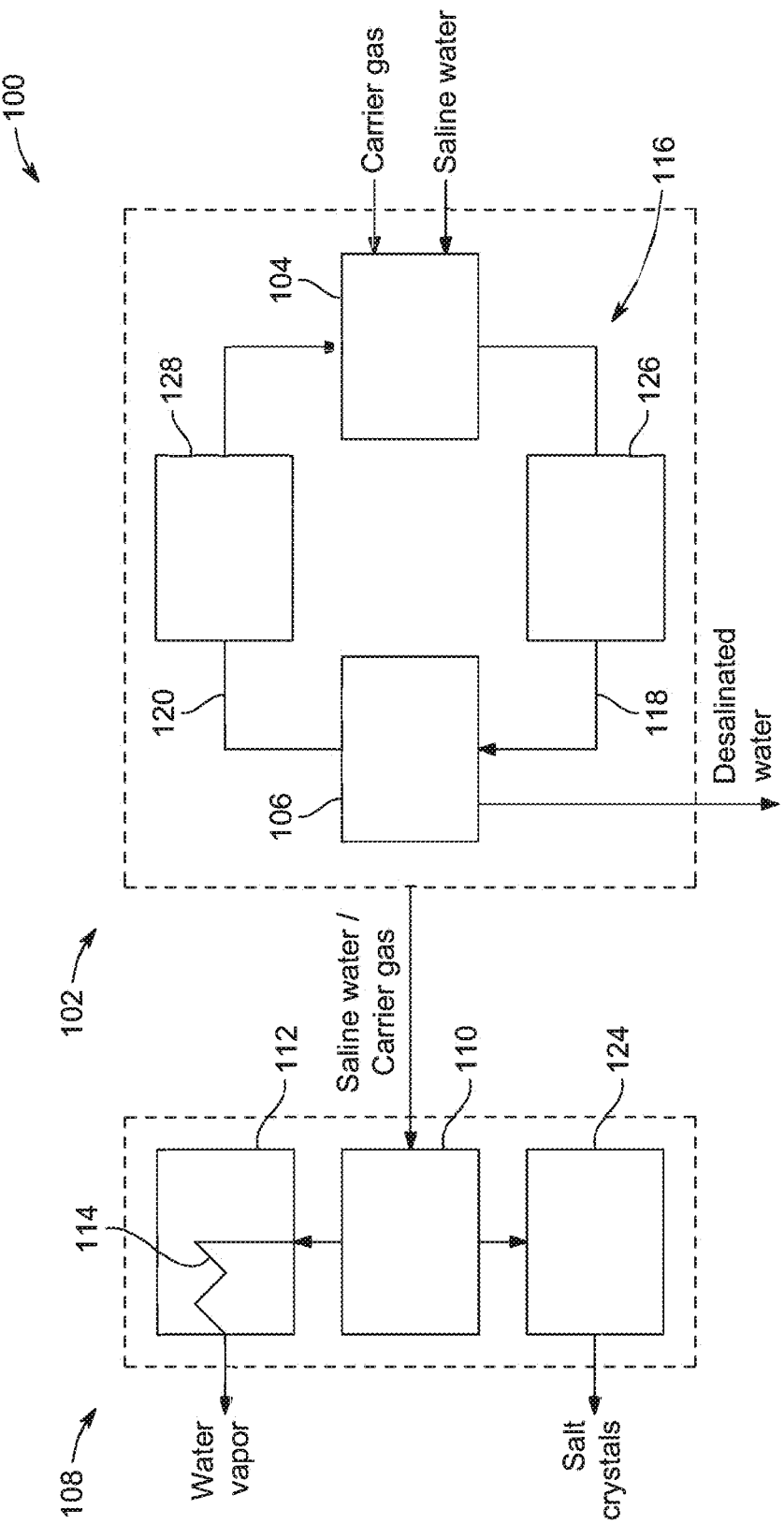
FIG. 1 is a schematic diagram of a zero liquid brine desalination and crystallization system including a humidification dehumidification (HDH) desalination system and a crystallization system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a zero liquid brine desalination and crystallization system, also referred to as zero liquid discharge (ZLD) system, which includes a humidification dehumidification (HDH) system and a crystallizer (Cz) system. The HDH and Cz systems may independently be configured in single-stage or multi-stage set-ups. Both systems can be connected to heat sources for heating the HDH brine stream and the Cz brine stream. The Cz system can include an evaporation chamber for salt precipitation and vapor production, an external condenser for condensing vapor, and a separator for separating salt crystals from the brine slurry. An external heater may be present to increase the brine temperature entering the evaporation chamber, and this heater may be connected to a heat source. The external heater, external condenser, additional heat exchanger(s), additional humidifier(s), and both HDH and Cz systems include pumps for moving the brine and other streams within the system. The additional humidifier (s) in the HDH desalination system may include blowers for moving the air/carrier gas. The present disclosure can be employed for freshwater production, brine concentration, and salt crystal production, in addition to mitigating environmental hazards through zero discharge of brine to the environment.

Referring to FIG. 1, illustrated is a schematic of a zero liquid brine desalination and crystallization system (as represented by reference numeral 100). The zero liquid brine desalination and crystallization system 100 (hereinafter, sometimes, simply referred to as "system 100" without any limitations) is designed to address the challenge of managing saline water and brine byproducts from desalination processes. The zero liquid brine desalination and crystallization system 100 integrates a humidification dehumidification (HDH) desalination process with a crystallization process to achieve zero liquid discharge (ZLD), ensuring that no liquid waste is released into the environment. The zero liquid brine desalination and crystallization system 100 effectively converts saline water into desalinated water and solid salt crystals, thus providing an efficient and a sustainable solution for water scarcity and brine disposal issues.

As illustrated, the zero liquid brine desalination and crystallization system 100 includes a humidification dehumidification (HDH) desalination system 102. The HDH desalination system 102 is designed to convert saline water into desalinated water through a humidification and dehumidification process. The HDH desalination system 102 includes a humidifier 104 and a dehumidifier 106. The humidifier 104 is configured to humidify a carrier gas using saline water. In one embodiment, the saline water is heated to produce water vapor, which is then absorbed by the carrier gas, such as air. In another embodiment, the saline water is heated to below its boiling point without producing significant water vapor. The carrier gas enters the humidifier 104 and comes into contact with the heated saline water. This contact results in the transfer of water mass from the saline water to the carrier gas, therefore increasing the humidity level of the carrier gas as it exits the humidifier 104.

The humidified carrier gas, now loaded with water vapor, is directed towards the next stage of the HDH desalination system 102. The dehumidifier 106 is configured to dehumidify the carrier gas to obtain desalinated water. As the humidified carrier gas enters the dehumidifier 106, it undergoes a cooling process that causes the water vapor to condense. The condensed water vapor forms liquid water, which is collected as desalinated water. The carrier gas, now dehumidified, exits the dehumidifier 106 and can be recirculated back into the humidifier 104 to continue the cycle. This efficient cycle of humidification and dehumidification within the HDH desalination system 102 ensures a continuous production of desalinated water from saline water.

The zero liquid brine desalination and crystallization system 100 further includes a crystallization system 108. The crystallization system 108 is configured to receive the saline water from the humidifier of 104 the HDH desalination system 102. The crystallization system 108 converts the saline water into salt crystals and additional water vapor, thus achieving zero liquid discharge. For this purpose, the crystallization system 108 includes an evaporation chamber 110. The saline water, which is directed from the HDH desalination system 102, enters the evaporation chamber 110. In the evaporation chamber 110, the saline water is subjected to further heating, which causes it to evaporate, producing water vapor. As the water vapor forms, the concentration of salts in the remaining brine increases, leading to the precipitation of salt crystals when cooled down. The evaporation chamber 110 is thus responsible for both generating water vapor and precipitating salt crystals from the saline water. Additionally, the crystallization system 108 includes a condenser 112. The condenser 112 is configured to condense the water vapor produced in the evaporation chamber 110. The water vapor exits the evaporation chamber 110 and enters the condenser 112, where it is cooled and condensed into liquid water. This condensation process recovers additional desalinated water from the vapor phase, enhancing the overall efficiency of the zero liquid brine desalination and crystallization system 100.

In some embodiments, the HDH desalination system 102 is configured as a U-shaped structure. The U-shaped structure 116 includes the humidifier 104, a first connection portion 118 and the dehumidifier 106 serially connected. The humidifier 104, positioned at one end of the U-shaped structure, humidifies the carrier gas using saline water. The humidified carrier gas then flows through the first connection portion 118, which is in the form of a conduit that directs the carrier gas towards the dehumidifier 106, positioned at the other end of the U-shaped structure. The dehumidifier 106 then dehumidifies the carrier gas, producing desalinated water. Further, the HDH desalination system 102 includes a second connection portion 120 between the humidifier 104 and the dehumidifier 106. The second connection portion 120, along with the humidifier 104, the first connection portion 118, and the dehumidifier 106, are configured to define a closed path cycle for the carrier gas. In such closed path cycle, the carrier gas, after being dehumidified in the dehumidifier 106, is directed back to the humidifier 104 through the second connection portion 120. This recirculation of the carrier gas within the closed path cycle ensures a continuous and efficient desalination process.

Further, as illustrated, the crystallization system 108 includes a separator 124. The separator 124 is configured to separate the salt crystals from the remaining saline water formed in the evaporation chamber 110. As the saline water, now concentrated with salt crystals due to the evaporation process, enters the separator 124, the separator 124 employs a separation process to isolate the salt crystals from the remaining liquid. This separation process ensures the recovery of salt crystals as a byproduct of the desalination and crystallization process. The separator 124 may employ various separation mechanisms, such as filtration, centrifugation, or settling, depending on the specific characteristics of the salt crystals and the saline water. For instance, the separator 124 may utilize a filtration mechanism, in which the separator 124 includes a filter medium, such as a mesh or a membrane, with pore sizes designed to retain the salt crystals while allowing the liquid to pass through. As the saline water flows through the filter medium, the salt crystals are trapped, forming a filter cake, while the liquid, now with a reduced salt concentration, exits the separator 124.

The HDH desalination system 102 includes a fan 126. The fan 126 helps in maintaining the continuous circulation of the carrier gas within the HDH desalination system 102. The fan 126, the dehumidifier 106, and the humidifier 104 are configured to define a closed path cycle for the carrier gas. In this closed path cycle, the fan 126 actively draws the humidified carrier gas from the humidifier 104 and propels it towards the dehumidifier 106. This circulation ensures a continuous supply of humidified carrier gas to the dehumidifier 106, facilitating the dehumidification process and maintaining the efficiency of the desalination cycle. Although, in the illustrated examples, the fan 126 is positioned after the humidifier 104, on the first connection portion 118; it may be appreciated that, in other examples, the fan 126 may be positioned on the second connection portion 120, without departing from the spirit and the scope of the present disclosure. The primary function of the fan 126 is to provide the necessary motive force for the carrier gas to complete the closed path cycle, ensuring a continuous and efficient desalination process.

Additionally, while the carrier gas and the saline water are shown to directly enter the humidifier 104 in the example of FIG. 1, the HDH desalination system 102 can further include a heater 128 to heat the saline water, the carrier gas, or both before the saline water, the carrier gas, or both enter the humidifier 104. The heater 128 provides thermal energy to initiate and sustain the humidification and dehumidification processes. The heater 128 can be positioned within the HDH desalination system 102. For instance, as illustrated, the heater 128 may be placed before the humidifier 104 to preheat the saline water, thereby improving the humidification rate when the saline water comes into contact with the carrier gas in the humidifier 104. Alternatively, the heater 128 can be positioned to preheat the carrier gas before it enters the humidifier 104. In some configurations, the heater 128 can be utilized to heat both the saline water and the carrier gas, thereby improving the efficiency of the humidification process.

Figure 2:
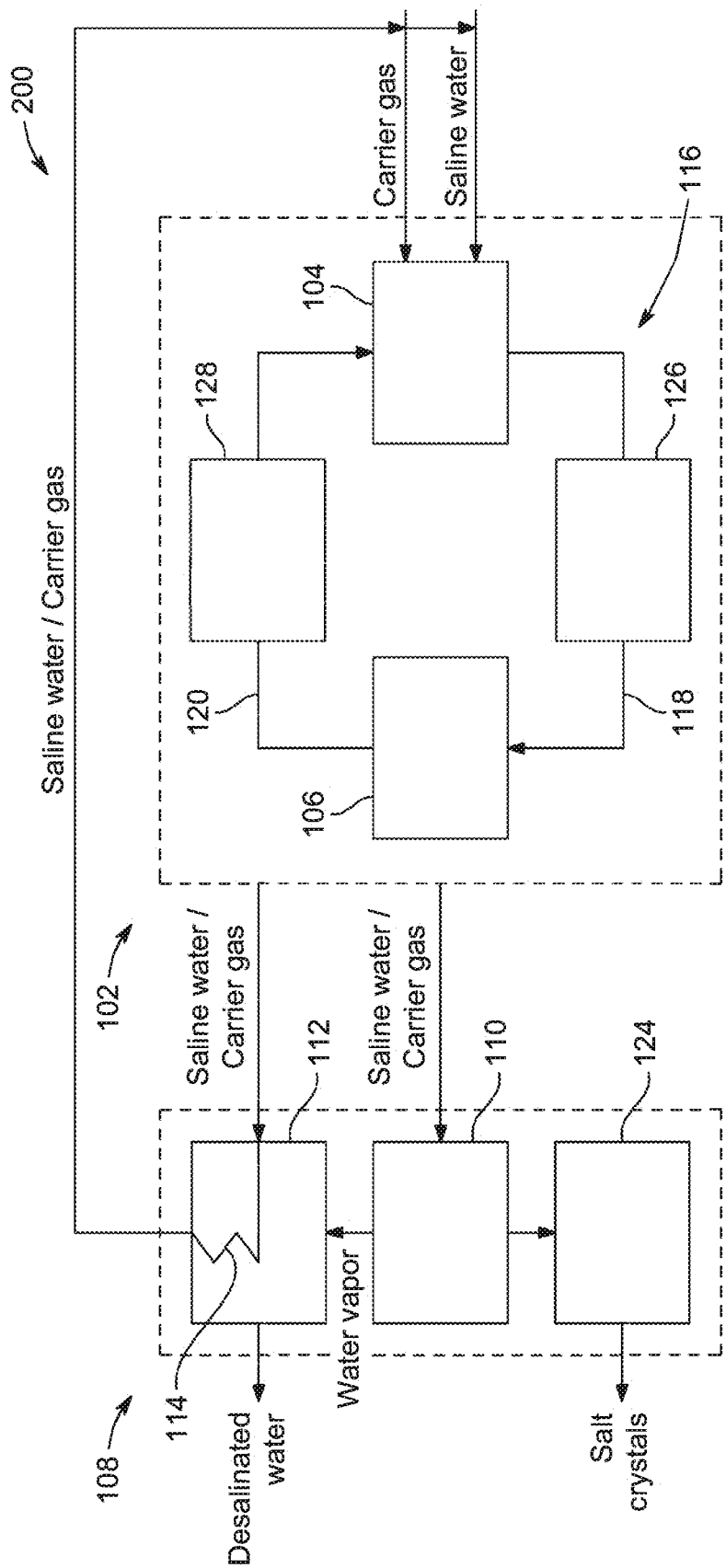
FIG. 2 is a schematic diagram of the zero liquid brine desalination and crystallization system with the HDH desalination system and the crystallization system connected at the condenser, according to certain embodiments.

The present disclosure provides a configuration of the zero liquid brine desalination and crystallization system (as illustrated in FIG. 2, and represented by reference numeral 200), in which the HDH desalination system 102 and the crystallization system 108 are connected at the condenser 112 for heat exchange between the water vapor and at least one selected from the group consisting of the saline water and the carrier gas. Within the HDH desalination system 102, the carrier gas is humidified by the humidifier 104 using the saline water, resulting in a humidified carrier gas that contains water vapor. This humidified carrier gas is then directed to the dehumidifier 106, where the water vapor is condensed to produce desalinated water. The remaining saline water from this process is sent to the crystallization system 108. In the crystallization system 108, the saline water enters the evaporation chamber 110, where it is further heated to produce additional water vapor and salt crystals. The produced water vapor is then directed to the condenser 112.

Herein, the condenser 112 also facilitates heat exchange between the water vapor and at least one selected from the group consisting of the saline water and the carrier gas. For this purpose, as the water vapor exits the evaporation chamber 110, it enters the condenser 112. Within the condenser 112, the water vapor undergoes a cooling process that causes it to condense into liquid water. The condenser 112 is configured to transfer the heat from the condensing water vapor to the saline water and/or the carrier gas, which are (is) then cycled back into the humidifier 104 and/or the dehumidifier 106, enhancing the overall energy efficiency of the zero liquid brine desalination and crystallization system 200.

In the present embodiment, the condenser 112 includes a heat exchanger 114 (also shown in FIG. 1). The heat exchanger 114 is configured to facilitate heat transfer from the water vapor exiting from the evaporation chamber 110 to the carrier gas before the carrier gas enters the humidifier 104. The water vapor exiting the evaporation chamber 110, while containing latent heat, is at a higher temperature than the carrier gas. Additionally and/or alternatively, the heat exchanger 114 is configured to facilitate heat transfer from the water vapor exiting from the evaporation chamber 110 to the saline water before the saline water enters the humidifier 104. The water vapor exiting the evaporation chamber 110, while containing latent heat, is at a higher temperature than the saline water. This configuration allows for efficient utilization of heat energy within the zero liquid brine desalination and crystallization system 200. Specifically, this heat exchange mechanism provided by the heat exchanger 114 eliminates the need of a separate cooling source for the condenser 112 and a separate heating source for the carrier gas and/or the saline water.

Figure 3:
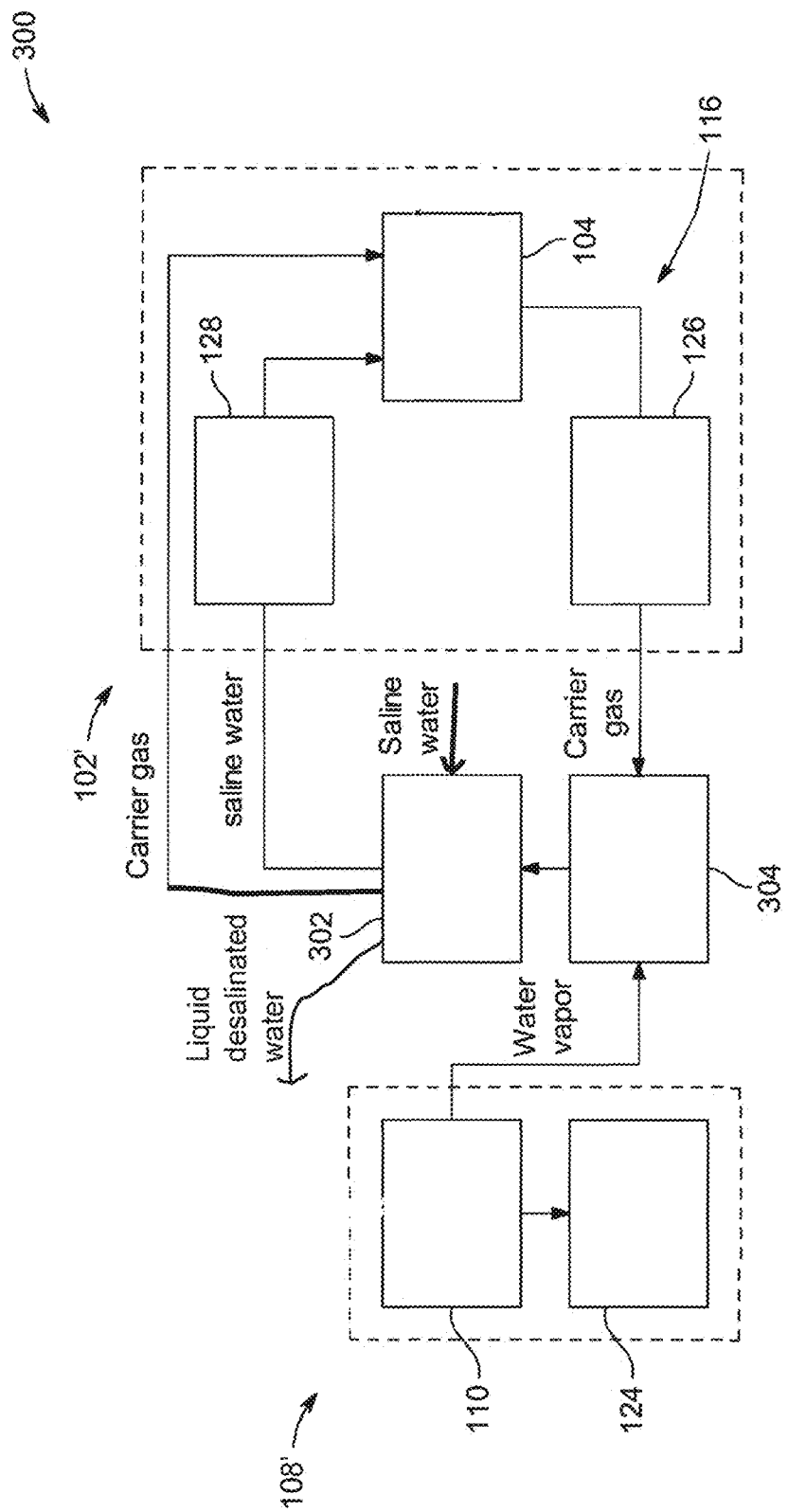
FIG. 3 is a schematic diagram of a zero liquid brine desalination and crystallization system including the HDH desalination system, the crystallization system and a dehumidifying condenser, according to certain embodiments.

The present disclosure further provides an alternate configuration in the form of a zero liquid brine desalination and crystallization system 300, as illustrated in FIG. 3. Similar to the zero liquid brine desalination and crystallization systems 100 and 200, the zero liquid brine desalination and crystallization system 300 includes a humidification dehumidification (HDH) desalination system 102' and a crystallization system 108'. The HDH desalination system 102' includes the humidifier 104 configured to humidify carrier gas using saline water. The HDH desalination system 102' also includes the fan 126, which helps in maintaining the continuous circulation of the carrier gas within the HDH desalination system 102'. Additionally, the HDH desalination system 102 may optionally include a heater 128 to heat the saline water, the carrier gas, or both. The crystallization system 108' includes the evaporation chamber 110 configured to produce water vapor from the saline water received from the HDH desalination system 102'. The crystallization system 108' also includes the separator 124. The separator 124 is configured to separate the salt crystals from the remaining saline water formed in the evaporation chamber 110.

Instead of having both the dehumidifier 106 and the condenser 112, the zero liquid brine desalination and crystallization system 300 includes a dehumidifying condenser 302. The dehumidifying condenser 302 is configured to receive the humidified carrier gas from the humidifier 104 and the water vapor from the evaporation chamber 110, for instance via a mixing chamber 304. The mixing chamber 304 is positioned to receive the humidified carrier gas from the humidifier 104 and the water vapor from the evaporation chamber 110. Within the mixing chamber 304, these two streams (i.e. the humidified carrier gas and the water vapor) are combined to form a gas mixture. The mixing chamber 304 is designed to ensure efficient mixing of the carrier gas and water vapor, promoting uniform distribution of the water vapor within the carrier gas. The resulting gas mixture is then discharged from the mixing chamber 304 and directed towards the dehumidifying condenser 302 for further processing.

Meanwhile, the saline water, before entering the humidifier 104, can be passed through the dehumidifying condenser 302 for pre-heating purposes. That is, within the dehumidifying condenser 302, heat is transferred from the gas mixture from the mixing chamber 304 to the saline water. As a result, the saline water is pre-heated while water vapor of the gas mixture undergoes a cooling process and condenses into liquid desalinated water. This heat exchange process improves the energy usage within the zero liquid brine desalination and crystallization system 300, making it more efficient. The dehumidifying condenser 302 also eliminates the need for both the dehumidifier 106 and the condenser 112. In some embodiments, the heater 128 may not be necessary since the saline water is already pre-heated by the dehumidifying condenser 302. In this configuration, the HDH desalination system 102' and the crystallization system 108' are integrated via the dehumidifying condenser 302 and thus provides another method for desalination and crystallization.

In the present embodiments of the zero liquid brine desalination and crystallization system 100, 200 or 300, the humidifier 104 can include a spray tower humidifier, a bubble column humidifier, a wetted-wall tower humidifier or a packed bed tower humidifier. In one example, the humidifier 104 is implemented as the spray tower humidifier. A spray tower humidifier utilizes nozzles or sprayers to disperse saline water into fine droplets within a tower-like structure. The carrier gas flows through the tower in a counter-current or co-current direction, coming into contact with the saline water droplets, which facilitates the transfer of water mass from the saline water droplets to the carrier gas, resulting in humidification. In another example, the humidifier 104 is implemented as the bubble column humidifier. A bubble column humidifier introduces the carrier gas at the bottom of a column filled with saline water. The carrier gas rises through the saline water in the form of bubbles, creating a large interfacial area for mass transfer. As the bubbles ascend, water vapor from the saline water is absorbed into the carrier gas, resulting in humidification. In yet another example, the humidifier 104 is implemented as the wetted-wall tower humidifier. A wetted-wall tower humidifier includes a vertical column with saline water flowing down its inner walls. The carrier gas flows upward through the column and comes into contact with the thin film of saline water on the walls, which enables the transfer of water vapor from the saline water film to the carrier gas, resulting in humidification. In still another example, the humidifier 104 is implemented as the packed bed tower humidifier. A packed bed tower humidifier includes a column filled with packing materials. Saline water is distributed over the packing materials, creating a large surface area for mass transfer. The carrier gas flows through the column and comes into contact with the wetted packing materials, which facilitates the transfer of water vapor from the saline water to the carrier gas, resulting in humidification.

Figure 4:
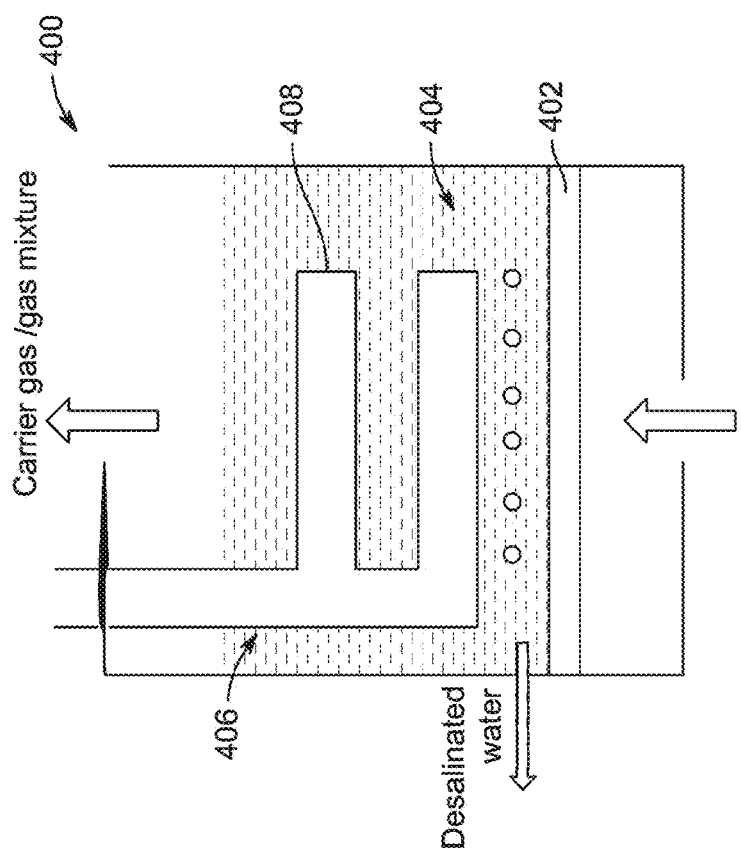
FIG. 4 is a schematic diagram of a bubble column dehumidifier implemented in the zero liquid brine desalination and crystallization system, according to certain embodiments.

In an embodiment of the zero liquid brine desalination and crystallization system 100 or 200, the dehumidifier 106 of the HDH desalination system 102 includes a bubble column dehumidifier (as shown in FIG. 4, and represented by reference numeral 400). The bubble column dehumidifier 400 includes a sparger 402 configured to receive the humidified carrier gas from the humidifier 104 (not shown in FIG. 4). The sparger 402 then disperses this humidified carrier gas into a column of desalinated water 404 located above the sparger 402. This dispersion takes the form of bubbles, creating a large interfacial area between the carrier gas and the desalinated water, facilitating efficient heat and mass transfer. The bubble column dehumidifier 400 further includes a tube 406 that enters and exits the column of desalinated water 404. This tube 406 contains a coil portion 408 that is submerged within the column of desalinated water 404 during operation. The coil portion 408 acts as a heat exchanger, facilitating heat exchange between the saline water flowing through the tube 406 and the desalinated water in the column of desalinated water 404. This heat exchange process pre-heats the saline water and cools the desalinated water, which causes the water vapor within the humidified carrier gas bubbles to condense. The condensed water vapor is collected as additional desalinated water, while the dehumidified carrier gas exits the bubble column dehumidifier 400.

In an embodiment of the zero liquid brine desalination and crystallization system 300, the dehumidifying condenser 302 of the HDH desalination system 102' includes the bubble column dehumidifier 400. The tube 406 is configured to receive the saline water for pre-heating purposes before the saline water enters the humidifier 104. The sparger 402 is configured to receive the gas mixture from the mixing chamber 304 and disperse the gas mixture into the column of desalinated water 404 located above the sparger 402 in the form of bubbles. As a result, heat exchange occurs between the saline water flowing through the tube 406 and the column of desalinated water 404. This heat exchange process pre-heats the saline water and cools the column of desalinated water 404, which causes water vapor within the bubbles of the gas mixture to condense. The condensed water vapor is collected as additional desalinated water, while the gas mixture exits the bubble column dehumidifier 400.

Figure 5:
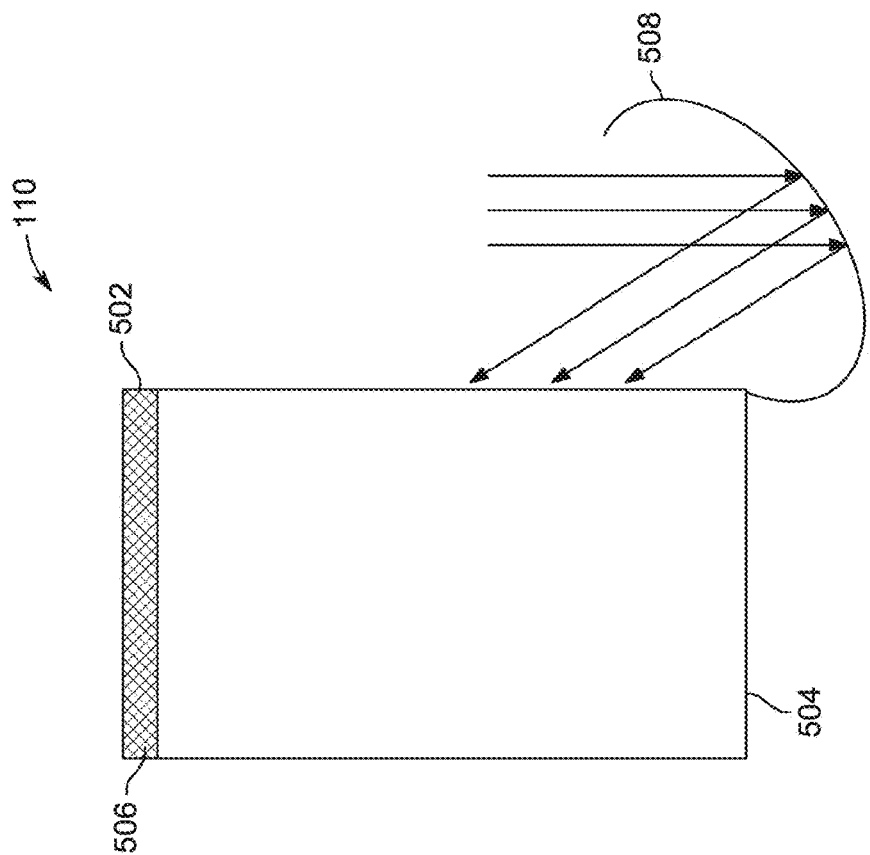
FIG. 5 is a schematic diagram of an evaporator implemented in the zero liquid brine desalination and crystallization system, according to certain embodiments.

Further, in an embodiment, as illustrated in FIG. 5, the evaporation chamber 110 of the crystallization system 108 includes components to produce salt crystals and water vapor from the saline water. As illustrated in FIG. 5, the evaporation chamber 110 includes a top structure 502 and a bottom structure 504. The top structure 502 includes a solar-absorbing material 506, such as a dark-colored coating or a specialized solar absorber, including but not limited to brick stones coated with black paint, coal and carbon nanotube arrays. The solar-absorbing material 506 is adapted to capture and convert solar radiation into heat energy. This heat energy is then transferred to the saline water within the evaporation chamber 110, raising its temperature and promoting the evaporation process. The bottom structure 504 of the evaporation chamber 110 includes a parabolic reflector 508. The parabolic reflector 508 is a curved reflective surface designed to concentrate solar radiation onto a focal point. In this configuration, the parabolic reflector 508 collects solar radiation from a wider area and reflects it towards the saline water, further intensifying the heat energy and accelerating the evaporation process. This combination of the solar-absorbing material 506 in the top structure 502 and the parabolic reflector 508 in the bottom structure 504 utilizes solar energy for evaporation, enhancing the overall efficiency and sustainability of the zero liquid brine desalination and crystallization system 100, 200 or 300.

Furthermore, in an exemplary configuration of the zero liquid brine desalination and crystallization system 100, 200 or 300, the humidifier 104 includes a multi-stage humidifier. The multi-stage humidifier 104 is designed to enhance the efficiency of the humidification process by incorporating multiple stages through which the carrier gas passes. Each stage of the multi-stage humidifier 104 is configured to progressively increase the humidity level of the carrier gas. Additionally or alternatively, the 106 includes a multi-stage dehumidifier 106 that is designed to enhance the dehumidification process by incorporating multiple stages through which the humidified carrier gas passes. Each stage of the multi-stage dehumidifier 106 is configured to progressively condense the water vapor from the carrier gas, producing desalinated water at each stage.

For present purposes, the multi-stage humidifier 104 includes several interconnected sections, each equipped with nozzles or sprayers to disperse the saline water into fine droplets. The carrier gas flows through these sections in either a counter-current or co-current direction relative to the saline water droplets. As the carrier gas moves through each stage, it absorbs additional water vapor from the saline water droplets, resulting in a highly humidified carrier gas by the time it exits the final stage of the humidifier 104. Also, the multi-stage dehumidifier 106 includes several interconnected sections, each equipped with mechanisms to lower the temperature of the carrier gas. As the humidified carrier gas flows through each stage, the decreasing temperature causes the water vapor to condense, forming liquid water. This condensed water is collected as desalinated water at each stage of the dehumidifier 106. The carrier gas, now progressively dehumidified, exits the final stage of the dehumidifier 106 with at least a portion of or all of its water vapor removed.

The integration of multi-stage humidifiers and dehumidifiers within the zero liquid brine desalination and crystallization system 100, 200 or 300 enhances the efficiency of the overall desalination process. The use of multi-stage components system 100, 200 or 300 also contributes to the energy efficiency and sustainability of the zero liquid brine desalination and crystallization system 100, 200 or 300. This configuration supports the goal of achieving zero liquid discharge of the present disclosure by efficiently converting saline water into freshwater and solid salt crystals.

Furthermore, in some embodiments, the zero liquid brine desalination and crystallization system 100, 200 or 300 includes a plurality of HDH desalination systems 102 connected in series. Each HDH desalination system 102 (or 102') operates to obtain fresh water from the saline water. The saline water becomes increasingly concentrated as it passes through each successive HDH desalination system 102. The crystallization system 104 (or 104') is configured to receive the concentrated brine from the final HDH desalination system 102 in the series. The crystallization system 108 processes the concentrated brine to produce crystals and a liquid brine discharge.

In some embodiments, the plurality of the HDH desalination systems 102 and the crystallization system 108 are connected at the condenser 112 for heat exchange so that the condenser 112 is configured to provide heat for the plurality of the HDH desalination systems 102. This heat exchange configuration enables energy utilization within the zero liquid brine desalination and crystallization system 100, 200 or 300.

Figure 6:
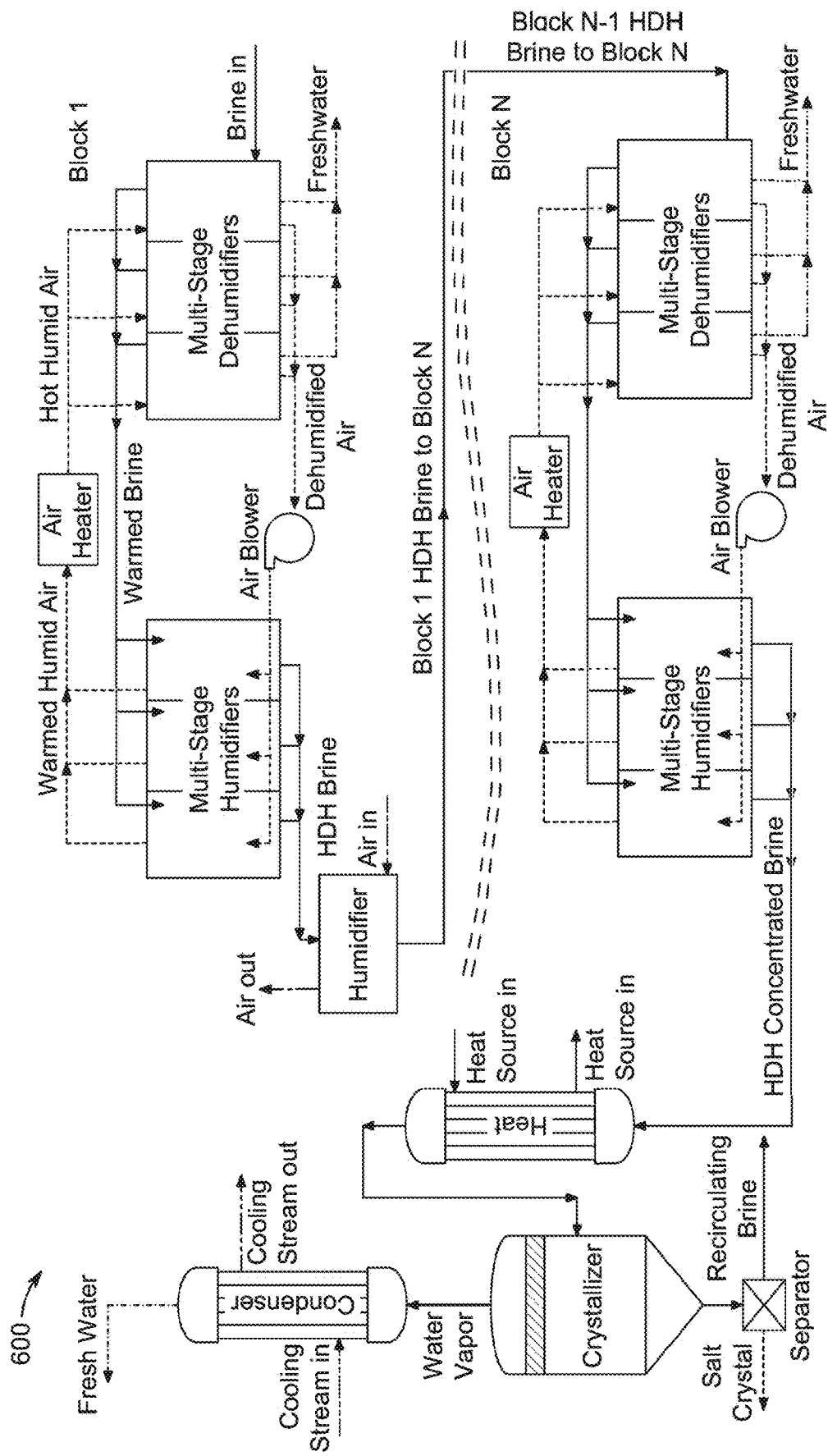
FIG. 6 is a schematic diagram of the zero liquid brine desalination and crystallization system implementing a closed-air, air-heated, parallel flow multi-stage HDH process with a single-stage crystallizer and humidifier inter-block (CA-AH-P-HM), according to certain embodiments.

Referring now to FIG. 6, illustrated is a schematic diagram of a zero liquid brine desalination and crystallization system (as represented by reference numeral 600, and hereinafter referred to as "system 600") implementing a closed-air, air-heated, parallel flow multi-stage HDH process with a single-stage crystallizer and humidifier inter-block (CA-AH-P-HM), according to certain embodiments. The system 600 includes a HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 600, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers.

Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. In some embodiments, the cooling stream can include the saline water (or brine) before the saline water (brine) enters the dehumidifiers. Also, a separator is utilized to separate salt crystals and the resultant concentrated brine is mixed with the concentrated brine from the HDH desalination system.

The system 600 also includes a humidifier disposed at each inter-block and utilized to decrease the brine temperature between blocks. The integration of the multi-stage humidifiers and dehumidifiers within the closed-air circuit ensures a continuous and efficient desalination process. The use of air heaters enhances the transfer of water vapor within the humidifiers, while the multi-stage design improves the recovery of desalinated water from the carrier gas. Additionally, the humidifiers effectively control the brine temperature between blocks, contributing to the overall efficiency and performance of the system 600.

Figure 7:
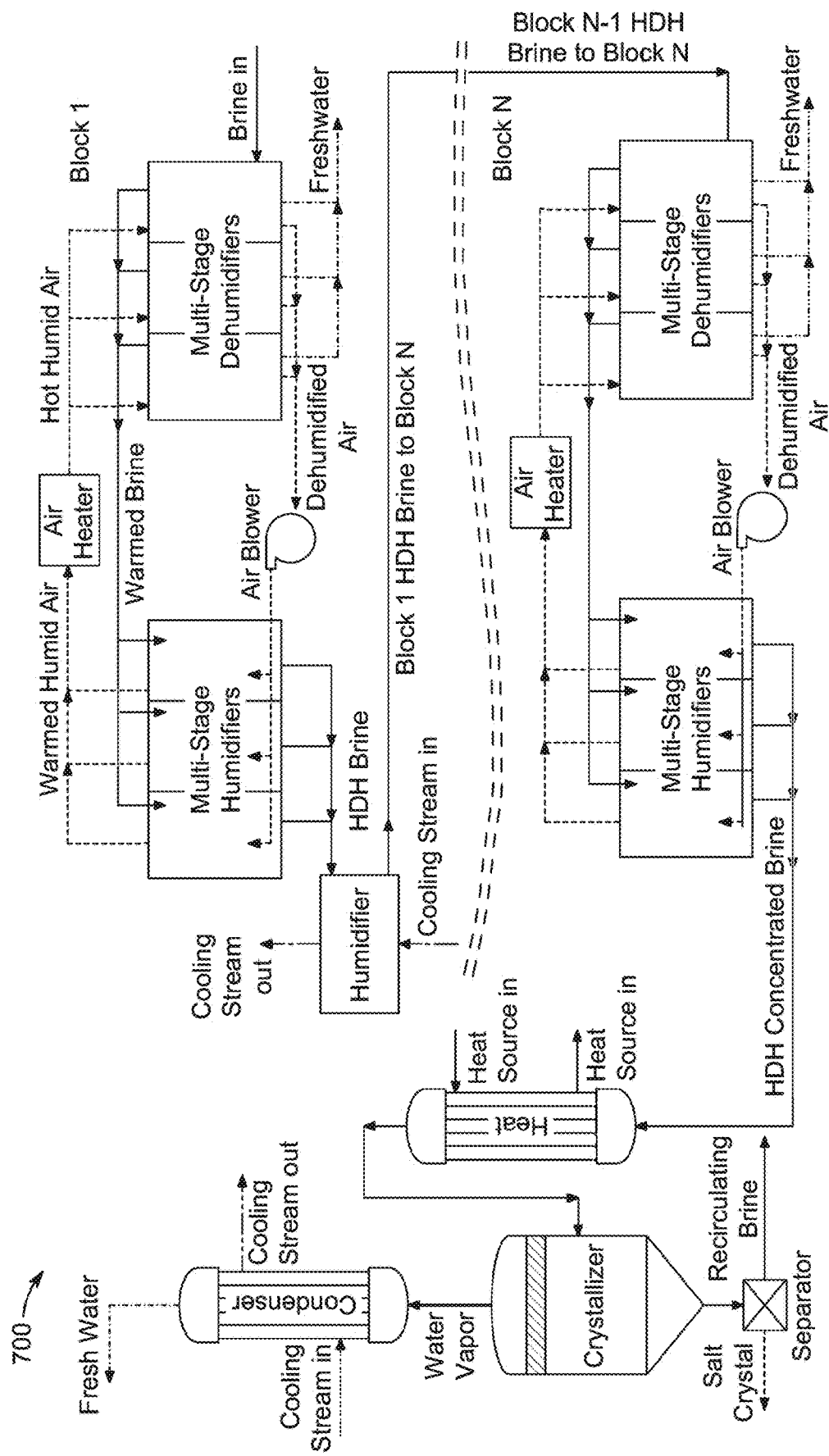
FIG. 7 is a schematic diagram of the zero liquid brine desalination and crystallization system implementing a closed-air, air-heated, parallel flow multi-stage HDH process with a single-stage crystallizer and heat exchanger inter-block (CA-AH-P-HX), according to certain embodiments.

Referring now to FIG. 7, illustrated is a schematic diagram of a zero liquid brine desalination and crystallization system (as represented by reference numeral 700, and hereinafter referred to as "system 700") implementing a closed-air, air-heated, parallel flow multi-stage HDH process with a single-stage crystallizer and heat exchanger inter-block (CA-AH-P-HX), according to certain embodiments. The system 700 includes an HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. In this parallel configuration, the HDH desalination system operates with the saline water entering each stage at the same rate and at a constant temperature. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 700, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 700 also includes a heat exchanger disposed at each inter-block and utilized to decrease the brine temperature between blocks. The integration of the multi-stage humidifiers and dehumidifiers within the closed-air circuit ensures a continuous and efficient desalination process. The use of air heaters enhances the transfer of water vapor within the humidifiers, while the multi-stage design improves the recovery of desalinated water from the carrier gas. Additionally, the heat exchangers effectively control the brine temperature between blocks, contributing to the overall efficiency and performance of the system 700.

Figure 8:
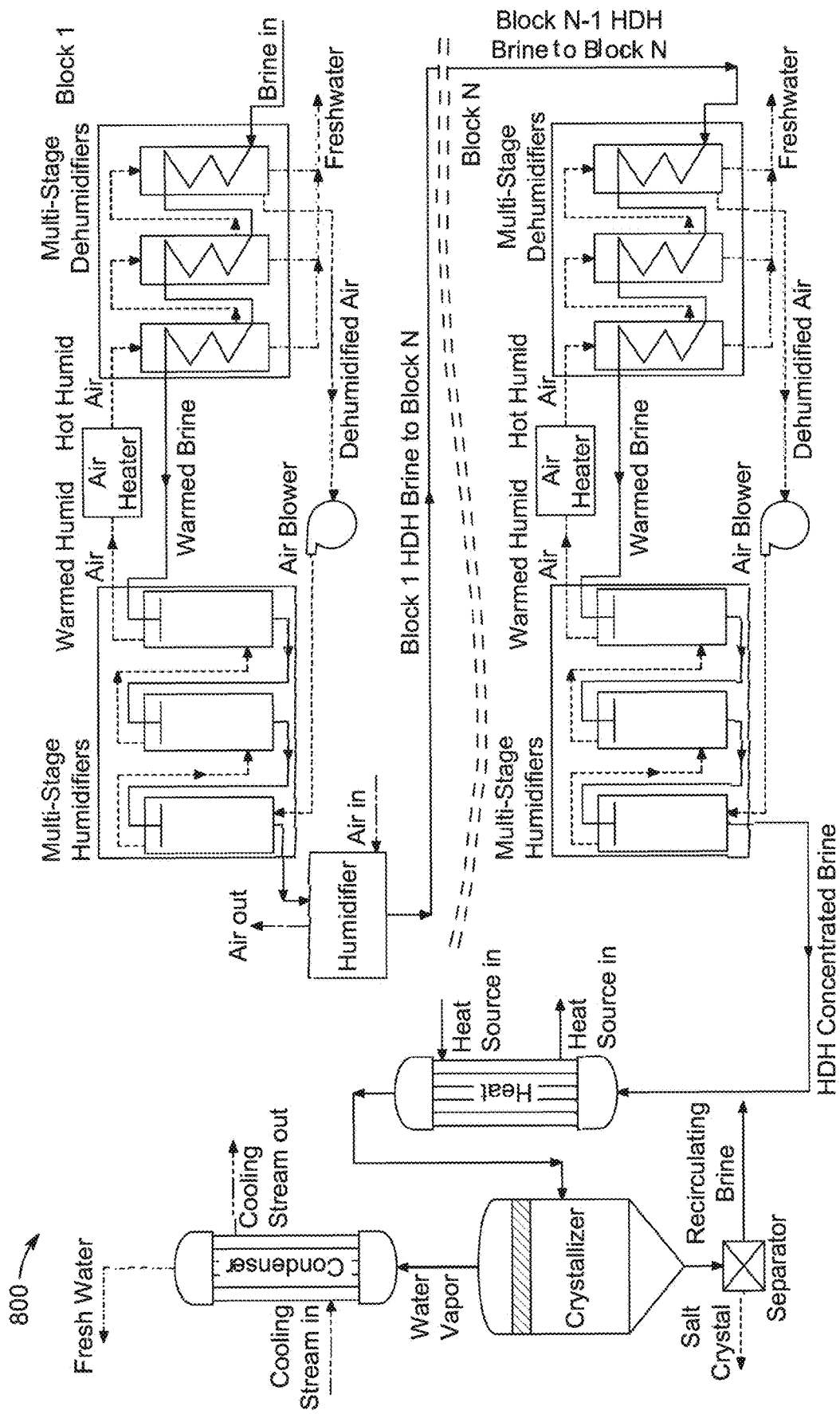
FIG. 8 is a schematic diagram of the zero liquid brine desalination and crystallization system implementing a closed-air, air-heated, series flow multi-stage HDH process with a single-stage crystallizer and humidifier inter-block (CA-AH-S-HM), according to certain embodiments.

Referring now to FIG. 8, illustrated is a schematic diagram of a zero liquid brine desalination and crystallization system (as represented by reference numeral 800, and hereinafter referred to as "system 800") implementing a closed-air, air-heated, series flow multi-stage HDH process with a single-stage crystallizer and humidifier inter-block (CA-AH-S-HM), according to certain embodiments. The system 800 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 800, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 800 also includes a humidifier disposed at each inter-block and utilized to decrease the brine temperature between blocks. The integration of the multi-stage humidifiers and dehumidifiers within the closed-air circuit ensures a continuous and efficient desalination process. The use of air heaters enhances the transfer of water vapor within the humidifiers, while the multi-stage design improves the recovery of desalinated water from the carrier gas. Additionally, the humidifiers at each inter-block effectively control the brine temperature, contributing to the overall efficiency and performance of the system 800.

Figure 9:
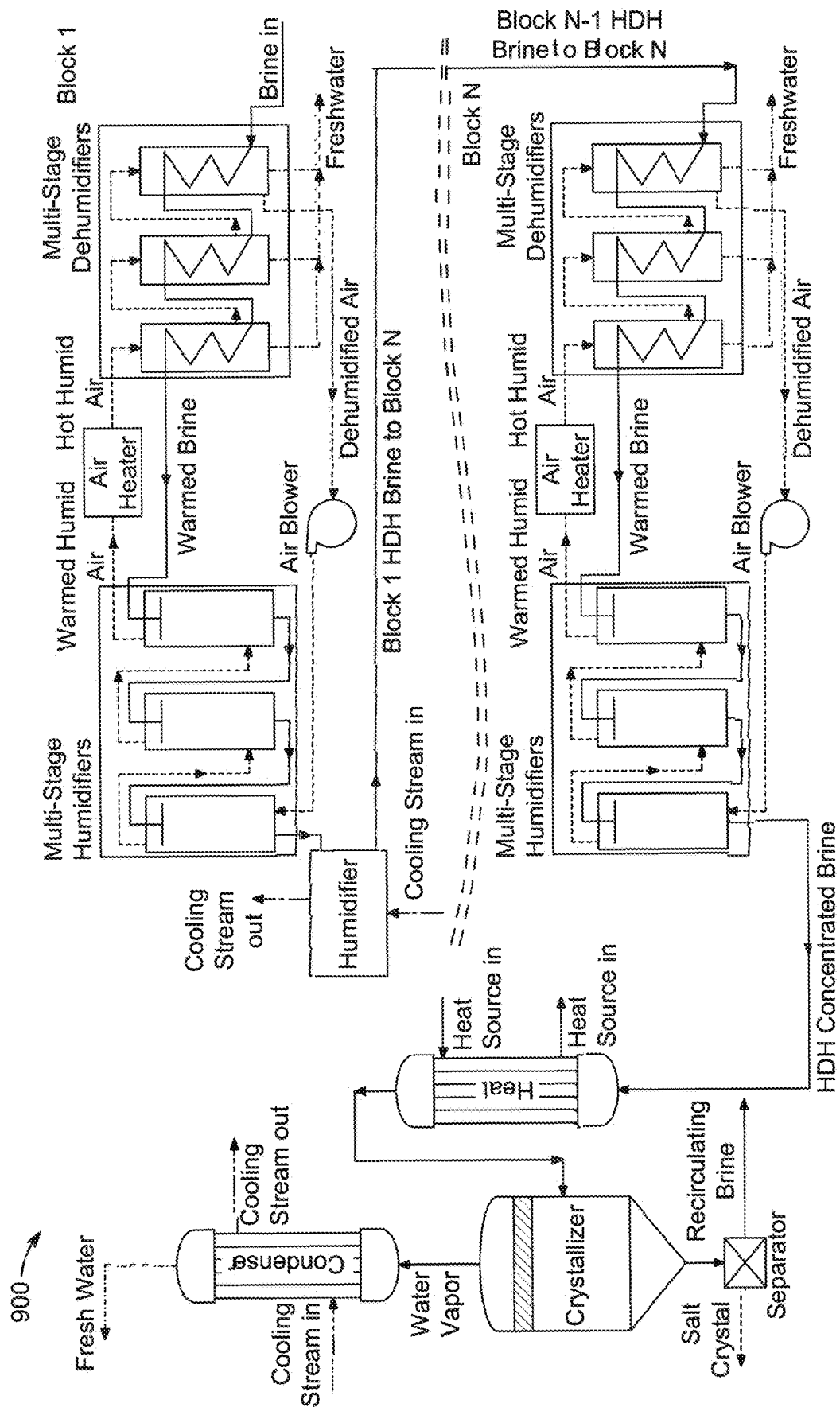
FIG. 9 is a schematic diagram of the zero liquid brine desalination and crystallization system implementing a closed-air, air-heated, series flow multi-stage HDH process with a single-stage crystallizer and heat exchanger inter-block (CA-AH-S-HX), according to certain embodiments.

Referring now to FIG. 9, illustrated is a schematic diagram of a zero liquid brine desalination and crystallization system (as represented by reference numeral 900, and hereinafter referred to as "system 900") implementing a closed-air, air-heated, series flow multi-stage HDH process with a single-stage crystallizer and heat exchanger inter-block (CA-AH-S-HX), according to certain embodiments. The system 900 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 900, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 900 also includes a heat exchanger disposed at each inter-block and utilized to decrease the brine temperature between blocks. The integration of the multi-stage humidifiers and dehumidifiers within the closed-air circuit ensures a continuous and efficient desalination process. The use of air heaters enhances the transfer of water vapor within the humidifiers, while the multi-stage design improves the recovery of desalinated water from the carrier gas. Additionally, the heat exchangers at each inter-block effectively control the brine temperature, contributing to the overall efficiency and performance of the system 900.

Figure 10:
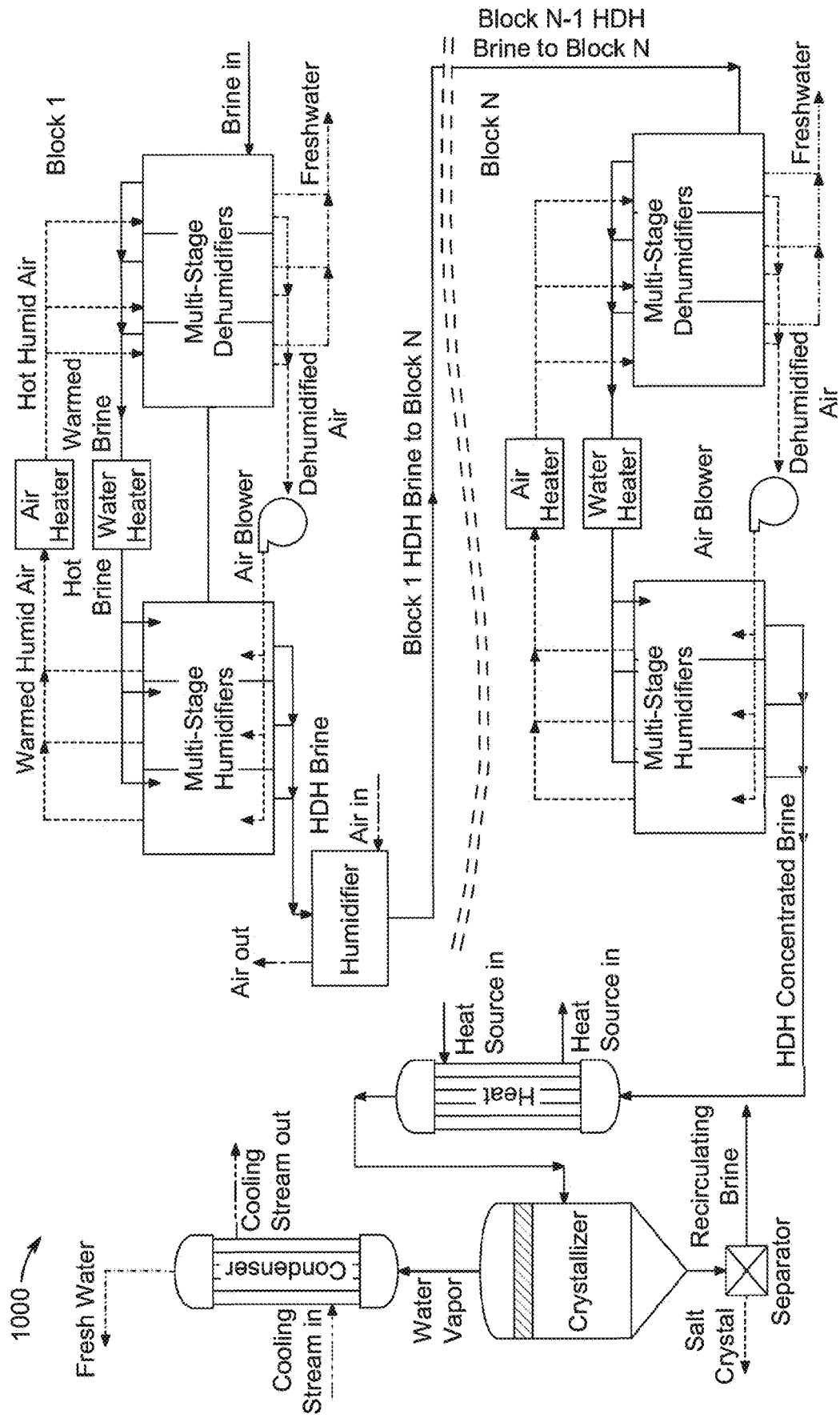
FIG. 10 is a schematic diagram of the zero liquid brine desalination and crystallization system implementing a closed-air, dual-heated, parallel flow multi-stage HDH process with a single-stage crystallizer and humidifier inter-block (CA-DH-P-HM), according to certain embodiments.

Referring now to FIG. 10, illustrated is a schematic diagram of a zero liquid brine desalination and crystallization system (as represented by reference numeral 1000, and hereinafter referred to as "system 1000") implementing a closed-air, dual-heated, parallel flow multi-stage HDH process with a single-stage crystallizer and humidifier inter-block (CA-DH-P-HM), according to certain embodiments. The system 1000 includes a HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 1000, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1000 also includes a humidifier disposed at each inter-block and utilized to decrease the brine temperature between blocks. The integration of the multi-stage humidifiers and dehumidifiers within the closed-air circuit ensures a continuous and efficient desalination process. The use of air heaters and water heaters enhances the transfer of water vapor within the humidifiers, while the multi-stage design improves the recovery of desalinated water from the carrier gas. Additionally, the humidifiers effectively control the brine temperature between blocks, contributing to the overall efficiency and performance of the system 1000.

Figure 11:
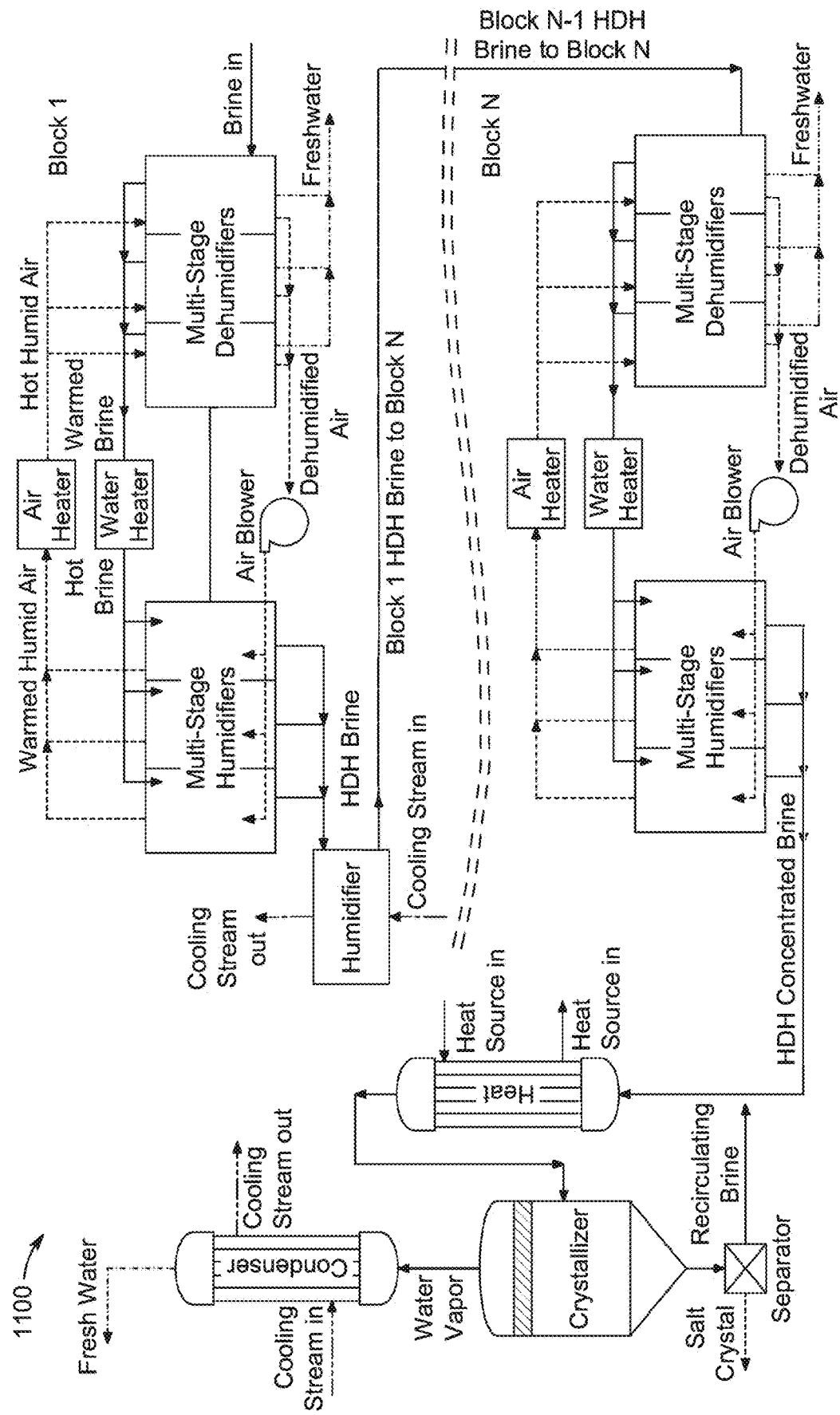
FIG. 11 is a schematic diagram of the zero liquid brine desalination and crystallization system implementing a closed-air, dual-heated, parallel flow multi-stage HDH process with a single-stage crystallizer and heat exchanger inter-block (CA-DH-P-HX), according to certain embodiments.

Referring now to FIG. 11, illustrated is a schematic diagram of a zero liquid brine desalination and crystallization system (as represented by reference numeral 1100, and hereinafter referred to as "system 1100") implementing a closed-air, dual-heated, parallel flow multi-stage HDH process with a single-stage crystallizer and heat exchanger inter-block (CA-DH-P-HX), according to certain embodiments. The system 1100 includes an HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. The heated brine stream exits the dehumidifiers to a water heater where it is heated to an elevated temperature, to be passed to the humidifiers. In this parallel configuration, the HDH desalination system operates with the saline water entering each stage at the same rate and at a constant temperature. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 1100, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1100 also includes a heat exchanger disposed at each inter-block and utilized to decrease the brine temperature between blocks. The integration of the multi-stage humidifiers and dehumidifiers within the closed-air circuit ensures a continuous and efficient desalination process. The use of air heaters and water heaters enhances the transfer of water vapor within the humidifiers, while the multi-stage design improves the recovery of desalinated water from the carrier gas. Additionally, the heat exchangers effectively control the brine temperature between blocks, contributing to the overall efficiency and performance of the system 1100.

Figure 12:
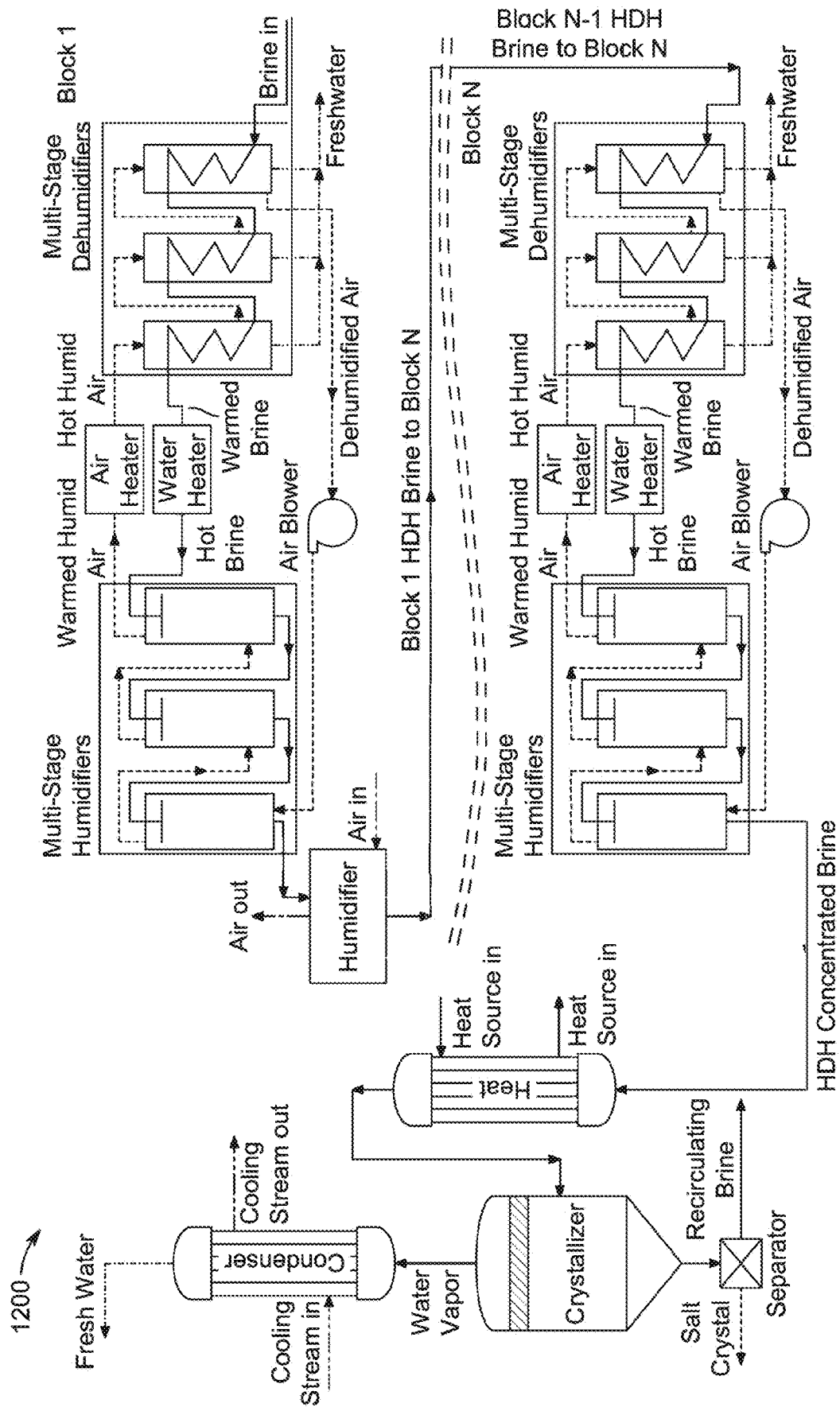
FIG. 12 is a schematic diagram of the zero liquid brine desalination and crystallization system implementing a closed-air, dual-heated, series flow multi-stage HDH process with a single-stage crystallizer and humidifier inter-block (CA-DH-S-HM), according to certain embodiments.

Referring now to FIG. 12, illustrated is a schematic diagram of a zero liquid brine desalination and crystallization system (as represented by reference numeral 1200, and hereinafter referred to as "system 1200") implementing a closed-air, dual-heated, series flow multi-stage HDH process with a single-stage crystallizer and humidifier inter-block (CA-DH-S-HM), according to certain embodiments. The system 1200 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 1200, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1200 also includes a humidifier disposed at each inter-block and utilized to decrease the brine temperature between blocks. The integration of the multi-stage humidifiers and dehumidifiers within the closed-air circuit ensures a continuous and efficient desalination process. The use of air heaters and water heaters enhances the transfer of water vapor within the humidifiers, while the multi-stage design improves the recovery of desalinated water from the carrier gas. Additionally, the humidifiers at each inter-block effectively control the brine temperature, contributing to the overall efficiency and performance of the system 1200.

Figure 13:
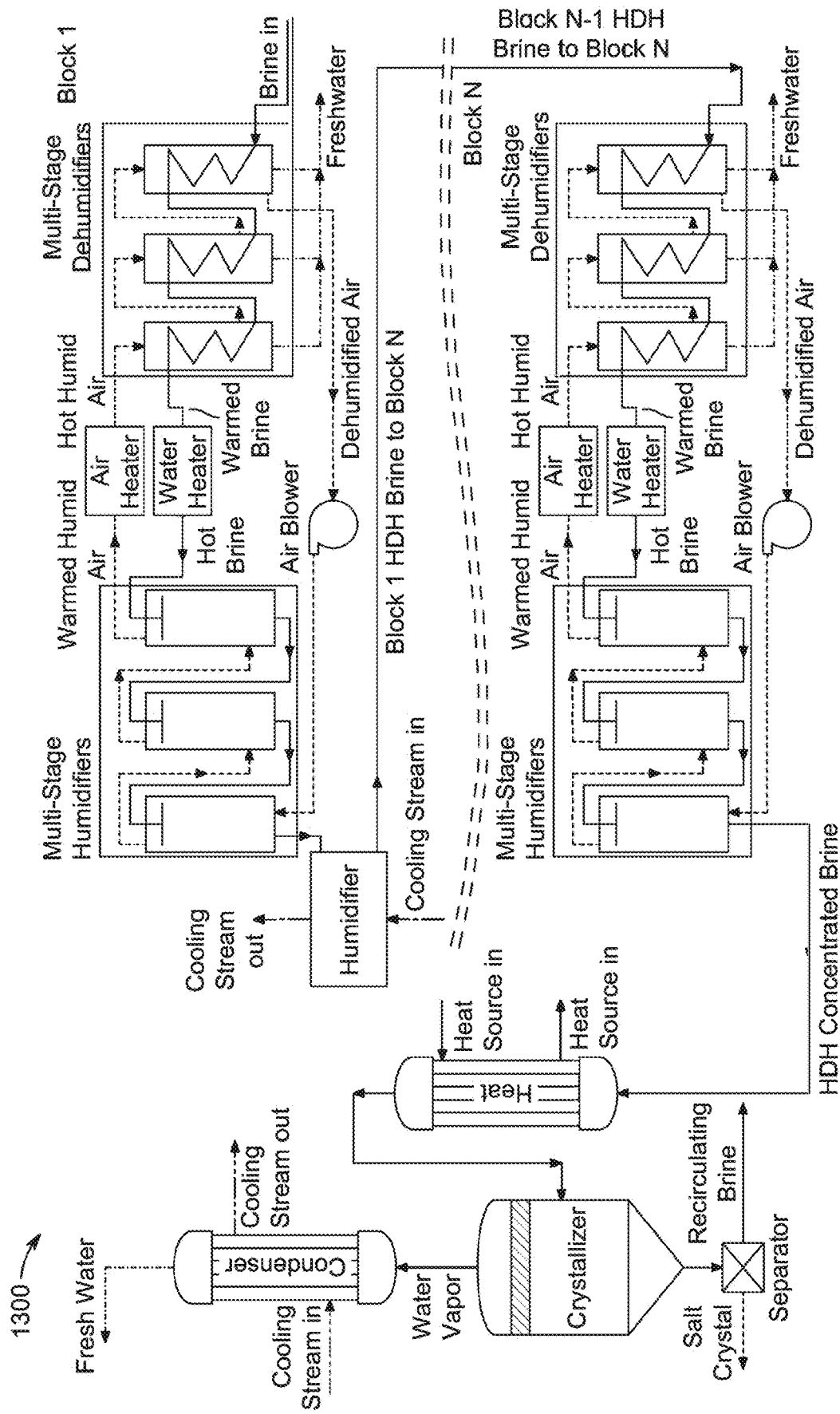
FIG. 13 is a schematic diagram of the zero liquid brine desalination and crystallization system implementing a closed-air, dual-heated, series flow multi-stage HDH process with a single-stage crystallizer and heat exchanger inter-block (CA-DH-S-HX), according to certain embodiments.

Referring now to FIG. 13, illustrated is a schematic diagram of a zero liquid brine desalination and crystallization system (as represented by reference numeral 1300, and hereinafter referred to as "system 1300") implementing a closed-air, dual-heated, series flow multi-stage HDH process with a single-stage crystallizer and heat exchanger inter-block (CA-DH-S-HX), according to certain embodiments. The system 1300 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 1300, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1300 also includes a heat exchanger disposed at each inter-block and utilized to decrease the brine temperature between blocks. The integration of the multi-stage humidifiers and dehumidifiers within the closed-air circuit ensures a continuous and efficient desalination process. The use of air heaters and water heaters enhances the transfer of water vapor within the humidifiers, while the multi-stage design improves the recovery of desalinated water from the carrier gas. Additionally, the heat exchangers at each inter-block effectively control the brine temperature, contributing to the overall efficiency and performance of the system 1300.

Figure 14:
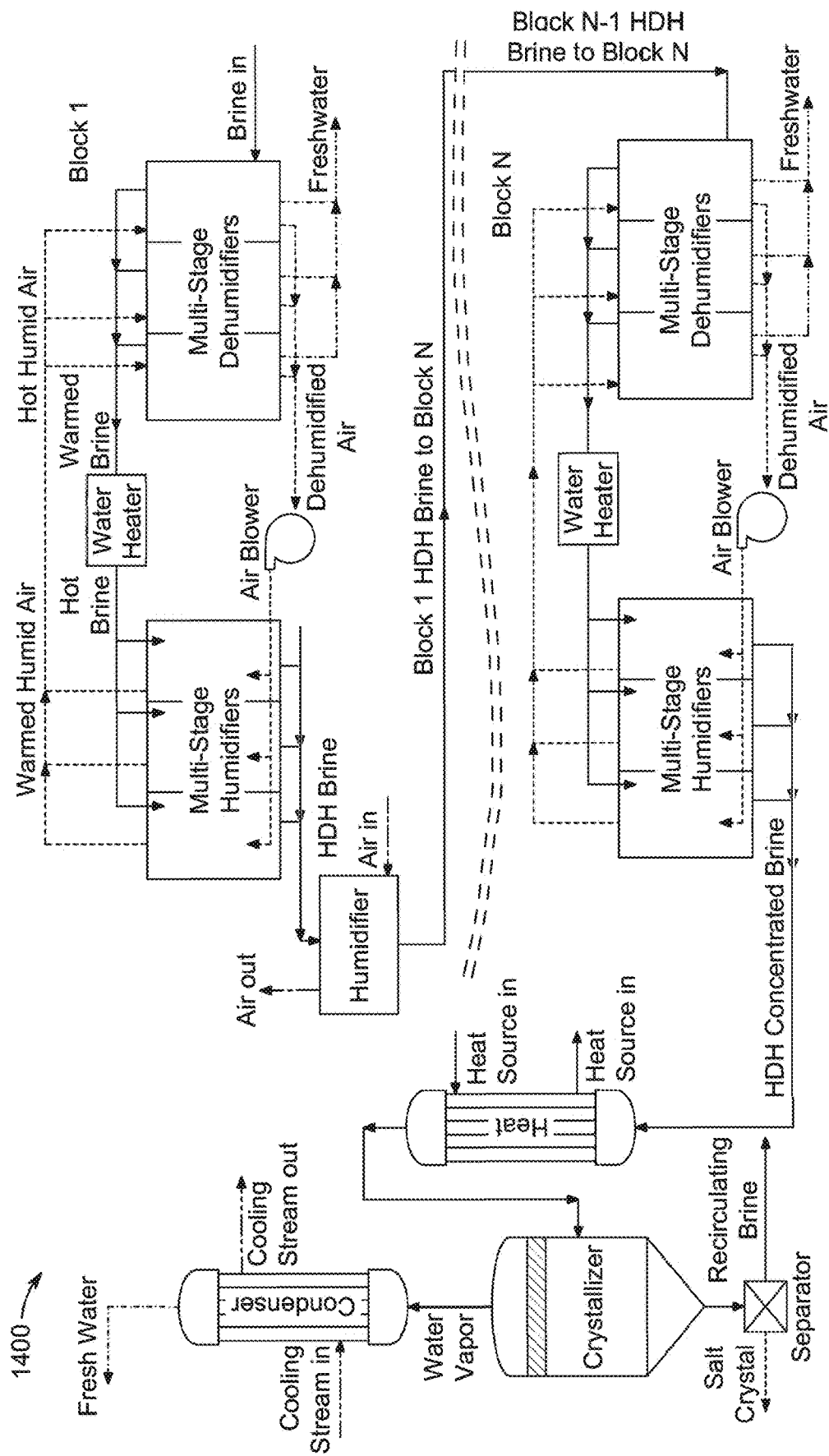
FIG. 14 is a schematic diagram of the zero liquid brine desalination and crystallization system implementing a closed-air, water-heated, parallel flow multi-stage HDH process with a single-stage crystallizer and humidifier inter-block (CA-WH-P-HM), according to certain embodiments.

Referring now to FIG. 14, illustrated is a schematic diagram of a zero liquid brine desalination and crystallization system (as represented by reference numeral 1400, and hereinafter referred to as "system 1400") implementing a closed-air, water-heated, parallel flow multi-stage HDH process with a single-stage crystallizer and humidifier inter-block (CA-WH-P-HM), according to certain embodiments. The system 1400 includes a HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 1400, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1400 also includes a humidifier disposed at each inter-block and utilized to decrease the brine temperature between blocks. The integration of the multi-stage humidifiers and dehumidifiers within the closed-air circuit ensures a continuous and efficient desalination process. The use of air heaters enhances the transfer of water vapor within the humidifiers, while the multi-stage design improves the recovery of desalinated water from the carrier gas. Additionally, the humidifiers effectively control the brine temperature between blocks, contributing to the overall efficiency and performance of the system 1400.

Figure 15:
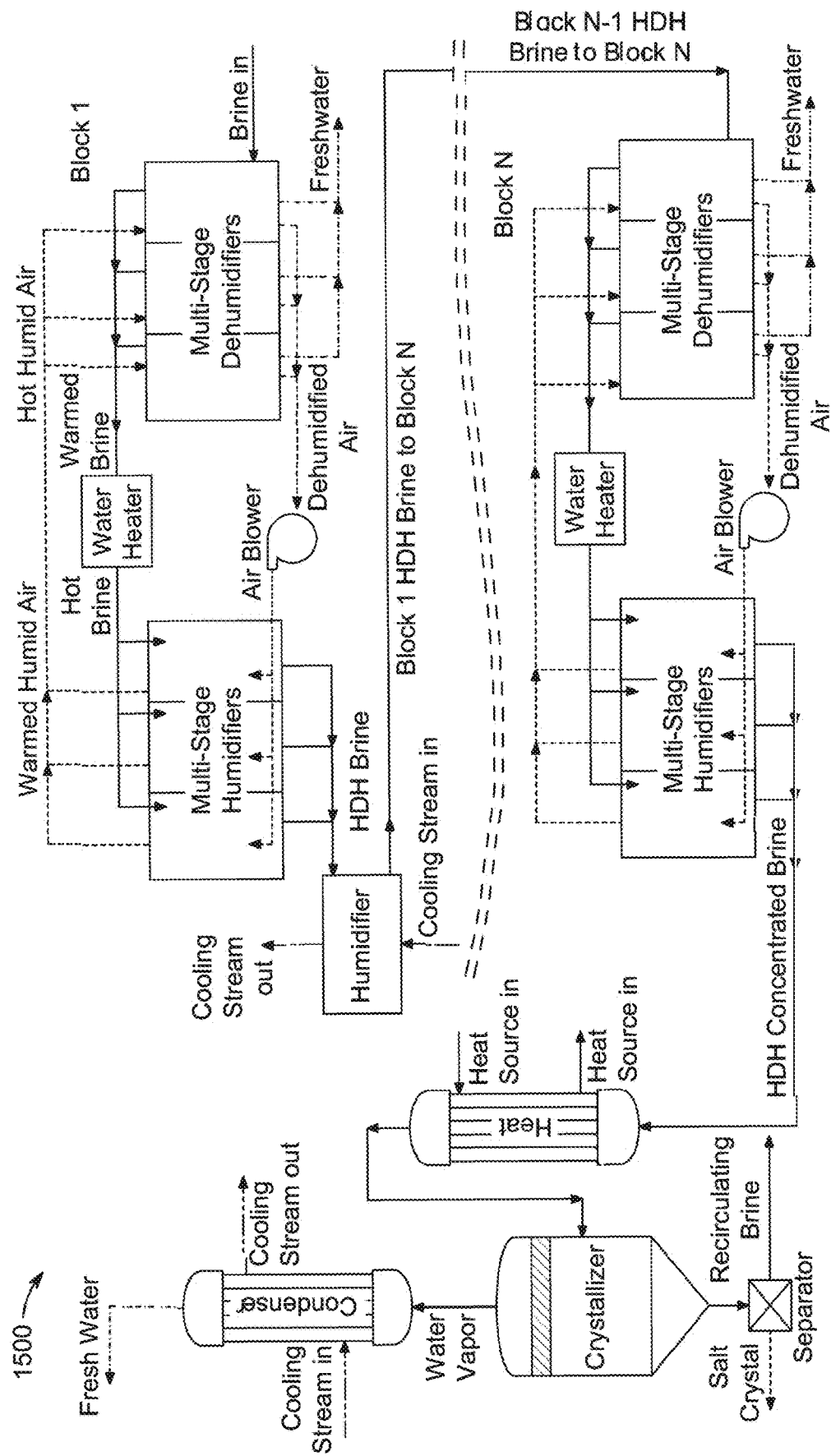
FIG. 15 is a schematic diagram of the zero liquid brine desalination and crystallization system implementing a closed-air, water-heated, parallel flow multi-stage HDH process with a single-stage crystallizer and heat exchanger inter-block (CA-WH-P-HX), according to certain embodiments.

Referring now to FIG. 15, illustrated is a schematic diagram of a zero liquid brine desalination and crystallization system (as represented by reference numeral 1500, and hereinafter referred to as "system 1500") implementing a closed-air, water-heated, parallel flow multi-stage HDH process with a single-stage crystallizer and heat exchanger inter-block (CA-WH-P-HX), according to certain embodiments. The system 1500 includes an HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The heated brine stream exits the dehumidifiers to a water heater where it is heated to an elevated temperature, to be passed to the humidifiers. In this parallel configuration, the HDH desalination system operates with the saline water entering each stage at the same rate and at a constant temperature. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 1500, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1500 also includes a heat exchanger disposed at each inter-block and utilized to decrease the brine temperature between blocks. The integration of the multi-stage humidifiers and dehumidifiers within the closed-air circuit ensures a continuous and efficient desalination process. The use of air heaters enhances the transfer of water vapor within the humidifiers, while the multi-stage design improves the recovery of desalinated water from the carrier gas. Additionally, the heat exchangers effectively control the brine temperature between blocks, contributing to the overall efficiency and performance of the system 1500.

Figure 16:
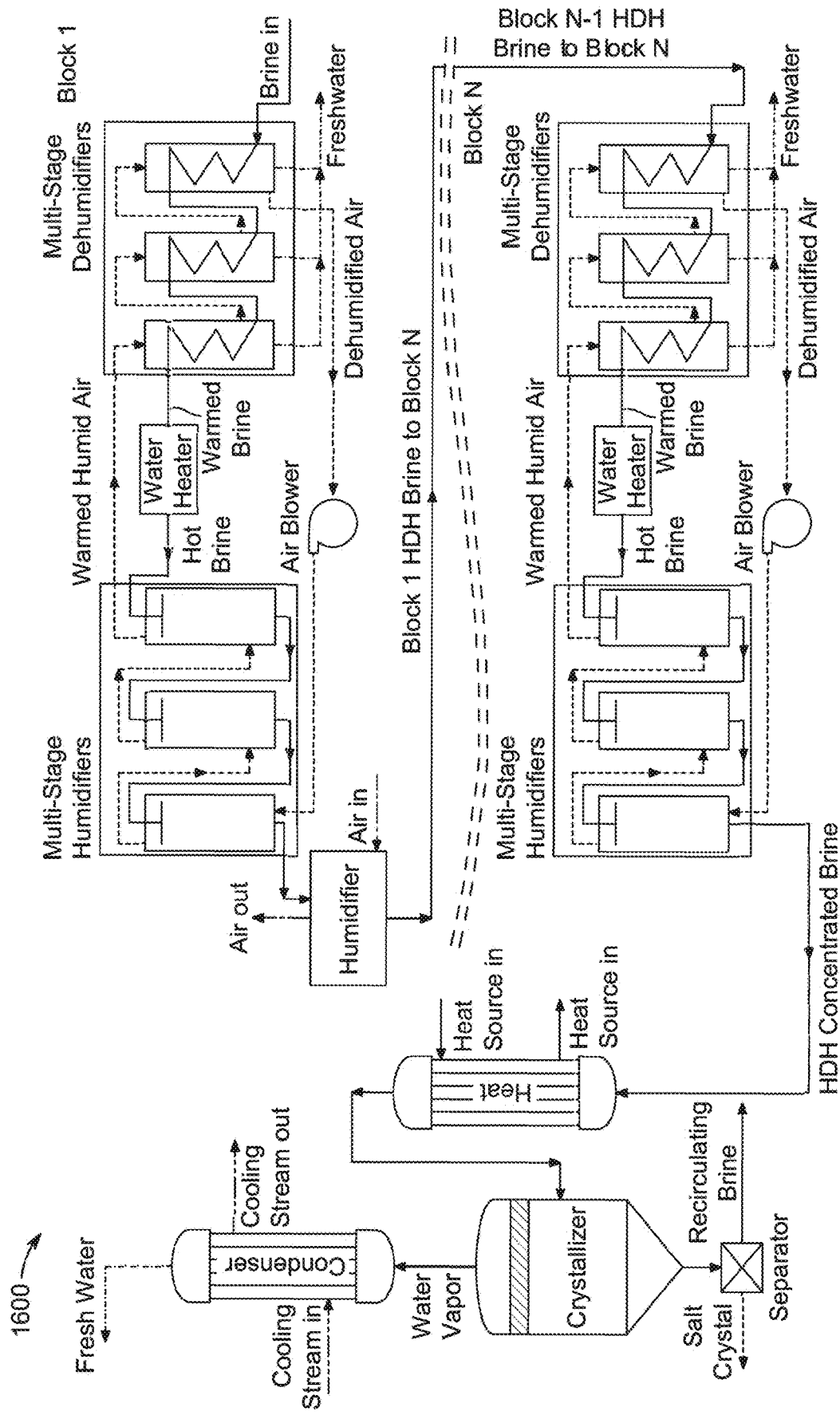
FIG. 16 is a schematic diagram of the zero liquid brine desalination and crystallization system implementing a closed-air, water-heated, series flow multi-stage HDH process with a single-stage crystallizer and humidifier inter-block (CA-WH-S-HM), according to certain embodiments.

Referring now to FIG. 16, illustrated is a schematic diagram of a zero liquid brine desalination and crystallization system (as represented by reference numeral 1600, and hereinafter referred to as "system 1600") implementing a closed-air, water-heated, series flow multi-stage HDH process with a single-stage crystallizer and humidifier inter-block (CA-WH-S-HM), according to certain embodiments. The system 1600 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 1600, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1600 also includes a humidifier disposed at each inter-block and utilized to decrease the brine temperature between blocks. The integration of the multi-stage humidifiers and dehumidifiers within the closed-air circuit ensures a continuous and efficient desalination process. The use of air heaters enhances the transfer of water vapor within the humidifiers, while the multi-stage design improves the recovery of desalinated water from the carrier gas. Additionally, the humidifiers at each inter-block effectively control the brine temperature, contributing to the overall efficiency and performance of the system 1600.

Figure 17:
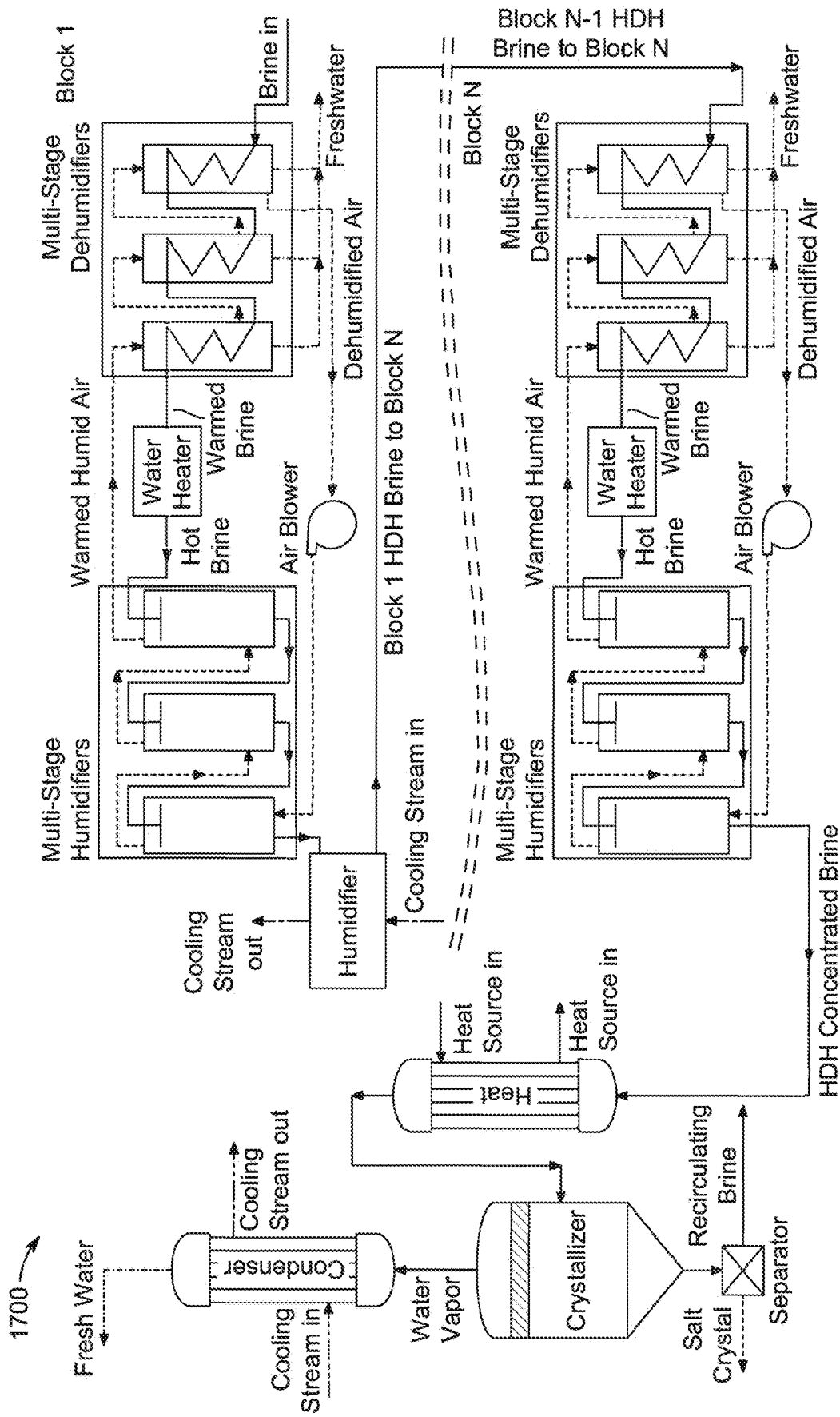
FIG. 17 is a schematic diagram of the zero liquid brine desalination and crystallization system implementing a closed-air, water-heated, series flow multi-stage HDH process with a single-stage crystallizer and heat exchanger inter-block (CA-WH-S-HX), according to certain embodiments.

Referring now to FIG. 17, illustrated is a schematic diagram of a zero liquid brine desalination and crystallization system (as represented by reference numeral 1700, and hereinafter referred to as "system 1700") implementing a closed-air, water-heated, series flow multi-stage HDH process with a single-stage crystallizer and heat exchanger inter-block (CA-WH-S-HX), according to certain embodiments. The system 1700 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is sent to the next block in the series for further humidification and dehumidification.

Further, in the system 1700, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1700 also includes a heat exchanger disposed at each inter-block and utilized to decrease the brine temperature between blocks. The integration of the multi-stage humidifiers and dehumidifiers within the closed-air circuit ensures a continuous and efficient desalination process. The use of air heaters enhances the transfer of water vapor within the humidifiers, while the multi-stage design improves the recovery of desalinated water from the carrier gas. Additionally, the heat exchangers at each inter-block effectively control the brine temperature, contributing to the overall efficiency and performance of the system 1700.

Figure 18:
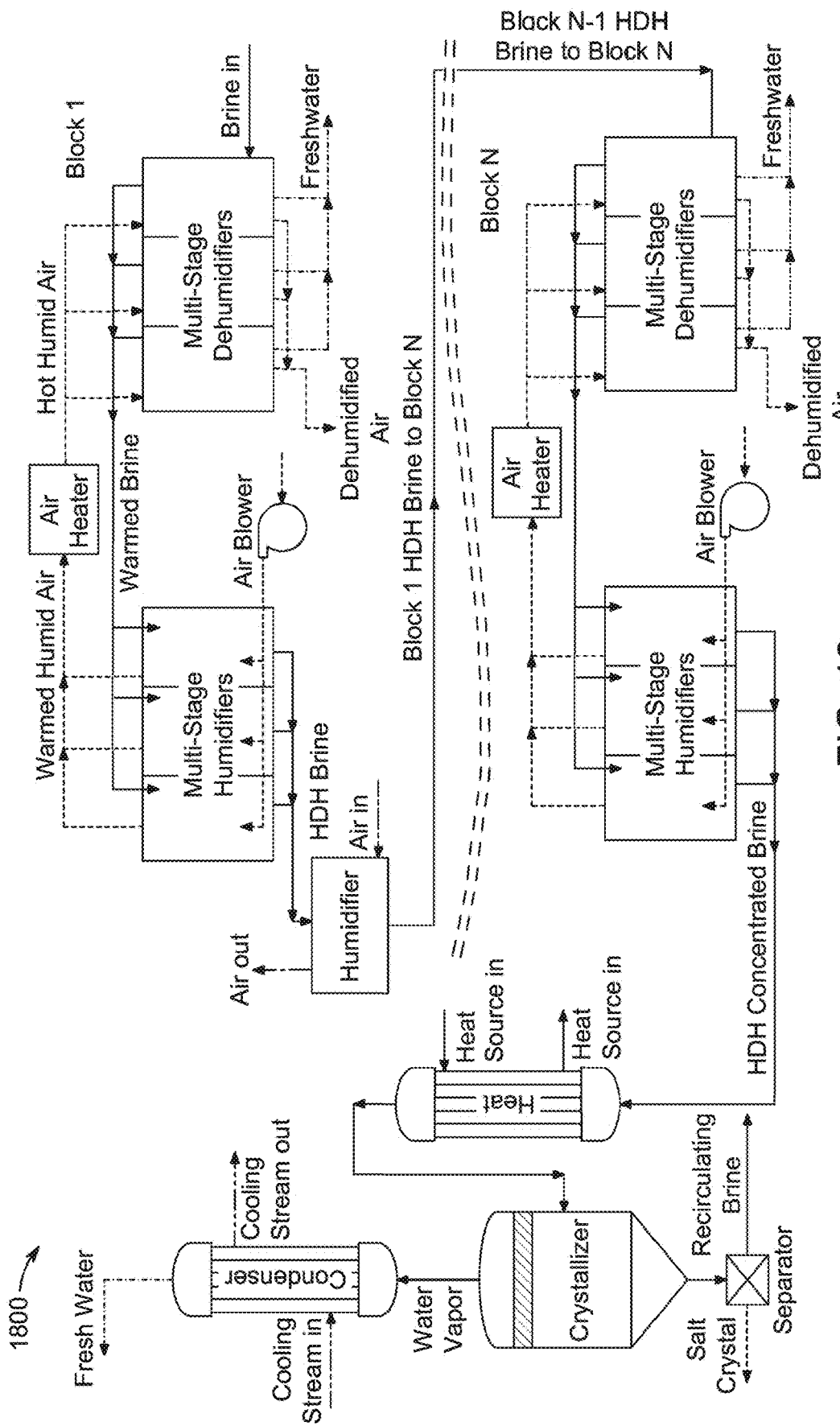
FIG. 18 is a schematic diagram of the zero liquid brine desalination and crystallization system implementing an opened-air, air-heated, parallel flow multi-stage HDH process with a single-stage crystallizer and humidifier inter-block (OA-AH-P-HM), according to certain embodiments.

Referring now to FIG. 18, illustrated is a schematic diagram of a zero liquid brine desalination and crystallization system (as represented by reference numeral 1800, and hereinafter referred to as "system 1800") implementing a opened-air, air-heated, parallel flow multi-stage HDH process with a single-stage crystallizer and humidifier inter-block (CA-AH-P-HM), according to certain embodiments. The system 1800 includes a HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 1800, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1800 also includes a humidifier disposed at each inter-block and utilized to decrease the brine temperature between blocks. The integration of the multi-stage humidifiers and dehumidifiers within the opened-air circuit ensures a continuous and efficient desalination process. The use of air heaters enhances the transfer of water vapor within the humidifiers, while the multi-stage design improves the recovery of desalinated water from the carrier gas. Additionally, the humidifiers effectively control the brine temperature between blocks, contributing to the overall efficiency and performance of the system 1800.

Figure 19:
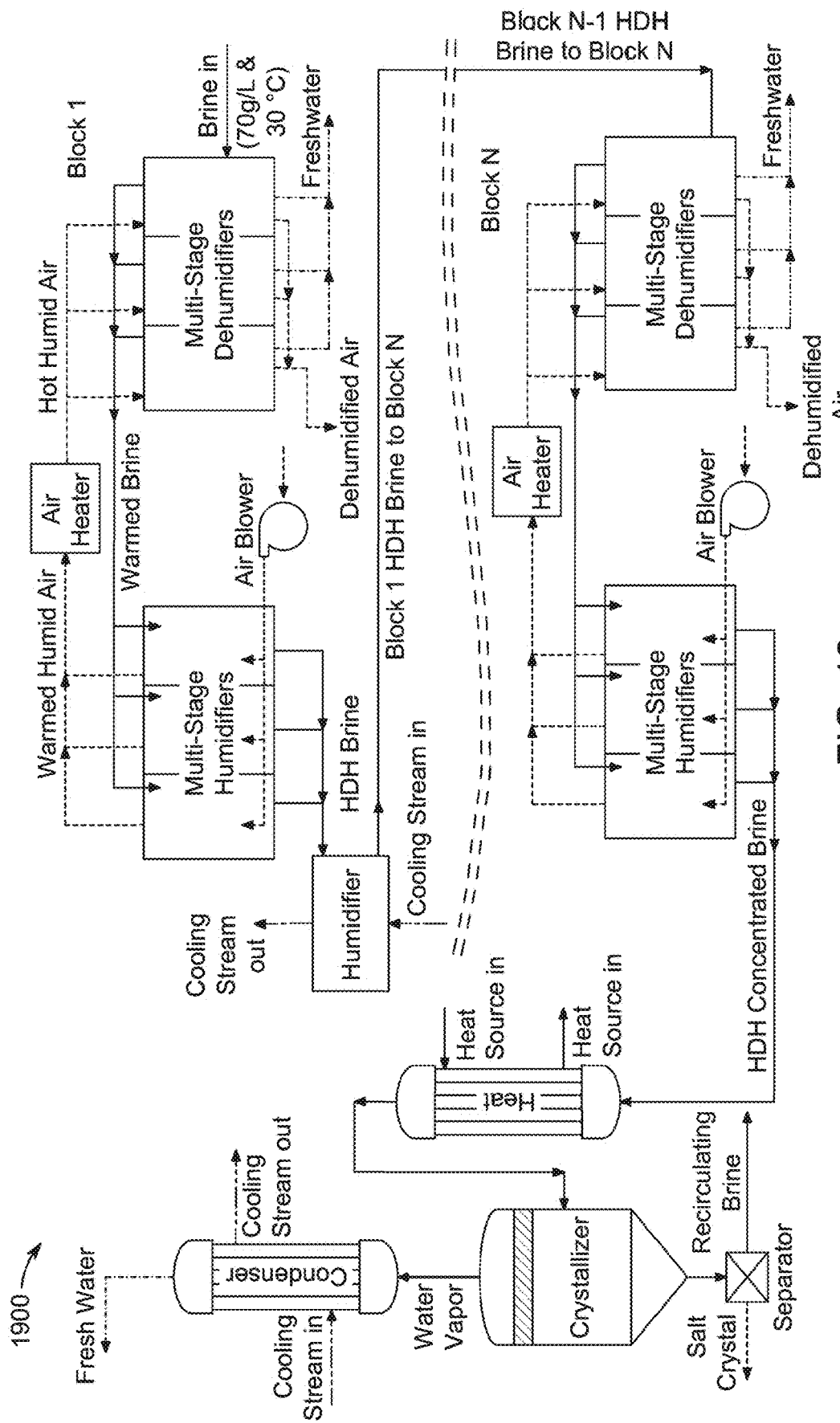
FIG. 19 is a schematic diagram of the zero liquid brine desalination and crystallization system implementing an opened-air, air-heated, parallel flow multi-stage HDH process with a single-stage crystallizer and heat exchanger inter-block (OA-AH-P-HX), according to certain embodiments.

Referring now to FIG. 19, illustrated is a schematic diagram of a zero liquid brine desalination and crystallization system (as represented by reference numeral 1900, and hereinafter referred to as "system 1900") implementing a opened-air, air-heated, parallel flow multi-stage HDH process with a single-stage crystallizer and heat exchanger inter-block (CA-AH-P-HX), according to certain embodiments. The system 1900 includes an HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. In this parallel configuration, the HDH desalination system operates with the saline water entering each stage at the same rate and at a constant temperature. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 1900, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 1900 also includes a heat exchanger disposed at each inter-block and utilized to decrease the brine temperature between blocks. The integration of the multi-stage humidifiers and dehumidifiers within the opened-air circuit ensures a continuous and efficient desalination process. The use of air heaters enhances the transfer of water vapor within the humidifiers, while the multi-stage design improves the recovery of desalinated water from the carrier gas. Additionally, the heat exchangers effectively control the brine temperature between blocks, contributing to the overall efficiency and performance of the system 1900.

Figure 20:
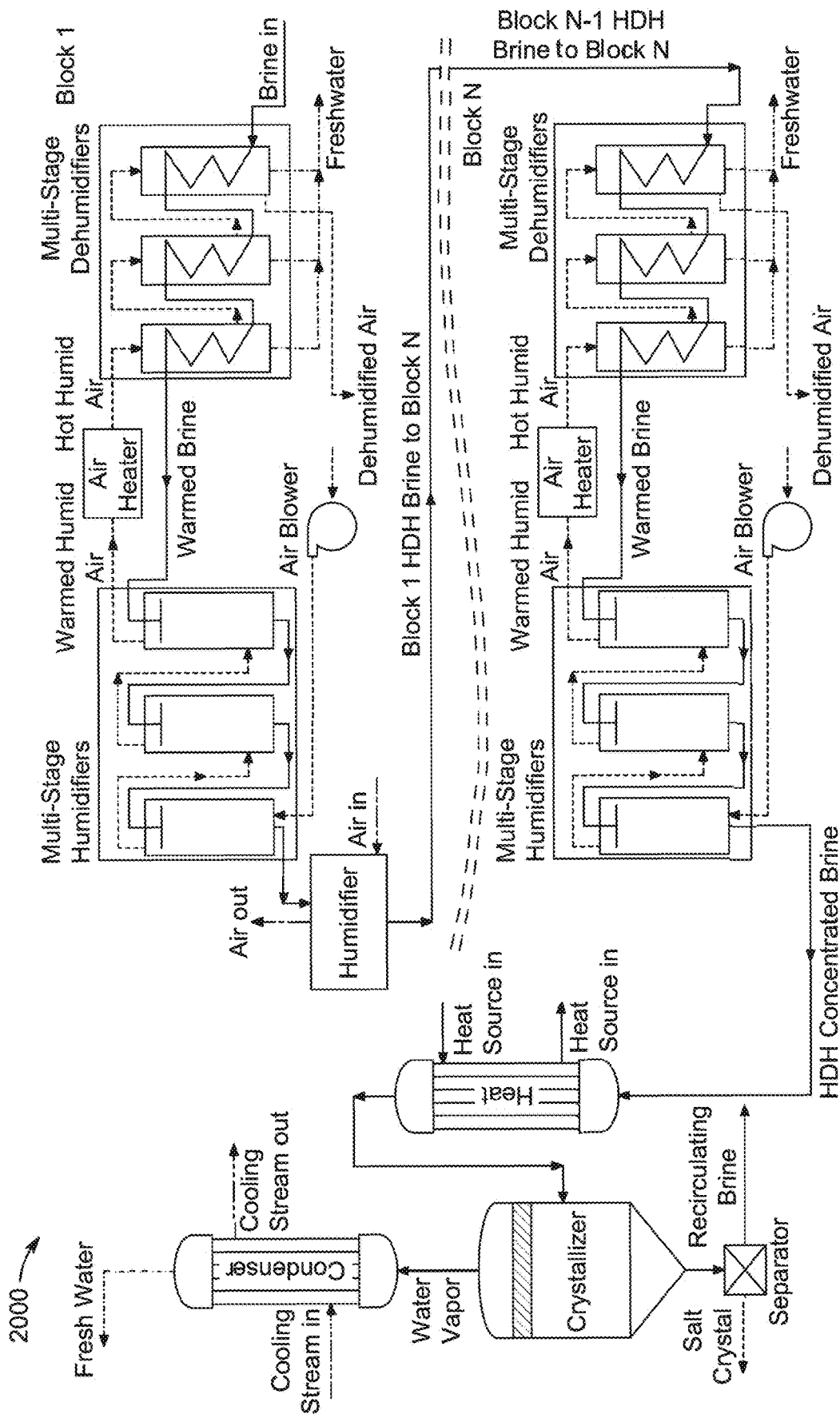
FIG. 20 is a schematic diagram of the zero liquid brine desalination and crystallization system implementing an opened-air, air-heated, series flow multi-stage HDH process with a single-stage crystallizer and humidifier inter-block (OA-AH-S-HM), according to certain embodiments.

Referring now to FIG. 20, illustrated is a schematic diagram of a zero liquid brine desalination and crystallization system (as represented by reference numeral 2000, and hereinafter referred to as "system 2000") implementing a opened-air, air-heated, series flow multi-stage HDH process with a single-stage crystallizer and humidifier inter-block (CA-AH-S-HM), according to certain embodiments. The system 2000 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2000, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2000 also includes a humidifier disposed at each inter-block and utilized to decrease the brine temperature between blocks. The integration of the multi-stage humidifiers and dehumidifiers within the opened-air circuit ensures a continuous and efficient desalination process. The use of air heaters enhances the transfer of water vapor within the humidifiers, while the multi-stage design improves the recovery of desalinated water from the carrier gas. Additionally, the humidifiers at each inter-block effectively control the brine temperature, contributing to the overall efficiency and performance of the system 2000.

Figure 21:
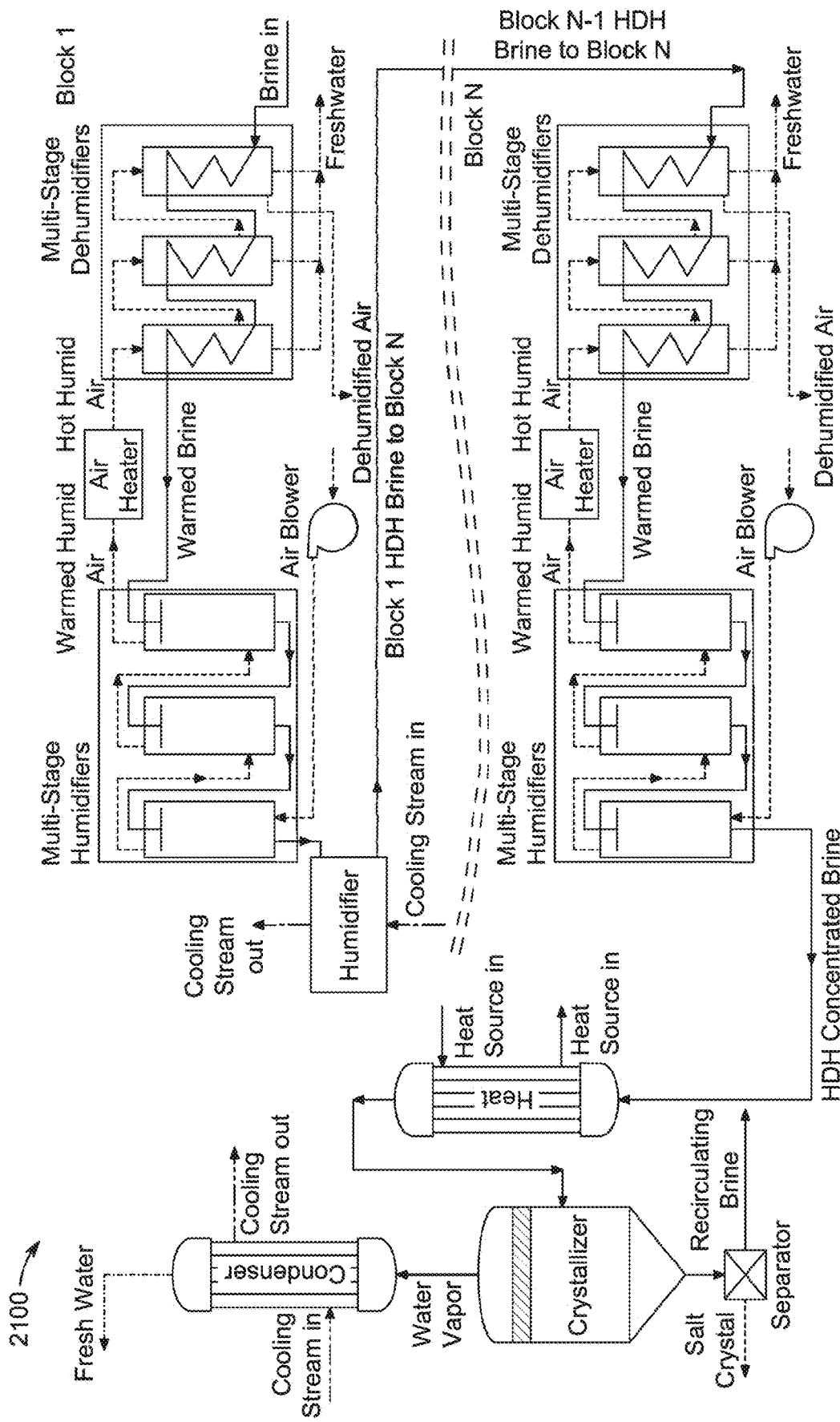
FIG. 21 is a schematic diagram of the zero liquid brine desalination and crystallization system implementing an opened-air, air-heated, series flow multi-stage HDH process with a single-stage crystallizer and heat exchanger inter-block (OA-AH-S-HX), according to certain embodiments.

Referring now to FIG. 21, illustrated is a schematic diagram of a zero liquid brine desalination and crystallization system (as represented by reference numeral 2100, and hereinafter referred to as "system 2100") implementing a opened-air, air-heated, series flow multi-stage HDH process with a single-stage crystallizer and heat exchanger inter-block (CA-AH-S-HX), according to certain embodiments. The system 2100 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2100, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2100 also includes a heat exchanger disposed at each inter-block and utilized to decrease the brine temperature between blocks. The integration of the multi-stage humidifiers and dehumidifiers within the opened-air circuit ensures a continuous and efficient desalination process. The use of air heaters enhances the transfer of water vapor within the humidifiers, while the multi-stage design improves the recovery of desalinated water from the carrier gas. Additionally, the heat exchangers at each inter-block effectively control the brine temperature, contributing to the overall efficiency and performance of the system 2100.

Figure 22:
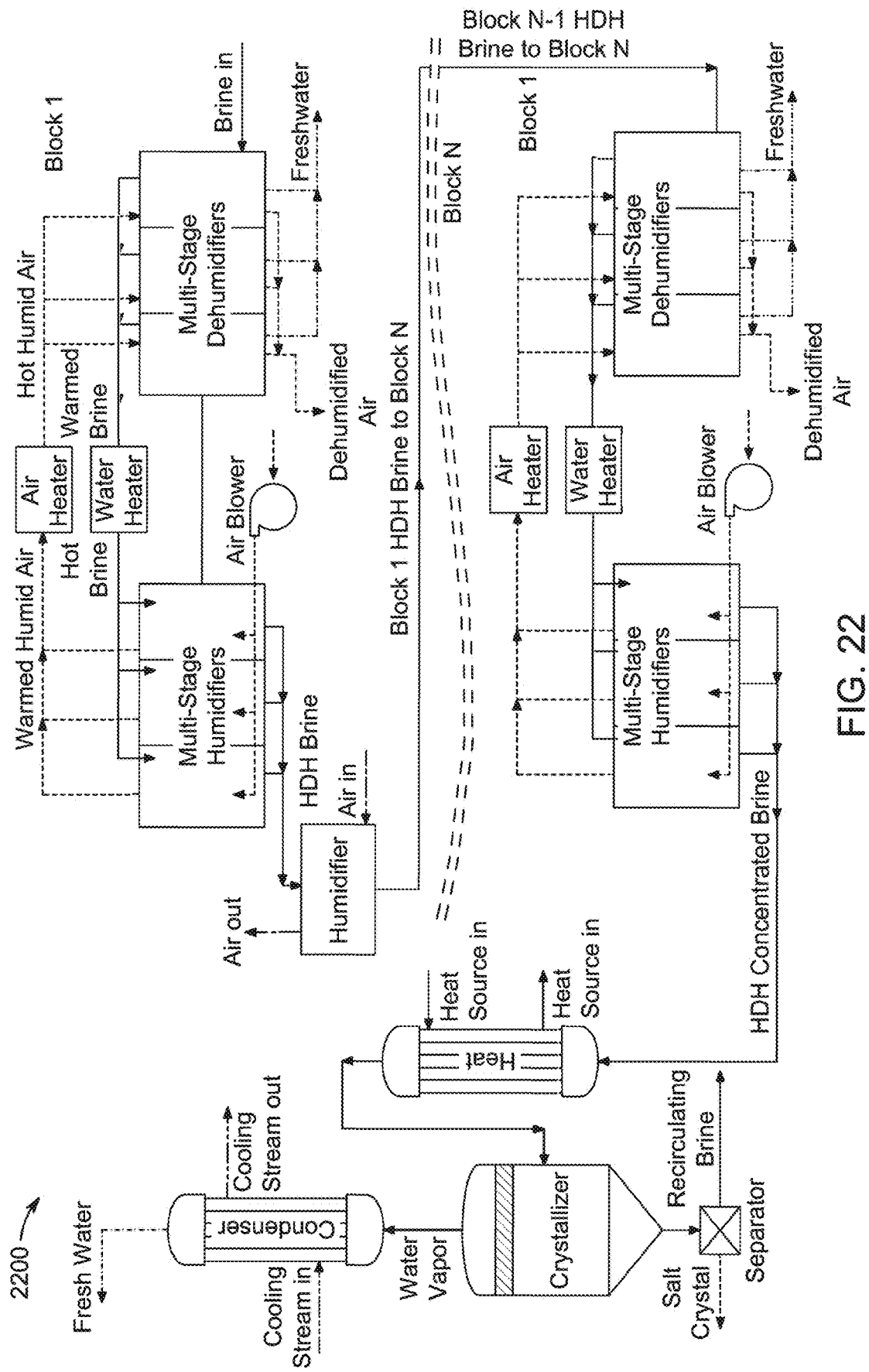
FIG. 22 is a schematic diagram of the zero liquid brine desalination and crystallization system implementing an opened-air, dual-heated, parallel flow multi-stage HDH process with a single-stage crystallizer and humidifier inter-block (OA-DH-P-HM), according to certain embodiments.

Referring now to FIG. 22, illustrated is a schematic diagram of a zero liquid brine desalination and crystallization system (as represented by reference numeral 2200, and hereinafter referred to as "system 2200") implementing a opened-air, dual-heated, parallel flow multi-stage HDH process with a single-stage crystallizer and humidifier inter-block (CA-DH-P-HM), according to certain embodiments. The system 2200 includes a HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2200, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2200 also includes a humidifier disposed at each inter-block and utilized to decrease the brine temperature between blocks. The integration of the multi-stage humidifiers and dehumidifiers within the opened-air circuit ensures a continuous and efficient desalination process. The use of air heaters and water heaters enhances the transfer of water vapor within the humidifiers, while the multi-stage design improves the recovery of desalinated water from the carrier gas. Additionally, the humidifiers effectively control the brine temperature between blocks, contributing to the overall efficiency and performance of the system 2200.

Figure 23:
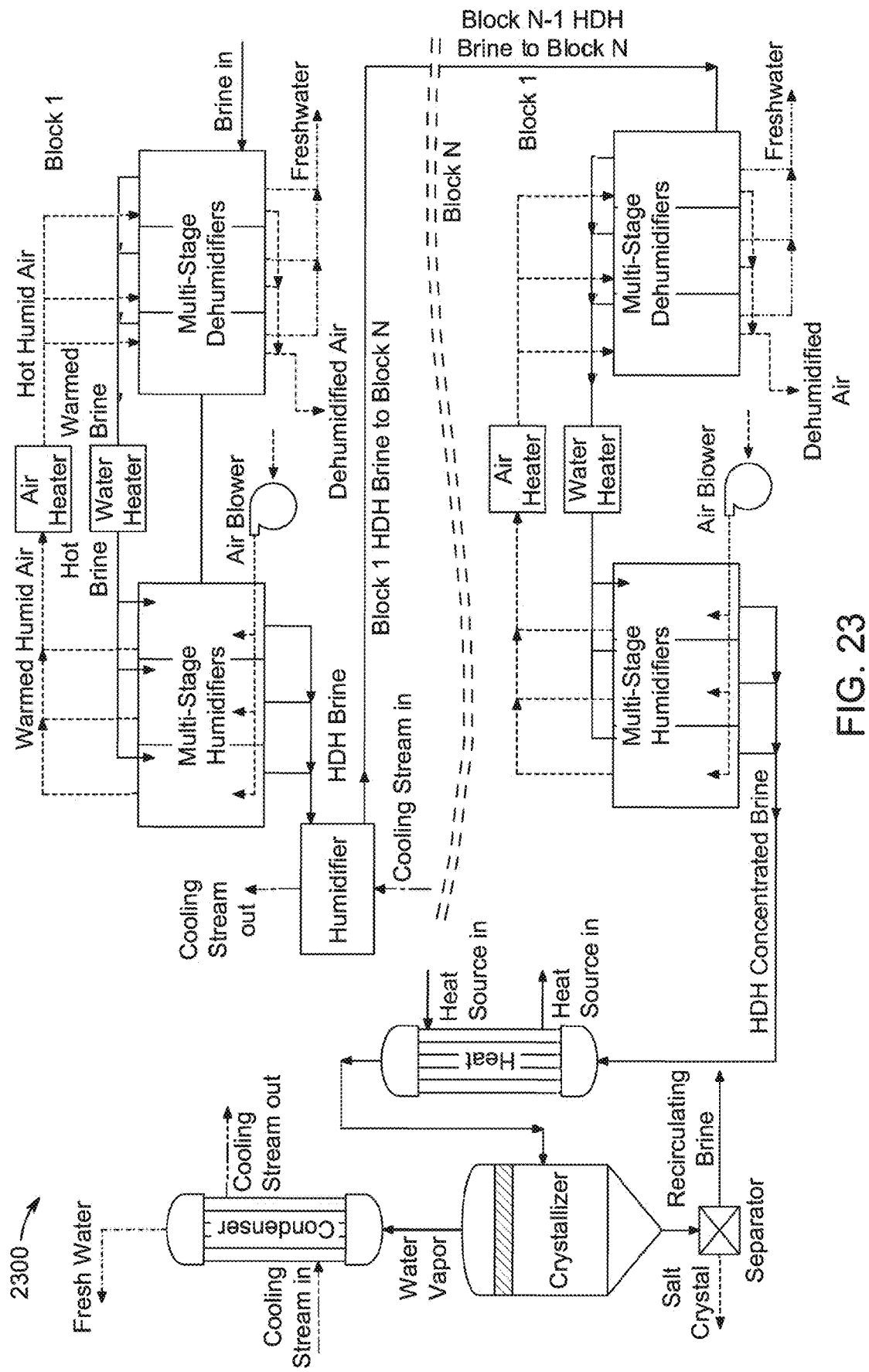
FIG. 23 is a schematic diagram of the zero liquid brine desalination and crystallization system implementing an opened-air, dual-heated, parallel flow multi-stage HDH process with a single-stage crystallizer and heat exchanger inter-block (OA-DH-P-HX), according to certain embodiments.

Referring now to FIG. 23, illustrated is a schematic diagram of a zero liquid brine desalination and crystallization system (as represented by reference numeral 2300, and hereinafter referred to as "system 2300") implementing a opened-air, dual-heated, parallel flow multi-stage HDH process with a single-stage crystallizer and heat exchanger inter-block (CA-DH-P-HX), according to certain embodiments. The system 2300 includes an HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. The heated brine stream exits the dehumidifiers to a water heater where it is heated to an elevated temperature, to be passed to the humidifiers. In this parallel configuration, the HDH desalination system operates with the saline water entering each stage at the same rate and at a constant temperature. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2300, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2300 also includes a heat exchanger disposed at each inter-block and utilized to decrease the brine temperature between blocks. The integration of the multi-stage humidifiers and dehumidifiers within the opened-air circuit ensures a continuous and efficient desalination process. The use of air heaters and water heaters enhances the transfer of water vapor within the humidifiers, while the multi-stage design improves the recovery of desalinated water from the carrier gas. Additionally, the heat exchangers effectively control the brine temperature between blocks, contributing to the overall efficiency and performance of the system 2300.

Figure 24:
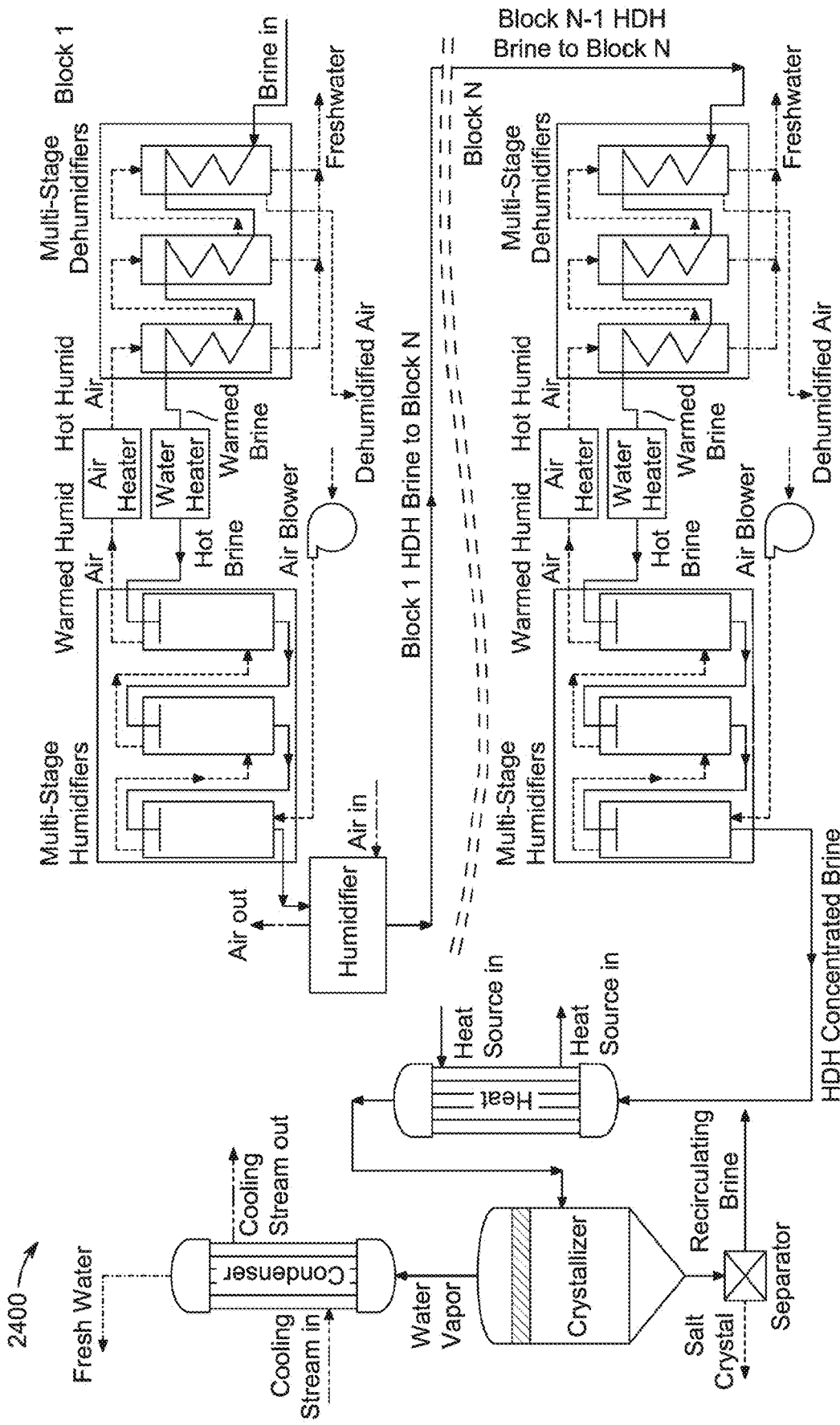
FIG. 24 is a schematic diagram of the zero liquid brine desalination and crystallization system implementing an opened-air, dual-heated, series flow multi-stage HDH process with a single-stage crystallizer and humidifier inter-block (OA-DH-S-HM), according to certain embodiments.

Referring now to FIG. 24, illustrated is a schematic diagram of a zero liquid brine desalination and crystallization system (as represented by reference numeral 2400, and hereinafter referred to as "system 2400") implementing a opened-air, dual-heated, series flow multi-stage HDH process with a single-stage crystallizer and humidifier inter-block (CA-DH-S-HM), according to certain embodiments. The system 2400 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2400, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2400 also includes a humidifier disposed at each inter-block and utilized to decrease the brine temperature between blocks. The integration of the multi-stage humidifiers and dehumidifiers within the opened-air circuit ensures a continuous and efficient desalination process. The use of air heaters and water heaters enhances the transfer of water vapor within the humidifiers, while the multi-stage design improves the recovery of desalinated water from the carrier gas. Additionally, the humidifiers at each inter-block effectively control the brine temperature, contributing to the overall efficiency and performance of the system 2400.

Figure 25:
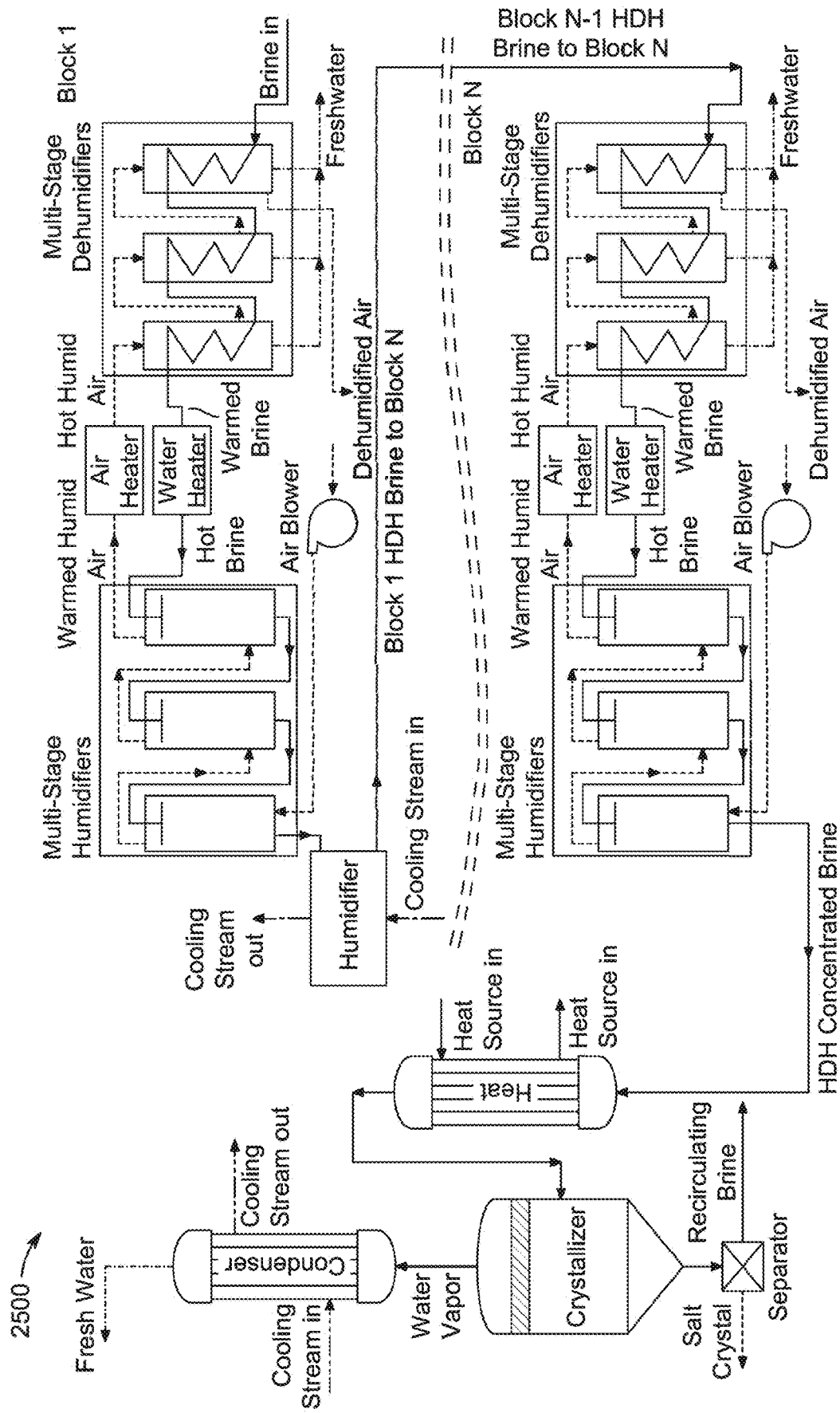
FIG. 25 is a schematic diagram of the zero liquid brine desalination and crystallization system implementing an opened-air, dual-heated, series flow multi-stage HDH process with a single-stage crystallizer and heat exchanger inter-block (OA-DH-S-HX), according to certain embodiments.

Referring now to FIG. 25, illustrated is a schematic diagram of a zero liquid brine desalination and crystallization system (as represented by reference numeral 2500, and hereinafter referred to as "system 2500") implementing a opened-air, dual-heated, series flow multi-stage HDH process with a single-stage crystallizer and heat exchanger inter-block (CA-DH-S-HX), according to certain embodiments. The system 2500 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The carrier gas is heated by an air heater before entering the dehumidifiers, ensuring efficient transfer of water vapor from the saline water to the carrier gas. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2500, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2500 also includes a heat exchanger disposed at each inter-block and utilized to decrease the brine temperature between blocks. The integration of the multi-stage humidifiers and dehumidifiers within the opened-air circuit ensures a continuous and efficient desalination process. The use of air heaters and water heaters enhances the transfer of water vapor within the humidifiers, while the multi-stage design improves the recovery of desalinated water from the carrier gas. Additionally, the heat exchangers at each inter-block effectively control the brine temperature, contributing to the overall efficiency and performance of the system 2500.

Figure 26:
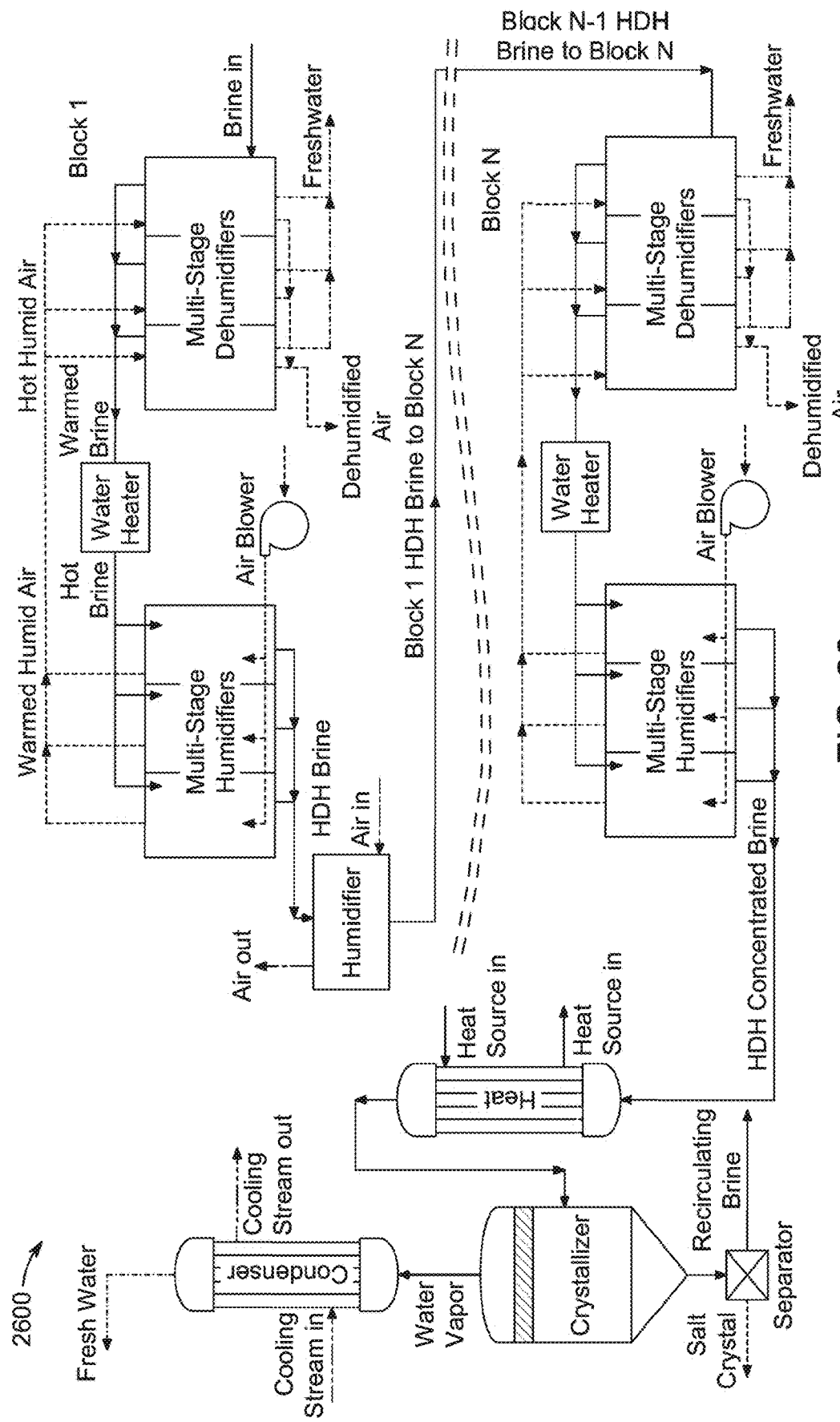
FIG. 26 is a schematic diagram of the zero liquid brine desalination and crystallization system implementing an opened-air, water-heated, parallel flow multi-stage HDH process with a single-stage crystallizer and humidifier inter-block (OA-WH-P-HM), according to certain embodiments.

Referring now to FIG. 26, illustrated is a schematic diagram of a zero liquid brine desalination and crystallization system (as represented by reference numeral 2600, and hereinafter referred to as "system 2600") implementing a opened-air, water-heated, parallel flow multi-stage HDH process with a single-stage crystallizer and humidifier inter-block (CA-WH-P-HM), according to certain embodiments. The system 2600 includes a HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2600, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2600 also includes a humidifier disposed at each inter-block and utilized to decrease the brine temperature between blocks. The integration of the multi-stage humidifiers and dehumidifiers within the opened-air circuit ensures a continuous and efficient desalination process. The use of air heaters enhances the transfer of water vapor within the humidifiers, while the multi-stage design improves the recovery of desalinated water from the carrier gas. Additionally, the humidifiers effectively control the brine temperature between blocks, contributing to the overall efficiency and performance of the system 2600.

Figure 27:
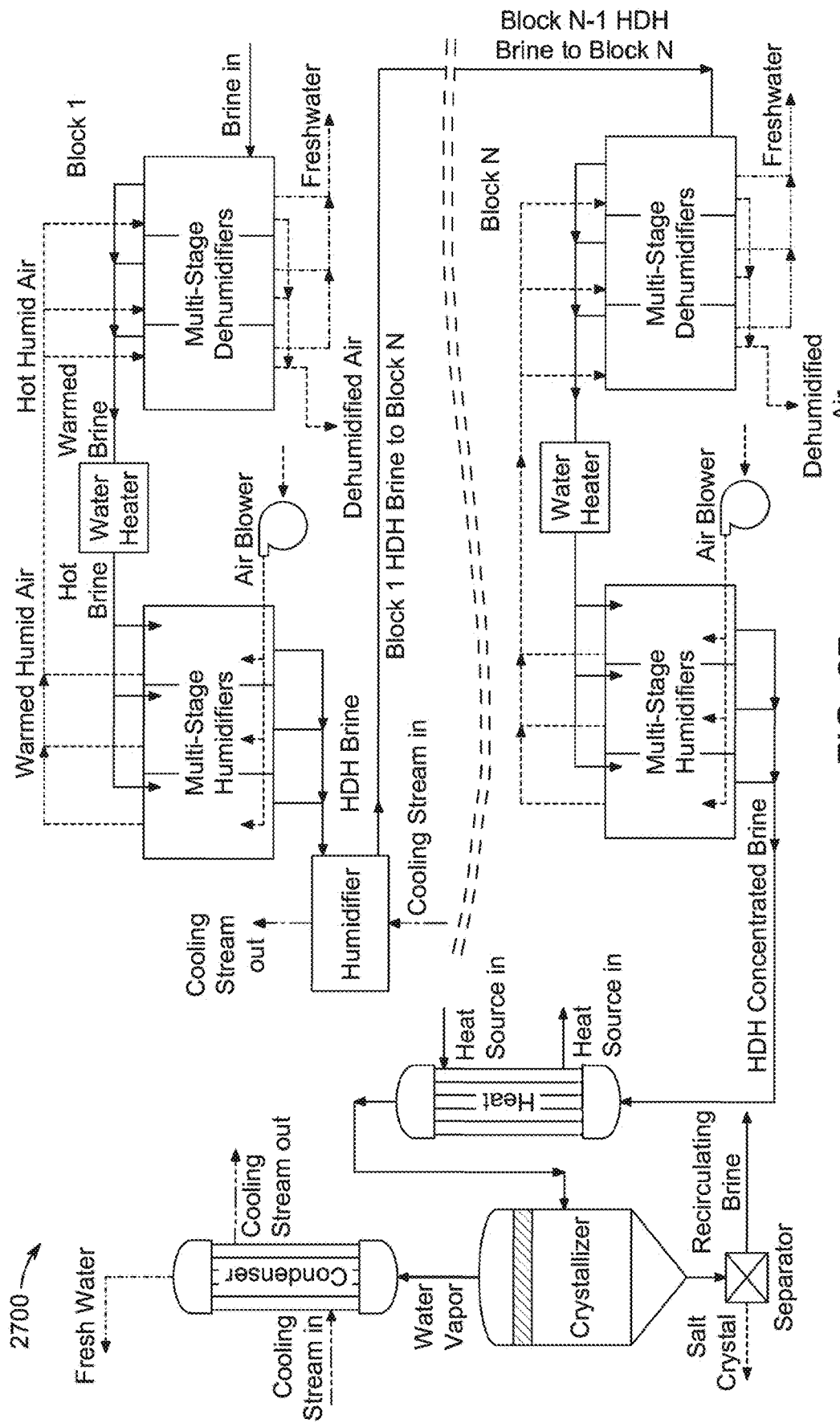
FIG. 27 is a schematic diagram of the zero liquid brine desalination and crystallization system implementing an opened-air, water-heated, parallel flow multi-stage HDH process with a single-stage crystallizer and heat exchanger inter-block (OA-WH-P-HX), according to certain embodiments.

Referring now to FIG. 27, illustrated is a schematic diagram of a zero liquid brine desalination and crystallization system (as represented by reference numeral 2700, and hereinafter referred to as "system 2700") implementing a opened-air, water-heated, parallel flow multi-stage HDH process with a single-stage crystallizer and heat exchanger inter-block (CA-WH-P-HX), according to certain embodiments. The system 2700 includes an HDH desalination system and a crystallization system. The HDH desalination system includes multiple blocks, arranged in series. Each block of the HDH desalination system includes multiple stages of humidifiers and dehumidifiers arranged in parallel. Each humidifier is configured to humidify a carrier gas using saline water, while each dehumidifier is configured to dehumidify the carrier gas to obtain desalinated water. The heated brine stream exits the dehumidifiers to a water heater where it is heated to an elevated temperature, to be passed to the humidifiers. In this parallel configuration, the HDH desalination system operates with the saline water entering each stage at the same rate and at a constant temperature. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2700, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers.

Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2700 also includes a heat exchanger disposed at each inter-block and utilized to decrease the brine temperature between blocks. The integration of the multi-stage humidifiers and dehumidifiers within the opened-air circuit ensures a continuous and efficient desalination process. The use of air heaters enhances the transfer of water vapor within the humidifiers, while the multi-stage design improves the recovery of desalinated water from the carrier gas. Additionally, the heat exchangers effectively control the brine temperature between blocks, contributing to the overall efficiency and performance of the system 2700.

Figure 28:
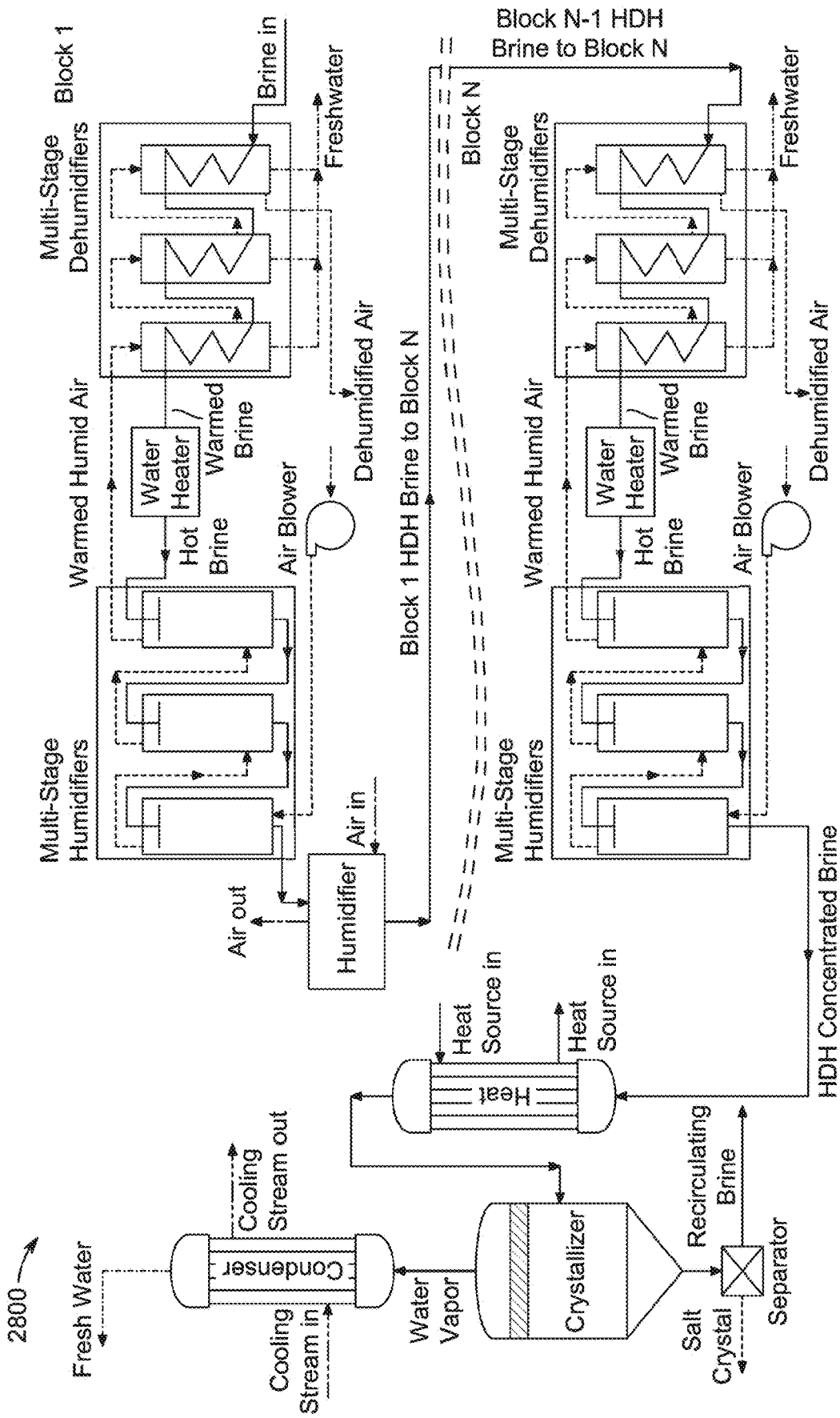
FIG. 28 is a schematic diagram of the zero liquid brine desalination and crystallization system implementing an opened-air, water-heated, series flow multi-stage HDH process with a single-stage crystallizer and humidifier inter-block (OA-WH-S-HM), according to certain embodiments.

Referring now to FIG. 28, illustrated is a schematic diagram of a zero liquid brine desalination and crystallization system (as represented by reference numeral 2800, and hereinafter referred to as "system 2800") implementing a opened-air, water-heated, series flow multi-stage HDH process with a single-stage crystallizer and humidifier inter-block (CA-WH-S-HM), according to certain embodiments. The system 2800 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2800, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2800 also includes a humidifier disposed at each inter-block and utilized to decrease the brine temperature between blocks. The integration of the multi-stage humidifiers and dehumidifiers within the opened-air circuit ensures a continuous and efficient desalination process. The use of air heaters enhances the transfer of water vapor within the humidifiers, while the multi-stage design improves the recovery of desalinated water from the carrier gas. Additionally, the humidifiers at each inter-block effectively control the brine temperature, contributing to the overall efficiency and performance of the system 2800.

Figure 29:
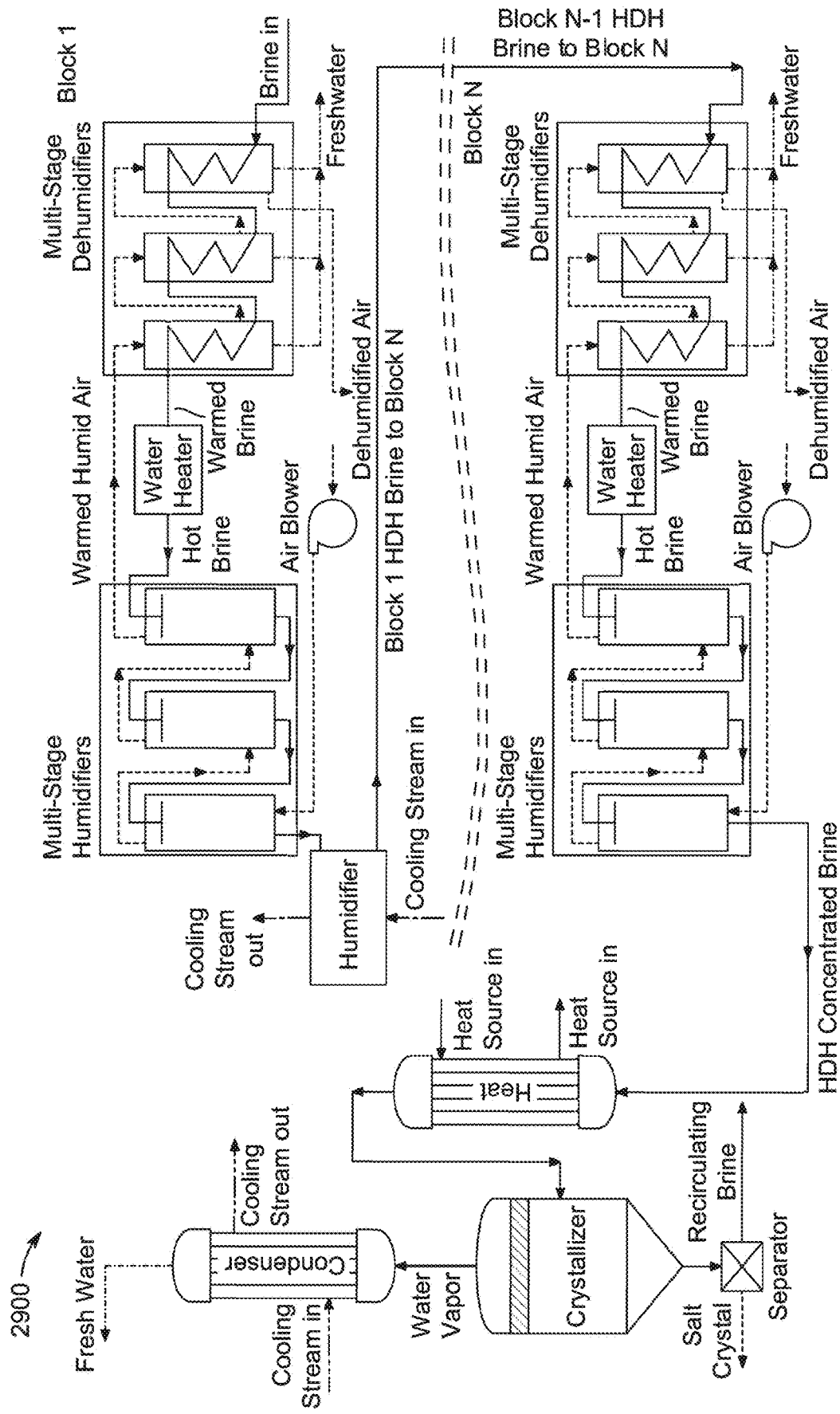
FIG. 29 is a schematic diagram of the zero liquid brine desalination and crystallization system implementing an opened-air, water-heated, series flow multi-stage HDH process with a single-stage crystallizer and heat exchanger inter-block (OA-WH-S-HX), according to certain embodiments.

Referring now to FIG. 29, illustrated is a schematic diagram of a zero liquid brine desalination and crystallization system (as represented by reference numeral 2900, and hereinafter referred to as "system 2900") implementing a opened-air, water-heated, series flow multi-stage HDH process with a single-stage crystallizer and heat exchanger inter-block (CA-WH-S-HX), according to certain embodiments. The system 2900 includes an HDH desalination system and a crystallization system. The HDH desalination system includes multiple blocks, arranged in series. Each block of the HDH desalination system includes multiple stages of humidifiers and dehumidifiers arranged in series. Each humidifier is configured to humidify a carrier gas using saline water, while each dehumidifier is configured to dehumidify the carrier gas to obtain desalinated water. The heated brine stream exits the dehumidifiers to a water heater where it is heated to an elevated temperature, to be passed to the humidifiers. In this series configuration, the HDH desalination system operates with the saline water entering each stage at a flow rate reduced by the amount of desalinated water produced in the previous stage. The feed temperature of each subsequent stage is also lower than the temperature of the previous stage. The humidified carrier gas exiting each humidifier is directed to the corresponding dehumidifier, where the water vapor is condensed to produce desalinated water. After each dehumidification stage, the carrier gas, now dehumidified, is exhausted.

Further, in the system 2900, the crystallization system is configured to receive the saline water from the HDH desalination system. The crystallization system includes an evaporation chamber, which is designed to produce salt crystals and water vapor from the saline water. The evaporation chamber receives the saline water exiting the dehumidifiers. Within the evaporation chamber, the saline water is further heated, causing water vapor to form and salt crystals to precipitate when cooled down. The produced water vapor from the evaporation chamber is directed to a condenser, which facilitates the condensation of the water vapor to obtain desalinated water. The condenser is configured to receive the water vapor from the evaporation chamber. Within the condenser, the water vapor undergoes a cooling process, causing it to condense into liquid desalinated water. Also, a separator is utilized to separate salt crystals and the resultant concentrated brine is mixed with the concentrated brine from the HDH desalination system.

The system 2900 also includes a heat exchanger disposed at each inter-block and utilized to decrease the brine temperature between blocks. The integration of the multi-stage humidifiers and dehumidifiers within the opened-air circuit ensures a continuous and efficient desalination process. The use of air heaters enhances the transfer of water vapor within the humidifiers, while the multi-stage design improves the recovery of desalinated water from the carrier gas. Additionally, the heat exchangers at each inter-block effectively control the brine temperature, contributing to the overall efficiency and performance of the system 2900.

The zero liquid brine desalination and crystallization system of the present disclosure, including a humidification dehumidification (HDH) desalination system, operates by mirroring the natural water cycle to produce desalinated water from saline water. The HDH desalination system includes a humidifier configured to humidify a carrier gas using saline water and a dehumidifier configured to dehumidify the carrier gas to obtain desalinated water. During the humidification phase, the saline water is heated to generate water vapor, which increases the humidity of the carrier gas. In the humidifier, the saline water evaporates, saturating the carrier gas with water vapor. The unevaporated saline water is discharged as brine from the bottom of the humidifier. The humidified carrier gas then proceeds to the dehumidification phase. In the dehumidification phase, the humidified carrier gas is cooled, causing the water vapor to condense back into liquid form. This condensed water is collected as desalinated water, while the remaining dehumidified carrier gas is cycled back into the system. The condensation typically occurs in a condenser or through cooling coils, where the humidified carrier gas contacts a surface cooler than its dew point, leading to condensation.

The HDH desalination system operates on the principle of vapor pressure difference between the saline water and the humidified carrier gas, efficiently transferring water vapor to produce desalinated water. Air heaters, water heaters, or dual stream heaters are used to elevate the temperature of the streams to the desired level, enhancing the efficiency of the humidification process. One advantage of the HDH desalination system is its simplicity and lower energy requirements compared to other desalination methods such as reverse osmosis. Additionally, it can utilize renewable energy sources, such as solar power, to heat the saline water, contributing to its environmental sustainability. The HDH desalination system is also adaptable for decentralized applications and can be scaled according to water demand, making it suitable for various regions facing water scarcity.

Further, the crystallization system within the zero liquid brine desalination and crystallization system, includes an evaporation chamber configured to produce salt crystals and water vapor from the saline water. In the crystallization process, the saline water is introduced into the evaporation chamber, where it is heated to elevate its temperature and promote evaporation. As the water evaporates, the concentration of dissolved solids in the solution increases until it reaches a supersaturated state, where it holds more dissolved solids than can remain in a stable solution. Upon reaching supersaturation, the solution undergoes controlled cooling or continued evaporation, prompting the dissolved solids to precipitate out as distinct salt crystals. These crystals are then separated in a separator and collected from the remaining liquid, known as the mother liquor or residual solution. The crystallization process can operate in various configurations, including batch, continuous, or semi-continuous modes, and is used across industries for recovering valuable products or managing waste streams effectively.

The zero liquid brine desalination and crystallization system, thus integrates the HDH desalination system and the crystallization system to achieve zero liquid discharge. By efficiently converting saline water into desalinated water and salt crystals, this system provides a robust and sustainable solution for water production and brine management, contributing to global efforts in enhancing water security and environmental sustainability.

In the present exemplary configurations of the zero liquid brine desalination and crystallization system, the system implements various configurations of a closed-air, multi-stage HDH process, including water-heated, air-heated, and dual-heated systems. Each configuration of the HDH desalination system includes a humidifier configured to humidify a carrier gas using saline water and a dehumidifier configured to dehumidify the carrier gas to obtain desalinated water.

In a closed-air, water-heated multi-stage HDH system, the saline water to be treated enters the HDH dehumidifiers and gets pre-heated by the condensing vapor arriving from the HDH humidifiers. The pre-heated saline water exits the dehumidifiers and is directed to the HDH water heater, where it is heated to an elevated temperature. The hot saline water is then sprayed in the humidifiers over the packed-bed materials, which increases the surface area for the humidification process. Part of the sprayed saline water evaporates, saturating the carrier gas moving through the humidifiers. The remaining saline water that does not evaporate is discharged as brine from the bottom of the humidifiers. The saturated carrier gas exits the humidifiers and enters the dehumidifiers, where the vapor is condensed to produce desalinated water. The dehumidified carrier gas then exits the dehumidifiers and is recirculated back to the humidifiers.

In a closed-air, air-heated multi-stage HDH system, the saline water to be treated enters the HDH dehumidifiers and is heated by the condensing vapor arriving from the HDH humidifiers. The heated saline water exits the dehumidifiers and is directed to the humidifiers. The hot saline water is sprayed in the humidifiers over the packed-bed materials, increasing the surface area for the humidification process. Part of the sprayed saline water evaporates, saturating the carrier gas moving through the humidifiers. The remaining saline water that does not evaporate is discharged as brine from the bottom of the humidifiers. The saturated carrier gas exits the humidifiers and is directed to the HDH air heater, where it is heated to an elevated temperature. The heated humidified carrier gas enters the dehumidifiers, where the vapor is condensed to produce desalinated water. The dehumidified carrier gas exits the dehumidifiers and is recirculated back to the humidifiers.

In a closed-air, dual-heated multi-stage HDH system, the saline water to be treated enters the HDH dehumidifiers and is heated by the condensing vapor arriving from the HDH humidifiers. The heated saline water exits the dehumidifiers and is directed to the HDH water heater, where it is heated to an elevated temperature. The hot saline water is sprayed in the humidifiers over the packed-bed materials, increasing the surface area for the humidification process. Part of the sprayed saline water evaporates, saturating the carrier gas moving through the humidifiers. The remaining saline water that does not evaporate is discharged as brine from the bottom of the humidifiers. The saturated carrier gas exits the humidifiers and is directed to the HDH air heater, where it is heated to an elevated temperature. The heated humidified carrier gas enters the dehumidifiers, where the vapor is condensed to produce desalinated water. The dehumidified carrier gas exits the dehumidifiers and is recirculated back to the humidifiers.

The crystallization system within the zero liquid brine desalination and crystallization system includes an evaporation chamber configured to produce salt crystals and water vapor from the saline water. In the evaporative crystallizer, the concentrated brine rejected from the HDH desalination system is mixed with a recirculating brine leaving the crystallizer and admitted into the crystallizer heater to elevate the brine temperature. The heated brine enters the evaporation chamber, where vapor is generated, and salt precipitation takes place. The generated vapor is condensed in an external condenser to produce desalinated water. The brine slurry from the evaporator is separated by the separator into salt crystals and recirculating brine.

In some embodiments, the air loop is opened, where the dehumidified carrier gas is discharged into the ambient from the dehumidifiers. In some cases, the carrier gas is heated before entering the humidifiers. Additionally, other types of humidifiers, crystallizers, separators, condensers, heat exchangers, and dehumidifiers may be adopted within the system. The multi-stage HDH system may be grouped into blocks with either humidifiers or heat exchangers, or their combination separating each block. The function of the inter-block humidifiers or heat exchangers is to control the saline water temperature entering a new block of the multi-stage HDH unit. In some embodiments, the multi-stage HDH unit may also be arranged without grouping them into blocks.

In some cases, the carrier gas and saline water flow in the multi-stage HDH system may be arranged in series, parallel, or mixed series and parallel configurations. The HDH and crystallization system may be configured as a single stage or multiple stages. The number of stages in the multi-stage HDH unit can be at least two, and the maximum number of stages depends on the difference in the effective brine concentration for the crystallizer. The effective brine concentration may be at least 200 g/L. Additionally, the crystallizer evaporator, condenser, heater, separators, inter-block humidifier, and inter-block heat exchanger may be single or multiple.

A storage tank may be included optionally. The storage tank, heat source, and generator can be configured in a closed path for a working fluid pumped by a pump, ensuring efficient and continuous operation of the system.

The following example demonstrates embodiments of the present disclosure. Those skilled in the art will realize that the examples given in the present disclosure are not an exhaustive list of the embodiments of the present disclosure. It may be noted that drawings in the following example was modeled to demonstrate the feasibility of the present disclosure. This example is for a multi-stage humidification dehumidification (HDH) unit integrated with an evaporative crystallizer (Cz). The schematic diagram of the current example is shown in FIGS. 6-9. In particular, herein, FIG. 6 provides an air heated parallel multi-stage HDH with single inter-block humidifiers (PMHDH-H); FIG. 7 provides an air heated parallel multi-stage HDH with single inter-block heat exchangers (PMHDH-HX); FIG. 8 provides an air heated series multi-stage HDH with single inter-block humidifiers (SMHDH-H); and FIG. 9 provides an air heated series multi-stage HDH with single inter-block heat exchangers (SMHDH-HX). In this example, a brine stream enters the first block of the HDH unit at 70 g/L and 30° C., and exits the last block of the HDH unit at 225 g/L. The HDH unit is composed of four blocks, with each block including three humidifiers, three dehumidifiers, and a single air heater. The brine temperature entering the next block is controlled by either a single humidifier or a single heat exchanger.

The systems in FIGS. 6-9 are evaluated in terms of productivity, Gained Output Ratio (GOR), Specific Electrical Energy Consumption (SEEC), Specific Thermal Energy Consumption (STEC), specific area (sA), and freshwater cost. The expression for these performance indicators is as follows:

$$GOR_{stand\,alone} = \frac{\sum \dot{m}_{fw} \times h_{fg}}{\sum \dot{Q}_{in,heater}} \quad (1)$$

$$GOR_{propsed\,system} = \frac{\sum \dot{m}_{fw} \times h_{fg} + \dot{D}_C \times h_{fg,c}}{\sum \dot{Q}_{in,HDH\,hfr} + \dot{Q}_{in,cry\,htr}} \quad (2)$$

$$SEEC = \frac{\text{Total electricity consumption}}{\dot{m}_{feed}} \quad (3)$$

$$STEC = \frac{(\dot{m}_{hc} \times h_{fg,hc}) + (\dot{m}_s \times h_{fg,hs})}{\dot{m}_{feed}} \quad (4)$$

$$sA = \frac{A_{heater} + A_{condenser}}{\dot{m}_{feed}} \quad (5)$$

The obtained model results are illustrated in FIGS. 30-39 for the PMHDH-H, PMHDH-HX, SMHDH-H, and SMHDH-HX systems, in accordance with embodiments of the present disclosure. The conditions that were employed included—Feed temperature=30° C.; Feed water flow rate=0.1 kg/s; Heat source temperature=75° C.; Inlet cooling water temperature=20° C.; Feed salinity=70 g/kg; Brine salinity=225 g/kg.

Figure 30:
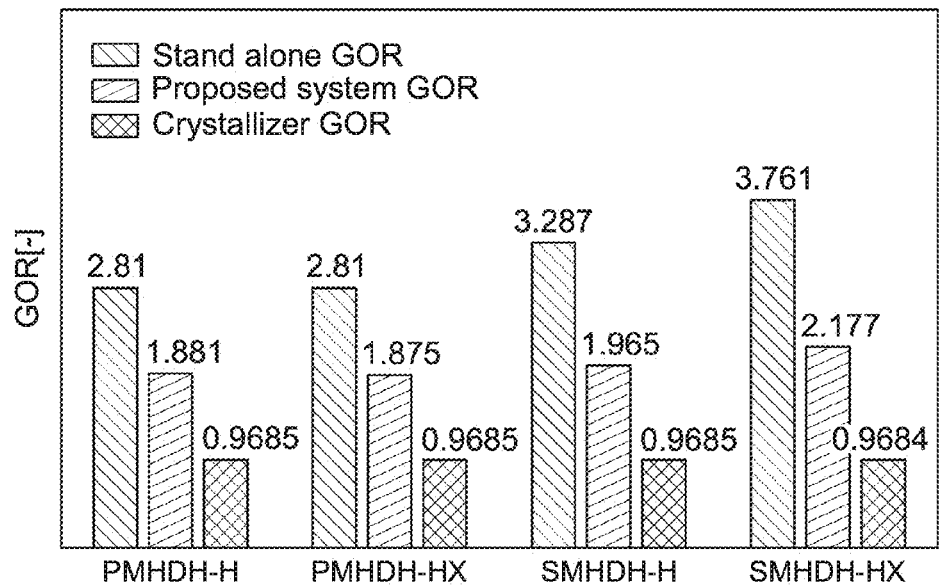
FIG. 30 is an exemplary graph depicting Gained Output Ratio (GOR) for standalone and crystallizer-integrated multi-stage HDH configurations, according to certain embodiments.

FIG. 30 illustrates gained output ratio for different investigated systems including a standalone HDH and/or crystallizer system. The graph depicts that series configurations demonstrate higher GOR values in contrast to their parallel counterparts. Among the various configurations, SMHDH-HX records the maximum GOR at 3.761, while the PMHDH-H and PMHDH-HX configurations exhibit the lowest GOR values, both at 2.81. This difference arises from the series configurations having a lower air temperature difference between the heater ends, leading to diminished energy requirements and consequently elevated GOR values. Additionally, the graph depicts the higher GOR values for the four configurations when integrated with a crystallizer to achieve Zero Liquid Discharge (ZLD). Notably, all configurations experience a lower GOR compared to their standalone system counterparts. This reduction primarily stems from the increased energy consumption associated with crystallizer.

Figure 31:
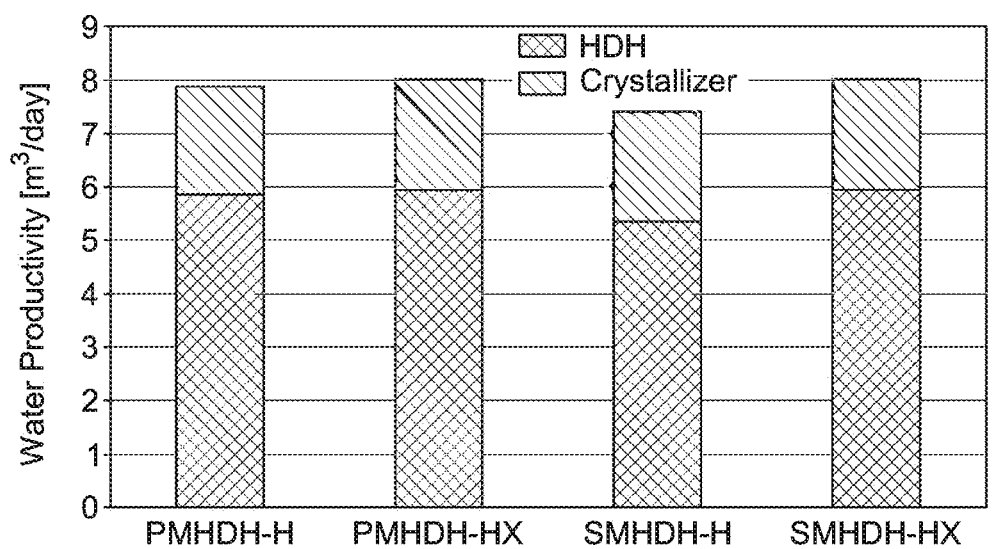
FIG. 31 is an exemplary graph depicting water productivity for the different ZLD-MHDH configurations, according to certain embodiments.

FIG. 31 illustrates rise in water output attributed to the implementation of the crystallizer for achieving Zero Liquid Discharge (ZLD) across the four distinct configurations. The graph underscores that the crystallizer can elevate water productivity by an average of 26.4% across the four configurations, surpassing the performance of the MHDH system when operating in isolation. Furthermore, the graph indicates that configurations incorporating a heat exchanger demonstrate superior productivity compared to those with a single humidifier situated between the blocks. This variance is ascribed to the single humidifier, which restricts the water flow to the subsequent block, thereby reducing the overall system productivity. The water productivity values are documented as 7.89, 8.036, 7.43, and 8.036 m³/day for PMHDH-H, PMHDH-HX, SMHDH-H, and SMHDH-HX, respectively.

Figure 32:
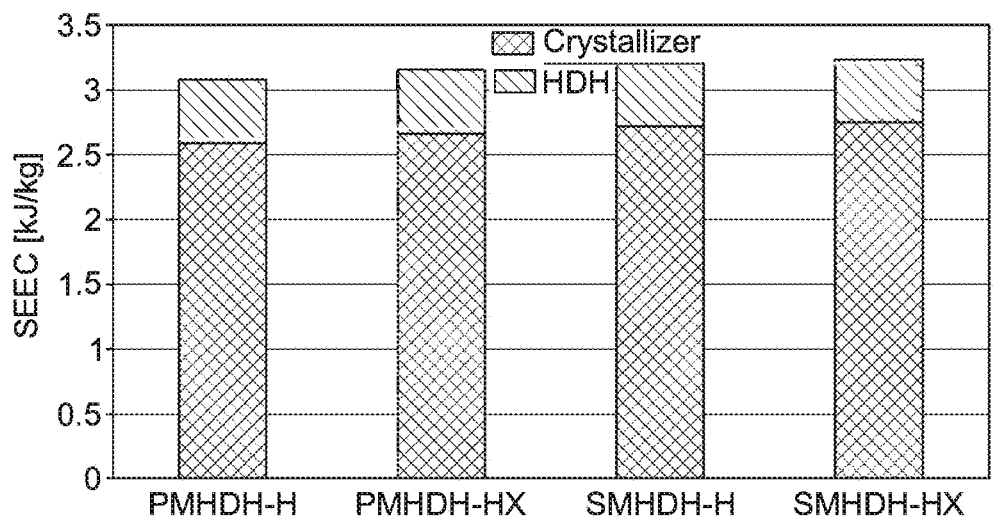
FIG. 32 is an exemplary graph depicting Specific Energy Consumption (SEEC) for considered four configurations, according to certain embodiments.
Figure 33:
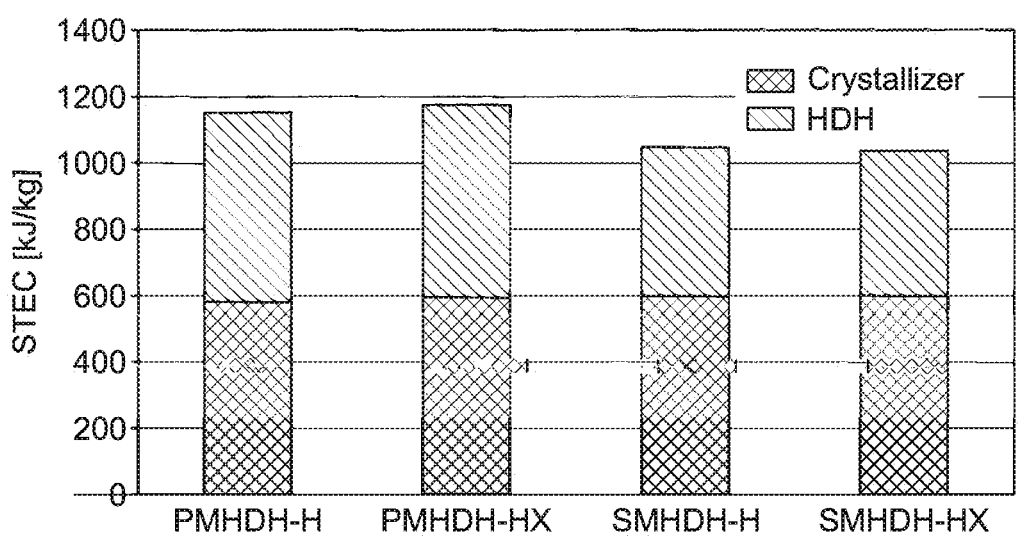
FIG. 33 is an exemplary graph depicting Specific Thermal Energy Consumption (STEC) in the different configurations, according to certain embodiments.
Figure 34:
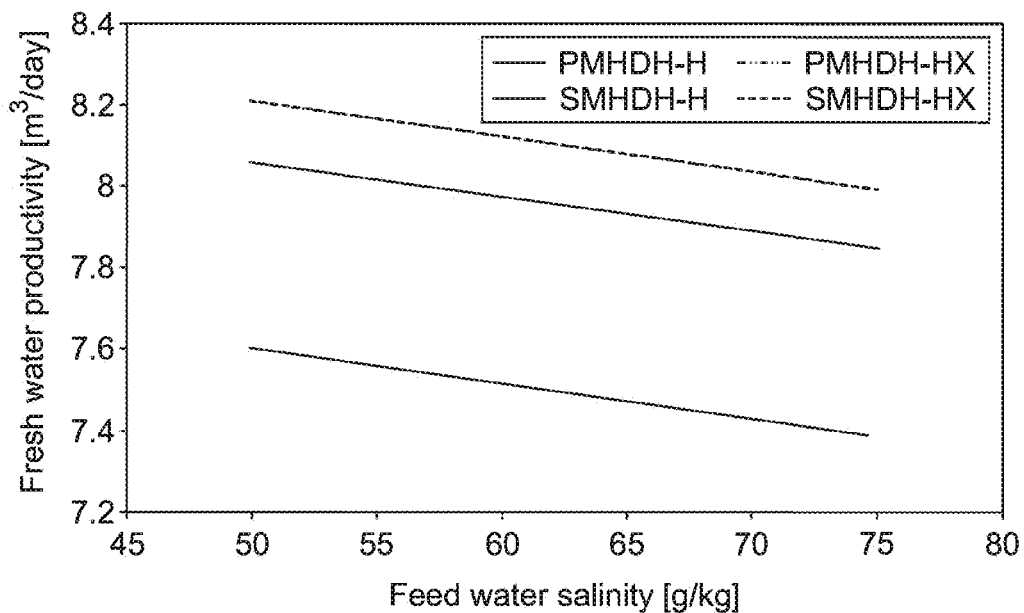
FIG. 34 is an exemplary graph depicting impact of feed salinity on total water productivity, according to certain embodiments.

FIG. 32 illustrates Specific Energy Consumption (SEEC) for the four arrangements of the investigated systems. The graph highlights that a notable portion of electricity consumption is allocated to the crystallizer, constituting approximately 85% of the energy consumption in the system across all configurations. FIG. 33 illustrates Specific Thermal Energy Consumption (STEC) for the four configurations. The graph indicates that parallel configurations demonstrate higher STEC values. This difference stems from the increased temperature difference between the heater ends in the parallel configurations compared to the series configurations, resulting in higher thermal energy consumption in the heater. Moreover, the graph emphasizes the significant thermal consumption associated with the crystallizer in all configurations. FIG. 34 illustrates influence of feed salinity on the total water productivity across the four systems. The graph indicates that an elevation in water salinity results in a reduction in water productivity for all four configurations. Particularly, PMHDH-HX and SMHDH-HX consistently exhibit higher productivity compared to the other two configurations. For instance, as the feed salinity increases from 50 to 75 g/kg, the productivity declines from 8.058, 8.208, 7.603, and 8.208 m$^3$/day to 7.848, 7.992, 7.387, and 7.992 g/kg for PMHDH-H, PMHDH-HX, SMHDH-H, and SMHDH-HX, respectively. This pattern can be attributed to the rise in salt content, resulting in decreased water productivity.

Figure 35:
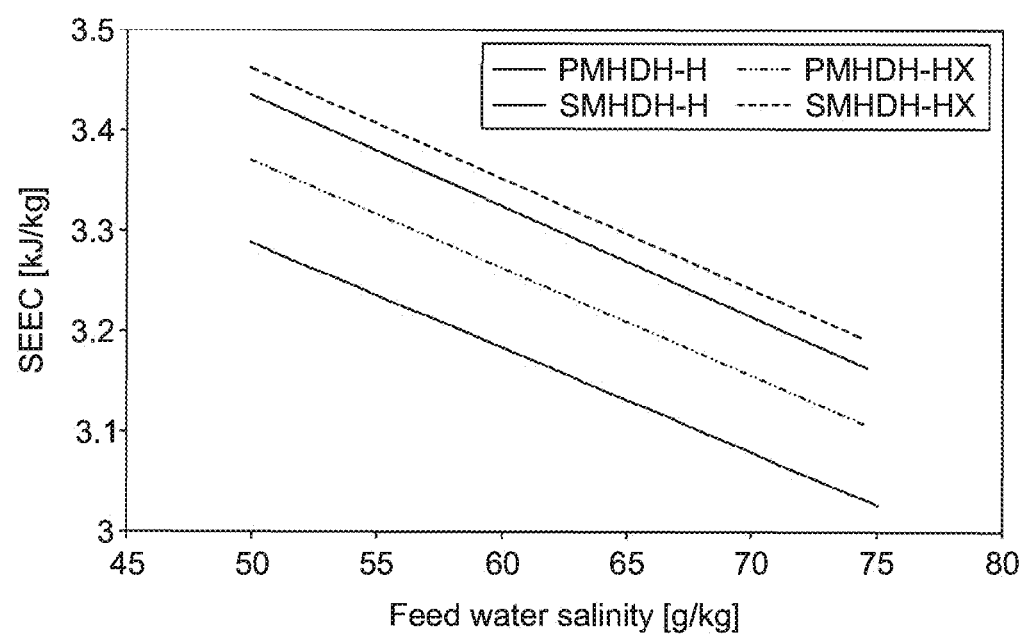
FIG. 35 is an exemplary graph depicting impact of feed salinity on SEEC in various configurations, according to certain embodiments.

FIG. 35 illustrates impact of feed salinity on SEEC (Specific Energy Consumption) across all four configurations. The graph underscores that an elevation in feed salinity corresponds to a decrease in SEEC. This decline can be ascribed to the diminished circulation of fluids within the crystallizer, leading to reduced pumping power requirements and, consequently, lower SEEC. Furthermore, the figure reaffirms the observation that parallel configurations consistently demonstrate lower SEEC compared to the series configurations at a 75° C. heat source temperature.

Figure 36:
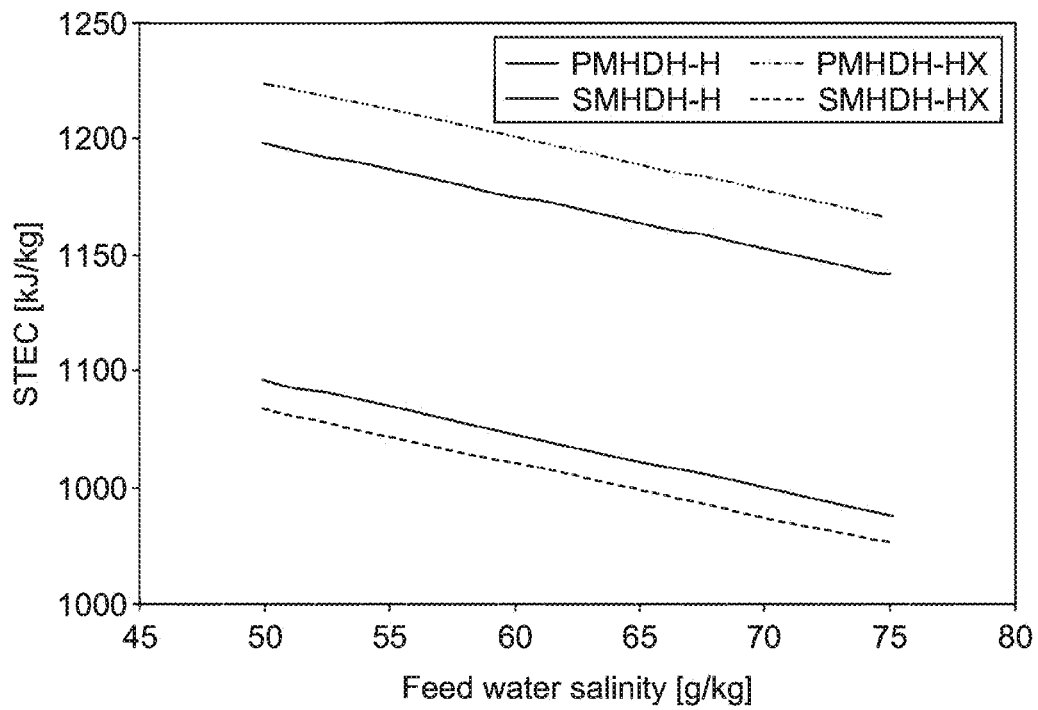
FIG. 36 is an exemplary graph depicting influence of feed salinity on STEC (Specific Total Energy Consumption), according to certain embodiments.

FIG. 36 illustrates influence of feed salinity on STEC for all configurations. The graph provides that elevating the feed salinity results in a reduction in STEC across all configurations. For example, as the feed salinity increases, STEC decreases from 1198, 1224, 1096, and 1084 to 1142, 1166, 1038, and 1026 kJ/kg for PMHDH-H, PMHDH-HX, SMHDH-H, and SMHDH-HX, respectively. Additionally, the graph reaffirms previous findings that parallel configurations consistently exhibit higher STEC compared to the series configurations.

Figure 37:
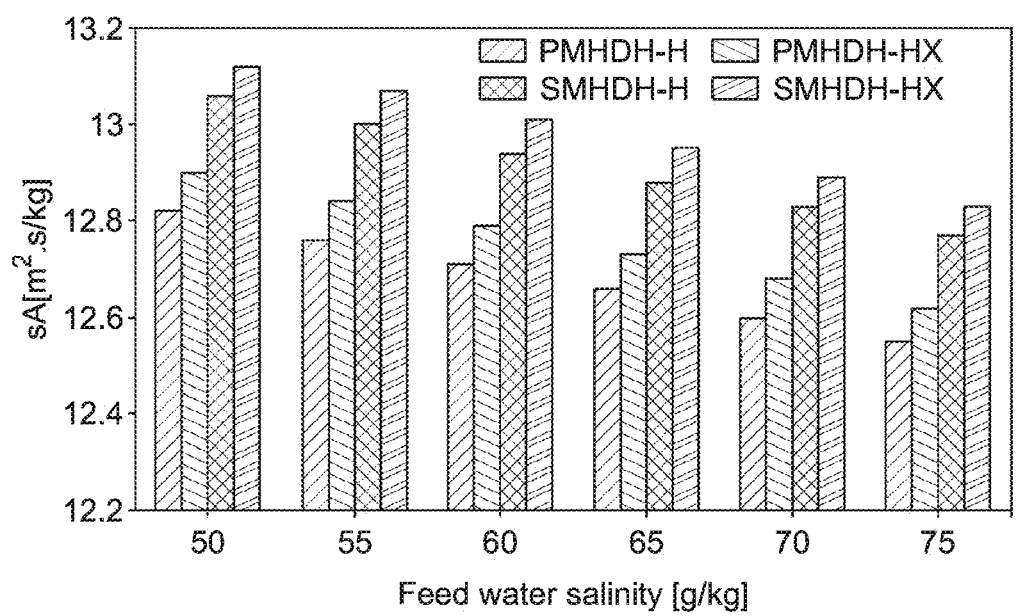
FIG. 37 is an exemplary graph depicting influence of feed salinity on specific heat transfer area in the different configurations, according to certain embodiments.

FIG. 37 illustrates influence of feed salinity on the specific heat transfer area. The graph indicates that an elevation in feed salinity corresponds to a reduction in the specific heat transfer area for all configurations. This trend arises from the decreased flow rate to the crystallizer due to the higher salinity, resulting in a diminished transfer area. Additionally, the graph underscores that parallel configurations demonstrate a lower transfer area compared to the series configurations. This difference can be attributed to the higher cooling water flow rate required by series configurations compared to parallel configurations, necessitating a larger transfer area.

Figure 38:
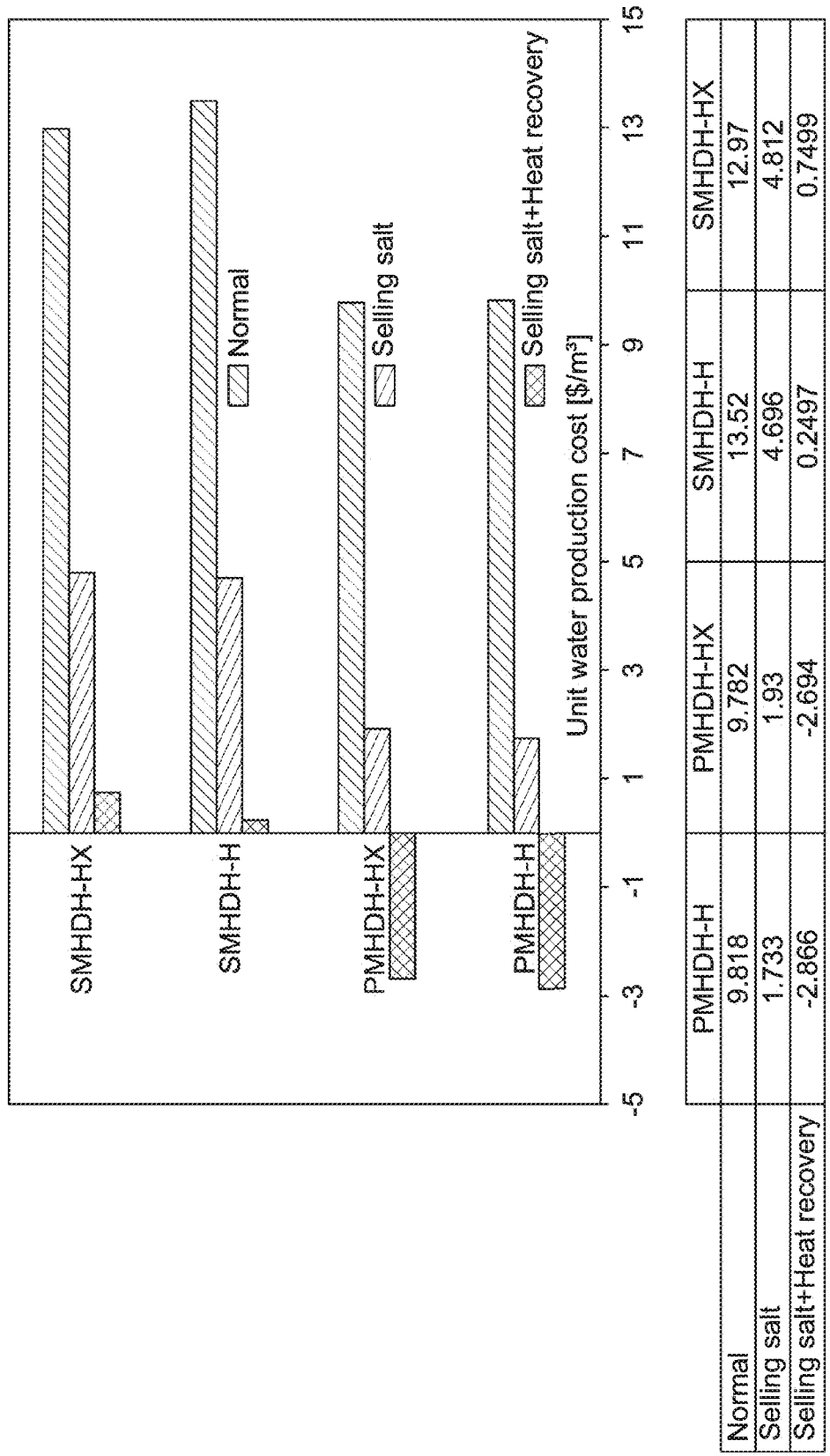
FIG. 38 is an exemplary graph depicting unit water production cost as a function of salt selling price, according to certain embodiments.

FIG. 38 illustrates unit water production costs for the proposed systems under three scenarios: the normal scenario accounts for production-related costs only, the selling salt scenario involves selling salt at 90 $/tonne, and the third scenario combines selling salt with utilizing a waste heat source, thereby eliminating costs associated with thermal energy demands in the crystallizer and HDH heaters. The graph depicts that series configurations generally incur higher freshwater cost compared to parallel configurations across all scenarios. Notably, selling salt significantly reduces the freshwater production costs by 82.35%, 80.27%, 65.27%, and 62.90% for MHDH-H, MHDH-HX, SHDH-H, and SHDH-HX configurations, respectively. An intriguing outcome arises in the third scenario, where selling salt and utilizing waste heat simultaneously yield profits in parallel configurations of 2.866 $/m$^3$ and 2.694 $/m$^3$ for MHDH-H and MHDH-HX, respectively. These results for the PMHDH-H and PMHDH-HX configurations, when utilizing waste heat, indicate that the produced freshwater can be distributed at no cost, while the produced salt crystals can be sold at an even lower price of 58.09 $/tonne and 57.04 $/tonne, respectively. Additionally, the freshwater production costs are remarkably low at 0.2497 $/m$^3$ and 0.7499 $/m$^3$ for SHDH-H and SHDH-HX configurations, respectively, in the third scenario of using waste heat.

Figure 39:
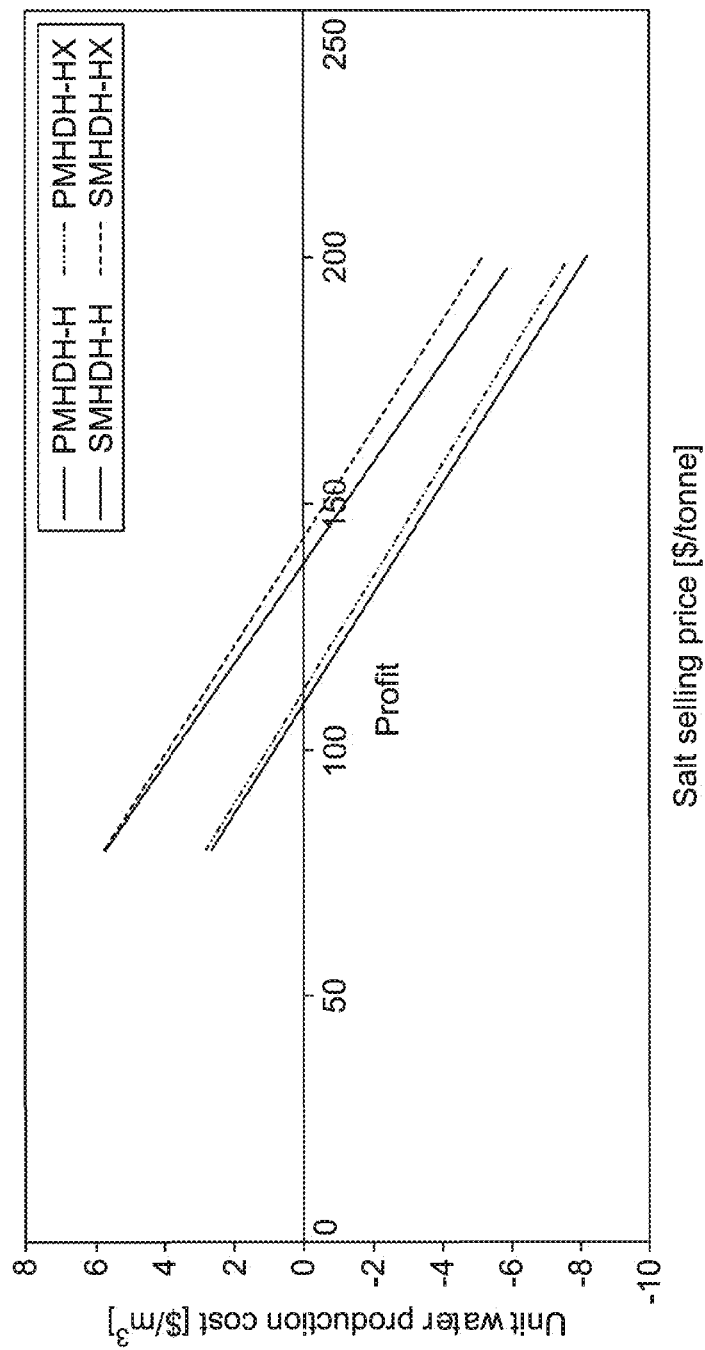
FIG. 39 is an exemplary graph depicting influence of salt selling price on freshwater production cost, according to certain embodiments.

FIG. 39 illustrates influence of salt selling price on freshwater production cost. The graph depicts a higher salt price corresponds to a lower freshwater production cost. The graph confirms the consistent trend wherein series configurations exhibit higher freshwater production costs compared to parallel configurations, for example due to the larger equipment size required in series configurations. Moreover, the figure highlights a crucial threshold indicating when production becomes profitable. For parallel configurations, this occurs within the range of 100 $/tonne to 120 $/tonne of salt, while for series configurations, it falls within the range of 130 $/tonne to 150 $/tonne. Beyond these price points, the increasing salt selling price contributes to the overall profitability of the production process.

In general, the present disclosure relates to a Humidification Dehumidification Desalination and Crystallizer (HDH-Cz) system and process for Zero Liquid Discharge (ZLD) desalination brine application. The Zero Liquid Discharge system and process include a humidification dehumidification (HDH) system and process and a crystallization (Cz) system and process. The humidification dehumidification system and process include a humidifier for generating humid air and a dehumidifier for condensing vapor from the humid air. The humidifier may be partly filled with packed-bed materials or brine stream (bubble column) and the dehumidifier may be equipped with a heat exchanger or clean water (bubble column). HDH heater may be present for heating the feed brine stream to the desired temperature. The heater may be connected to a heat source. An additional heat exchanger or additional humidifier may be present for controlling the feed brine stream temperature. The crystallization system and process include an evaporation chamber for generating vapor and salt precipitation, an external condenser for condensing vapor, a separator for separating salt crystals from brine slurry, and an external heater for increasing the brine temperature entering the evaporation chamber. The external heater is connected to a heat source. The Cz and HDH systems and process may be configured in a single stage or multiple stages. The Cz and HDH systems are connected to the heat sources for heating the HDH brine stream and Cz brine stream. The external heater, external condenser, additional heat exchanger or additional humidifier, Cz and HDH contain pumps for moving the brine and other streams in the system. The additional humidifier, HDH may contain a blower for moving the air/carrier gas in the system. The present disclosure can be employed for freshwater production, brine concentration, and salt crystal production, in addition to mitigating the environmental hazard through zero discharge of brine to the environment.

More specifically, the present disclosure provides an HDH-Cz zero liquid discharge system and process with inter-block cooling for water and salt crystals production. The HDH system includes a humidifier, a dehumidifier, and a heater. The crystallizer system includes a heater, an evaporation chamber, a condenser, and a separator. The inter-block cooling may include a humidifier or a heat exchanger. HDH-Cz integration improves energy efficiency when compared against a stand-alone crystallizer. The HDH system operates on the principle of vapor pressure difference between seawater/brine and humidified air, efficiently transferring water vapor to produce freshwater. The brine stream to be treated and air stream may be configured in a closed cycle/loop, open loop/cycle, or mixed cycle(s)/loop(s). For a closed cycle(s)/loop(s), the brine stream is recirculated together with a replenished brine stream. The brine stream to be treated and air stream may be configured in a parallel flow, series flow, or mixed parallel and series flow. The HDH concentrates the brine and produces desalinated water. The crystallizer precipitates the concentrated brine and produces desalinated water. The separator yields salt crystals and recirculating brine.

The heaters, condensers, evaporators, and heat exchangers may be any type which may be plate heat exchangers, tube-in-tube heat exchangers, shell and tube heat exchangers, plate and shell heat exchangers, plate fin heat exchangers, double tube heat exchangers, adiabatic wheel heat exchangers, finned tube heat exchangers, and other heat exchanger variants. The humidifiers may be any type which may be packed-bed, bubble column, spray type, ultrasonic humidifiers, central humidifiers, evaporative humidifiers, impeller humidifiers, steam vaporizers, and other humidifier variants. The packed-bed materials may be any type which may be structured packing, Raschig rings, random packing, Berl saddles, pall rings, metal packing, Intalox saddles, ceramic packing, plastic packing, and other packed-bed material variants. The dehumidifiers may be any type which may be packed-bed, bubble column, spray type, direct heat exchangers, indirect heat exchangers, refrigerative dehumidifiers, desiccant dehumidifiers, and other dehumidifier variants. The crystallizers may be any type which may be Swenson-Walker crystallizers, evaporative crystallizers, batch crystallizers, forced circulation crystallizers, mixed-suspension mixed-product removal (MSMPR) crystallizers, continuous crystallizers, and other crystallizer variants. The separators may be any type which may be centrifugal separators, decanters, gravity settlers, flotation cells, filtration systems, magnetic separators, cyclonic separators, electrostatic separators, and other separator variants. The blowers may be any type which may be centrifugal blowers, roots blowers, axial flow fans, screw blowers, high-speed turbo blowers, regenerative blowers, crossflow fans, and other blower variants. The water pumps may be any type which may be centrifugal pumps, diaphragm pumps, submersible pumps, positive displacement pumps, mixed flow pumps, axial flow pumps, jet pumps, and other pump variants.

Feed streams such as sea water, waste water, brackish water, brine, flowback/produced water, desalination brine, fruit juices, blood, milk, dyes, harmful waste flows, and other feed streams may be treated by the proposed system. Flows in the humidifier, dehumidifier, heater, condenser, evaporation, separator, and heat exchanger compartments may be vertical, horizontal, or inclined. HDH-Cz includes a heat exchanger, humidifier, and condenser for heat transport between medium (brine stream, coolant stream, and heat source). The HDH-Cz system and process may be of a single stage or multiple stages. The number of stages in the multi-stage HDH unit can be at least two, and the maximum number of stages depends on the difference in the effective brine concentration for the crystallizer. The effective brine concentration may be at least 200 g/L. The HDH-Cz in a multi-stage HDH system may be grouped into blocks with either humidifiers or heat exchangers, or their combination separating each block. The function of the inter-block humidifiers or heat exchangers is to control the brine temperature entering a new block of the multi-stage HDH unit. In some embodiments, the multi-stage HDH unit may also be arranged without grouping them into blocks. In some cases, the air and brine flow in the multi-stage HDH may be in series arrangement, parallel arrangement, or mixed series and parallel configurations. The HDH-Cz system and process may be of a single stage or multiple stages. The number of stages in the multi-stage HDH unit can be at least two, and the maximum number of stages depends on the difference in the effective brine concentration for the crystallizer. The effective brine concentration may be at least 200 g/L. The crystallizer evaporator, condenser, heater, separators, inter-block humidifier, and inter-block heat exchanger may be single or multiple. A storage tank is optional, and the storage tank, heat source, and evaporator can be configured in a closed path for a working fluid pumped by a pump.

In some cases, the intake feed stream is pre-heated in the dehumidifier(s) by the warm/hot humidified air entering the dehumidifier. The crystallizer, heater, heat exchanger, condenser, separator, as well as humidifier may be single or multiple. The heat source to the HDH and crystallizer may be provided by renewable energy sources such as solar collectors. It may also be provided by the waste heat from other processes, gas heaters, and low-grade energy sources, or their combinations. The proposed system can be deployed in desalination, textile, chemical, and pharmaceutical industries for the purification of water. It can be used in milk processing, fruit juice concentration, and dye removal. Concentration of oil-in-water emulsions, non-volatile acids, and cooling liquids (glycols). It can be used in biomedical applications (e.g., the removal of pure water from blood and protein solutions). Used in separating azeotropic aqueous mixes (separation of alcohol and water mixtures). The proposed system can also be deployed in applications where high-temperature processing causes thermal degradation of the process flow and is more generally used for the treatment of wastewater. It can be applied in produced water treatment, brine mining, and zero liquid discharge applications. The stream to be treated and coolant stream may be configured in a closed cycle/loop, open loop/cycle, or mixed cycle(s)/loop(s). For a closed cycle(s)/loop(s), the feed stream is recirculated together with the replenished stream. For an open cycle/loop, the feed stream exits the HDH to crystallizer.

Brine liquid in the humidifier chamber(s) may flow under dynamic and forced flow conditions by using a variable pumping and control system to reach the desired flow rate. The brine liquid in the humidifier chamber(s) may flow naturally under gravity. The brine liquid in the crystallizer(s) may flow under dynamic and forced flow conditions by using a variable pumping and control system to reach the desired flow rate. The brine liquid in the crystallizer chamber(s) may flow naturally under gravity. The feed liquid to be treated may be salty water, ocean/sea water, rejected desalination brine, grey water wastewater, brackish water, flowback/produced water, fruit juices, blood, milk, dyes, harmful waste flows, and other similar feed liquids. The heat source to the humidification dehumidification (HDH) heater may be provided by renewable energy sources such as solar collectors. It may also be provided by the waste heat from other processes, gas heaters, and low-grade energy sources, or their combinations. The heat source to the crystallizer (Cr) heater may be provided by renewable energy sources such as solar collectors. It may also be provided by the waste heat from other processes, gas heaters, and low-grade energy sources, or their combinations. The multi-stage humidification dehumidification apparatus may include multiple humidifier(s) housing with single or multiple internal cavities and packed-bed materials or bubble column humidifier;

multiple dehumidifier(s) housing with single or multiple internal cavities, heat exchanger(s), packed-bed materials or bubble column dehumidifier; single or multiple additional humidifier(s) housing with single or multiple internal cavities and packed-bed materials or bubble column humidifier(s); and single or multiple additional heat exchanger(s).

Herein, for each stage of the multi-stage HDH-Cz, a feed brine inlet is fluidly connected to the dehumidifier chambers for receiving a brine stream to the dehumidifier chambers; a feed brine outlet is fluidly connected to the dehumidifier chambers for discharging the pre-heated brine stream from the dehumidifier chambers. For each stage of the multi-stage HDH-Cz, a humidified air inlet is fluidly connected to the dehumidifier chambers for receiving humidified air to the dehumidifier chambers; a humidified air outlet is fluidly connected to the dehumidifier chambers for discharging the dehumidified air stream from the dehumidifier chambers; a freshwater outlet is fluidly connected to the dehumidifier chambers for discharging the freshwater stream from the dehumidifier chambers.

For each stage of the single stage or multi-stage HDH-Cz, a brine inlet is fluidly connected to the HDH heater chamber(s) for receiving a pre-heated brine stream to the heater chamber(s); a brine outlet is fluidly connected to the heater chamber(s) for discharging the heated brine stream from the heater chamber(s); a heat source inlet/outlet is fluidly connected to the heater chamber(s) for meeting thermal demand in the HDH heater chamber(s).

For each stage of the multi-stage HDH-Cz, a brine inlet is fluidly connected to the humidifier chambers for receiving a hot brine stream to the humidifier chambers; a brine outlet is fluidly connected to the humidifier chambers for discharging the concentrated brine stream from the humidifier chambers. For each stage of the multi-stage HDH-Cz, an air inlet is fluidly connected to the humidifier chambers for receiving an air stream to the humidifier chambers; an air outlet is fluidly connected to the humidifier chambers for discharging the humidified air stream from the humidifier chambers.

For each stage of the multi-stage HDH-Cz, a brine inlet is fluidly connected to the additional humidifier chamber(s) with air supply or additional heat exchanger(s) with coolant, for receiving a hot brine stream to the additional humidifier chamber(s) or additional heat exchanger(s); a brine outlet is fluidly connected to the additional humidifier chamber(s) with air supply or additional heat exchanger(s) with coolant, for discharging the concentrated brine stream from the additional humidifier chamber(s) or additional heat exchanger(s).

The above stages form the first block of brine concentration. More/additional blocks may be added until the required brine concentration is reached. The required brine concentration is reached when the brine concentration is appropriate for an efficient and effective crystallization process. The steps below describe the flow in the HDH-Cz for achieving additional freshwater and salt crystals.

For each stage of the single stage or multi-stage HDH-Cz, a concentrated brine or a brine recirculation inlet is fluidly connected to the Cz heater chamber(s) for receiving a concentrated brine or brine recirculation stream to the Cz heater chamber(s); a concentrated brine outlet is fluidly connected to the Cz heater chamber(s) for discharging the heated concentrated brine stream from the Cz heater chamber(s); a heat source inlet(s)/outlet(s) is fluidly connected to the heater chamber(s) for meeting thermal demand in the Cz heater chamber(s).

For each stage of the multi-stage HDH-Cz, a heated concentrated brine inlet is fluidly connected to the Cz evaporator chambers for receiving a heated concentrated brine stream to the evaporator chambers; a brine slurry outlet is fluidly connected to the evaporator chamber(s) for discharging the brine slurry from the Cz evaporator chambers; a water vapor outlet is fluidly connected to the evaporator chamber(s) for discharging the water vapor from the Cz evaporator chambers.

For each stage of the multi-stage HDH-Cz, a water vapor inlet is fluidly connected to the Cz condenser chamber(s) for receiving a vapor stream to the Cz condenser chamber(s); a freshwater outlet is fluidly connected to the Cz condenser chamber(s) for discharging the freshwater from the Cz condenser chamber(s); a coolant inlet is fluidly connected to the Cz condenser chamber(s) for receiving a coolant stream to the Cz condenser chamber(s); a coolant outlet is fluidly connected to the Cz condenser chamber(s) for discharging the coolant from the Cz condenser chamber(s).

For each stage of the multi-stage HDH-Cz, a brine slurry inlet is fluidly connected to the Cz separator chamber(s) for receiving a brine slurry to the separator chamber(s); a brine recirculation outlet is fluidly connected to the separator chamber(s) for discharging the brine recirculation from the Cz separator chamber(s); a salt crystals outlet is fluidly connected to the separator chamber(s) for discharging the salt crystals from the Cz separator chamber(s). The Cz separator may be a centrifuge or any other separator(s).

The brine stream to be treated and air stream may be configured in a closed cycle/loop, open loop/cycle, or mixed cycle(s)/loop(s). For a closed cycle(s)/loop(s), the brine stream is recirculated together with a replenished brine stream. The brine stream to be treated and air stream may be configured in a parallel flow, series flow, or mixed parallel and series flow. The HDH concentrates the brine and produces desalinated water, for example, for drinking. The crystallizer precipitates the concentrated brine and produces desalinated water, for example, for drinking.

In the present disclosure, the heaters, condensers, evaporators, and heat exchangers may be any type, which may include plate heat exchangers, tube-in-tube heat exchangers, shell and tube heat exchangers, plate and shell heat exchangers, plate fin heat exchangers, double tube heat exchangers, adiabatic wheel heat exchangers, finned tube heat exchangers, and other heat exchanger variants. The humidifiers may be any type, which may include packed-bed, bubble column, spray type, ultrasonic humidifiers, central humidifiers, evaporative humidifiers, impeller humidifiers, steam vaporizers, and other humidifier variants. The packed-bed materials may be any type, which may include structured packing, Raschig rings, random packing, Berl saddles, pall rings, metal packing, Intalox saddles, ceramic packing, plastic packing, and other packed-bed material variants. The dehumidifiers may be any type, which may include packed-bed, bubble column, spray type, direct heat exchangers, indirect heat exchangers, refrigerative dehumidifiers, desiccant dehumidifiers, and other dehumidifier variants. The crystallizers may be any type, which may include Swenson-Walker crystallizers, evaporative crystallizers, batch crystallizers, forced circulation crystallizers, mixed-suspension mixed-product removal (MSMPR) crystallizers, continuous crystallizers, and other crystallizer variants. The separators may be any type, which may include centrifugal separators, decanters, gravity settlers, flotation cells, filtration systems, magnetic separators, cyclonic separators, electrostatic separators, and other separator variants. The blowers may be any type, which may include centrifugal blowers, roots blowers, axial flow fans, screw blowers, high-speed turbo blowers, regenerative blowers, crossflow fans, and other blower variants. The water pumps may be any type, which may include centrifugal pumps, diaphragm pumps, submersible pumps, positive displacement pumps, mixed flow pumps, axial flow pumps, jet pumps, and other pump variants.

An advantage of the proposed single-stage and multi-stage humidification dehumidification (HDH) desalination system and crystallization system (HDH-Cz) is the reduction of the environmental hazard through reduced or zero discharge of desalination brine to disposal sites. The proposed HDH-Cz system and process can provide salt crystals and desalinated water. Another advantage of the proposed single-stage and multi-stage HDH desalination system and crystallization system (HDH-Cz) is for brine pre-concentrations. The single-stage and multi-stage HDH desalination system in the current HDH-Cz system and process may derive its energy source from waste heat and renewable energy sources. The proposed single-stage and multi-stage HDH desalination system integration with the crystallization system includes an HDH heater, humidifier, dehumidifier, humidifier packed-bed materials, dehumidifier heat exchangers, additional humidifier, additional heat exchanger, evaporation chamber, external condenser, separator, crystallizer external heater, storage brine tank, permeate tank, air blower, and water pumps.

The present disclosure can have applications in various industries, including the desalination industry, textile industry, chemical industry, pharmaceutical industry, and wastewater treatment industry. Other potential industries include the milk processing industry, fruit juice concentration, and dye removal, concentration of oil-in-water emulsions, non-volatile acids, and cooling liquids (glycols), biomedical applications such as the removal of pure water from blood and protein solutions, separation of azeotropic aqueous mixes such as the separation of alcohol and water mixtures, and applications where high-temperature processing causes thermal degradation of the process flow.

Figure 40:
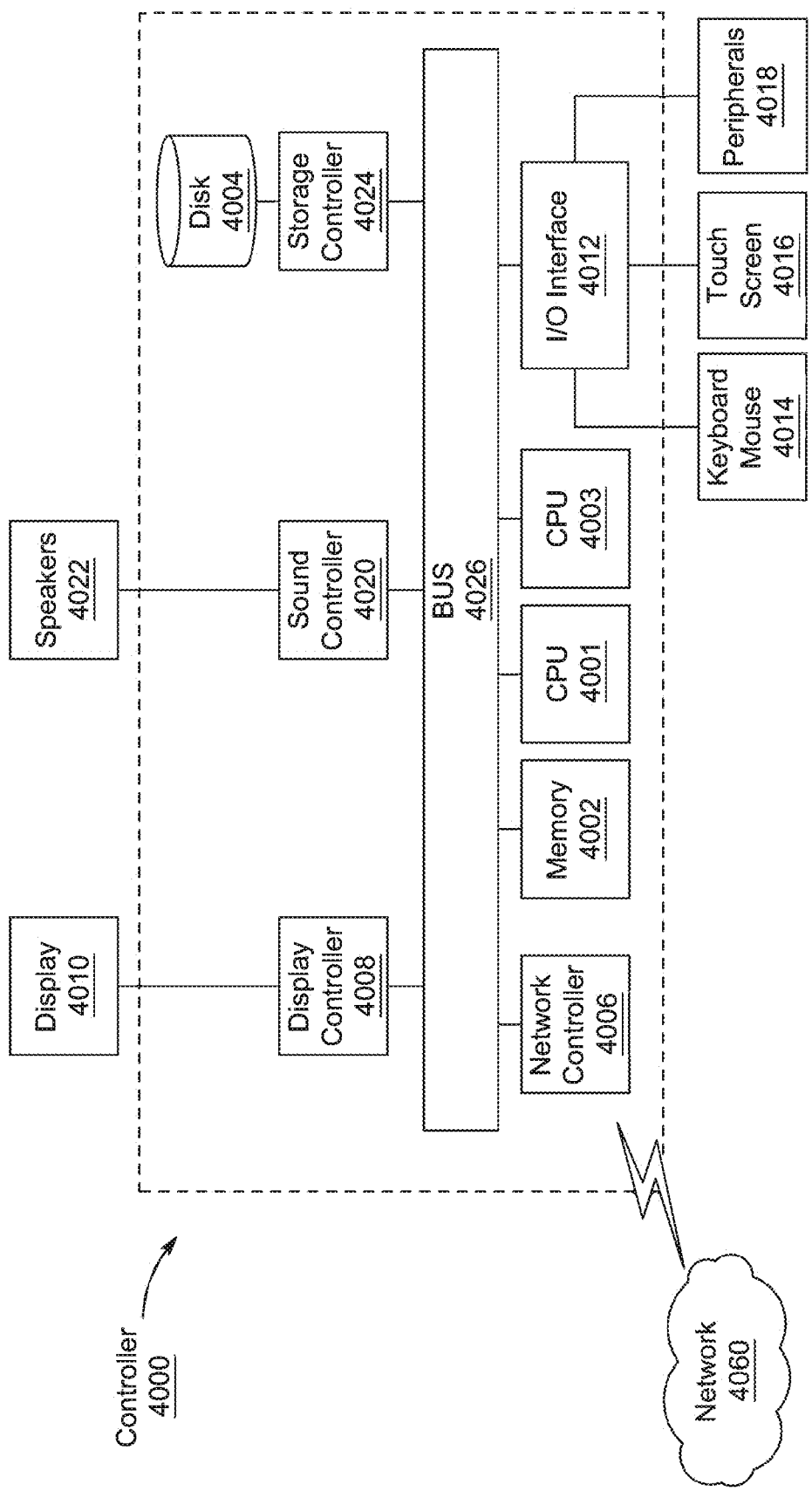
FIG. 40 is an illustration of a non-limiting example of details of computing hardware used in the computing system, according to certain embodiments.

Next, further details of the hardware description of the computing environment according to exemplary embodiments is described with reference to FIG. 40. In FIG. 40, a controller 4000 is described which may be utilized to control operations of various components of the system 100, 200 or 300 of the present disclosure, in which the controller is a computing device which includes a CPU 4001 which performs the processes described above/below. The process data and instructions may be stored in memory 4002. These processes and instructions may also be stored on a storage medium disk 4004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 4001, 4003 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 4001 or CPU 4003 may be a Xenon or Core processor from Intel of America or an Opteron processor from AMD of America, or may be other processor types that would be recognized by one of ordinary skill in the art. Alternatively, the CPU 4001, 4003 may be implemented on an FPGA, ASIC, PLD or using discrete logic circuits, as one of ordinary skill in the art would recognize. Further, CPU 4001, 4003 may be implemented as multiple processors cooperatively working in parallel to perform the instructions of the inventive processes described above.

The computing device in FIG. 40 also includes a network controller 4006, such as an Intel Ethernet PRO network interface card from Intel Corporation of America, for interfacing with network 4060. As can be appreciated, the network 4060 can be a public network, such as the Internet, or a private network such as an LAN or WAN network, or any combination thereof and can also include PSTN or ISDN sub-networks. The network 4060 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 4008, such as a NVIDIA GeForce GTX or Quadro graphics adaptor from NVIDIA Corporation of America for interfacing with display 4010, such as a Hewlett Packard HPL2445w LCD monitor. A general purpose I/O interface 4012 interfaces with a keyboard and/or mouse 4014 as well as a touch screen panel 4016 on or separate from display 4010. General purpose I/O interface also connects to a variety of peripherals 4018 including printers and scanners, such as an OfficeJet or DeskJet from Hewlett Packard.

A sound controller 4020 is also provided in the computing device such as Sound Blaster X-Fi Titanium from Creative, to interface with speakers/microphone 4022 thereby providing sounds and/or music.

The general-purpose storage controller 4024 connects the storage medium disk 4004 with communication bus 4026, which may be an ISA, EISA, VESA, PCI, or similar, for interconnecting all of the components of the computing device. A description of the general features and functionality of the display 4010, keyboard and/or mouse 4014, as well as the display controller 4008, storage controller 4024, network controller 4006, sound controller 4020, and general purpose I/O interface 4012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 41.

Figure 41:
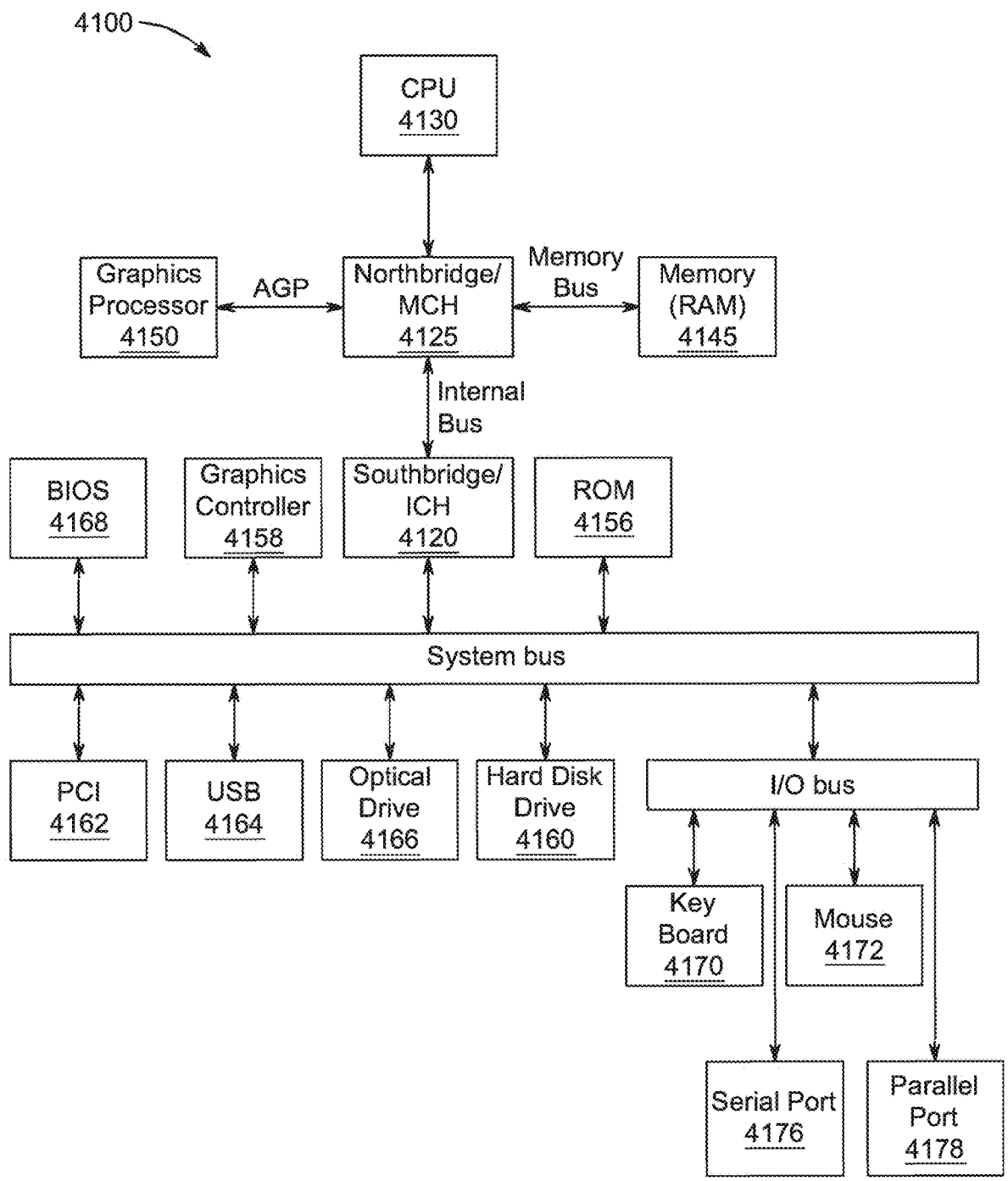
FIG. 41 is an exemplary schematic diagram of a data processing system used within the computing system, according to certain embodiments.

FIG. 41 shows a schematic diagram of a data processing system, according to certain embodiments, for performing the functions of the exemplary embodiments. The data processing system is an example of a computer in which code or instructions implementing the processes of the illustrative embodiments may be located.

In FIG. 41, data processing system 4100 employs a hub architecture including a north bridge and memory controller hub (NB/MCH) 4125 and a south bridge and input/output (I/O) controller hub (SB/ICH) 4120. The central processing unit (CPU) 4130 is connected to NB/MCH 4125. The NB/MCH 4125 also connects to the memory 4145 via a memory bus, and connects to the graphics processor 4150 via an accelerated graphics port (AGP). The NB/MCH 4125 also connects to the SB/ICH 4120 via an internal bus (e.g., a unified media interface or a direct media interface). The CPU Processing unit 4130 may contain one or more processors and even may be implemented using one or more heterogeneous processor systems.

Figure 42:
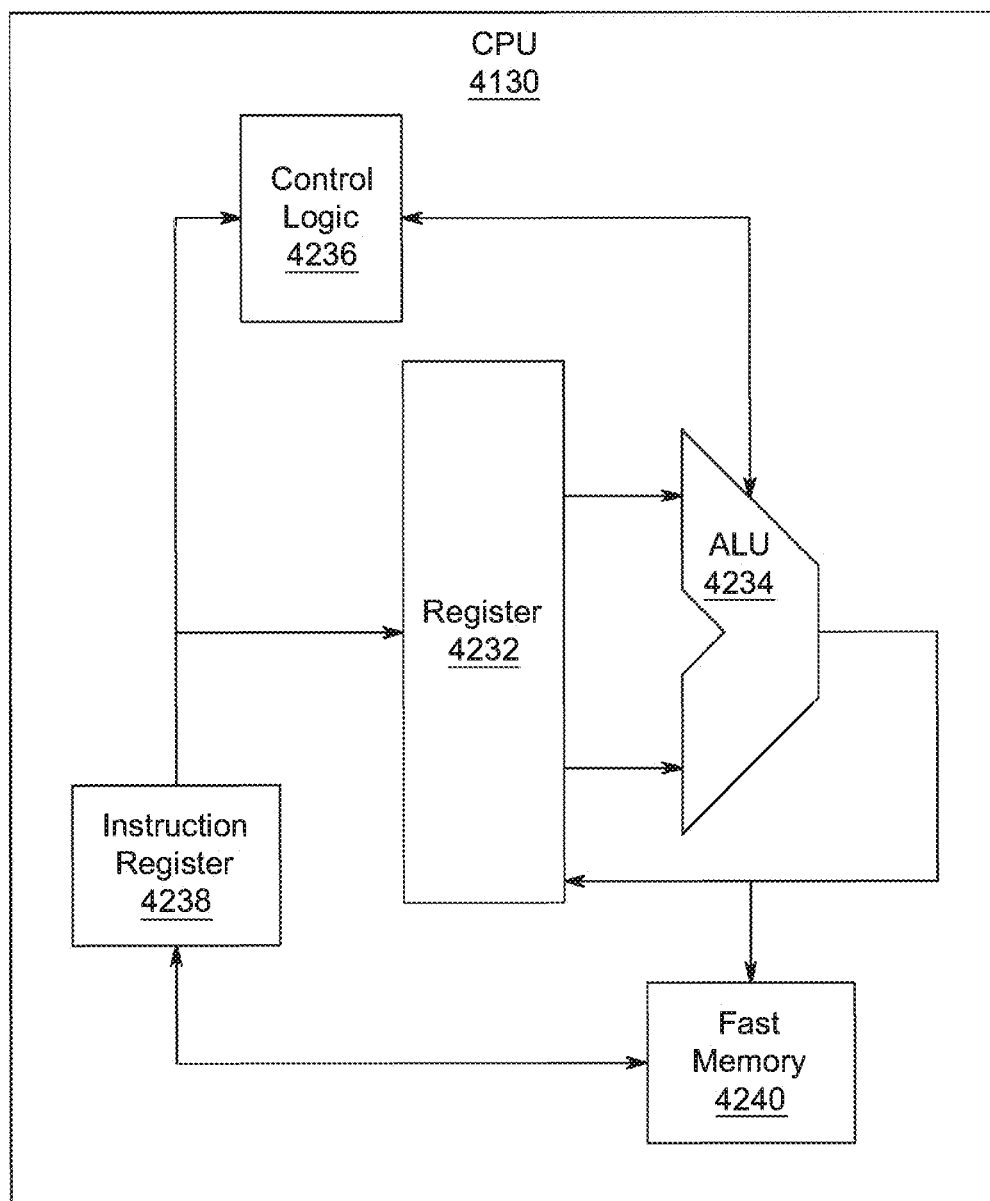
FIG. 42 is an exemplary schematic diagram of a processor used with the computing system, according to certain embodiments.

For example, FIG. 42 shows one implementation of CPU 4130. In one implementation, the instruction register 4238 retrieves instructions from the fast memory 4240. At least part of these instructions are fetched from the instruction register 4238 by the control logic 4236 and interpreted according to the instruction set architecture of the CPU 4130. Part of the instructions can also be directed to the register 4232. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 4234 that loads values from the register 4232 and performs logical and mathematical operations on the loaded values according to the instructions. The results from these operations can be feedback into the register and/or stored in the fast memory 4240. According to certain implementations, the instruction set architecture of the CPU 4130 can use a reduced instruction set architecture, a complex instruction set architecture, a vector processor architecture, a very large instruction word architecture. Furthermore, the CPU 4130 can be based on the Von Neuman model or the Harvard model. The CPU 4130 can be a digital signal processor, an FPGA, an ASIC, a PLA, a PLD, or a CPLD. Further, the CPU 4130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 41, the data processing system 4100 can include that the SB/ICH 4120 is coupled through a system bus to an I/O Bus, a read only memory (ROM) 4156, universal serial bus (USB) port 4164, a flash binary input/output system (BIOS) 4168, and a graphics controller 4158. PCI/PCIe devices can also be coupled to SB/ICH 4188 through a PCI bus 4162. The PCI devices may include, for example, Ethernet adapters, add-in cards, and PC cards for notebook computers. The Hard disk drive 4160 and CD-ROM 4166 can use, for example, an integrated drive electronics (IDE) or serial advanced technology attachment (SATA) interface. In one implementation the I/O bus can include a super I/O (SIO) device.

Further, the hard disk drive (HDD) 4160 and optical drive 4166 can also be coupled to the SB/ICH 4120 through a system bus. In one implementation, a keyboard 4170, a mouse 4172, a parallel port 4178, and a serial port 4176 can be connected to the system bus through the I/O bus. Other peripherals and devices that can be connected to the SB/ICH 4120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 43:
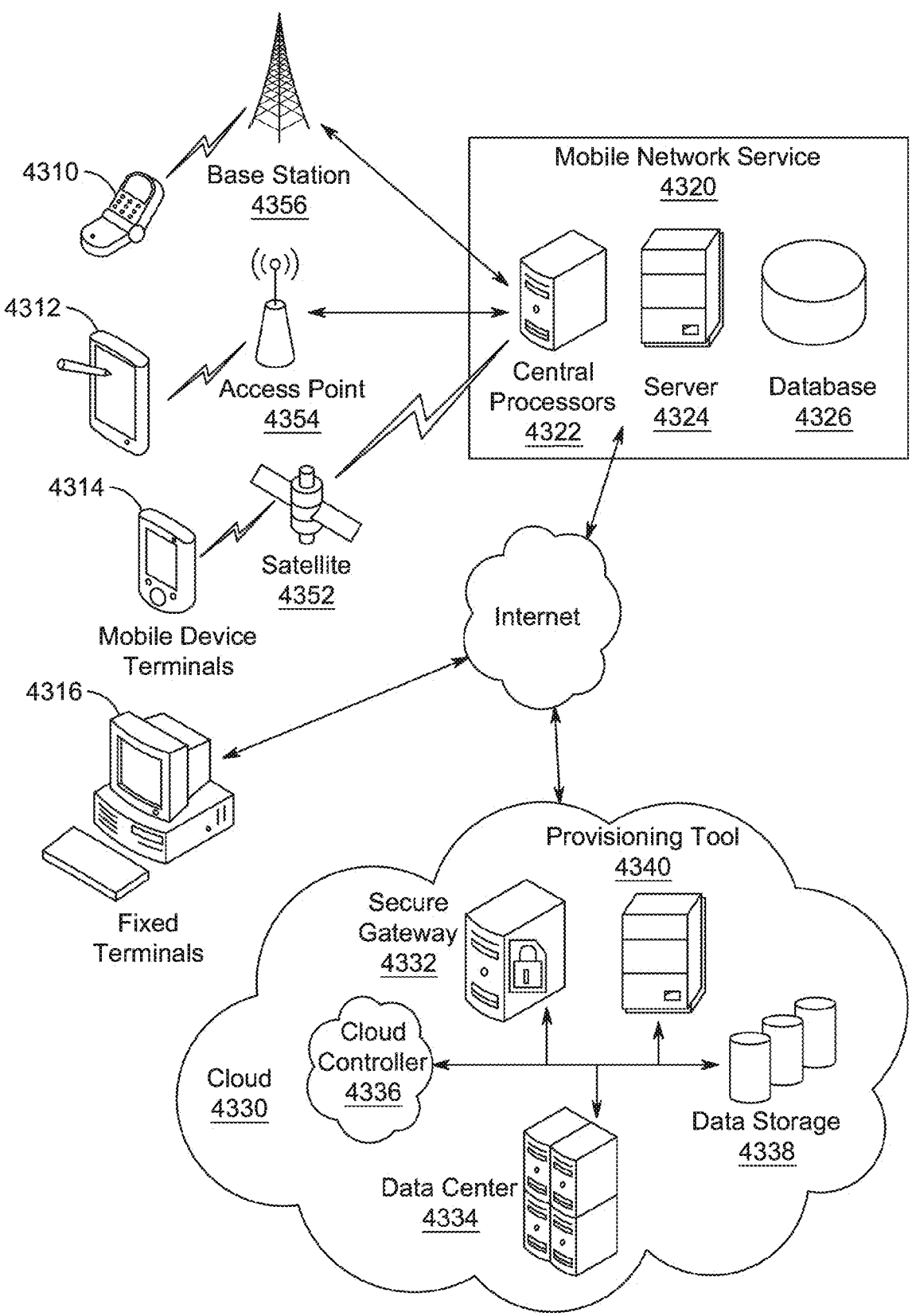
FIG. 43 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 4330 including a cloud controller 4336, a secure gateway 4332, a data center 4334, data storage 4338 and a provisioning tool 4340, and mobile network services 4320 including central processors 4322, a server 4324 and a database 4326, which may share processing, as shown by FIG. 43, in addition to various human interface and communication devices (e.g., display monitors 4304, smart phones 4310, tablets 4302, personal digital assistants (PDAs) 4314). The network may be a private network, such as a LAN, satellite 4352 or WAN 4354, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A zero liquid brine desalination and crystallization system, comprising:
   a humidification dehumidification (HDH) desalination system comprising a humidifier configured to humidify a carrier gas using saline water, and a dehumidifier configured to dehumidify the carrier gas to obtain desalinated water; and
   a crystallization system configured to receive the saline water from the HDH desalination system and comprising an evaporation chamber configured to produce salt crystals and water vapor from the saline water, and a condenser configured to condense the water vapor, wherein
   the HDH desalination system and the crystallization system are connected at the condenser for heat exchange between the water vapor and at least one selected from the group consisting of the saline water and the carrier gas.

2. The zero liquid brine desalination and crystallization system of claim 1, wherein:
   the evaporation chamber includes a top structure comprising a solar-absorbing material and a bottom structure comprising a parabolic reflector.

3. The zero liquid brine desalination and crystallization system of claim 1, wherein the condenser comprises a heat exchanger for heat exchange between the water vapor and the carrier gas exiting from the humidifier.

4. The zero liquid brine desalination and crystallization system of claim 1, wherein the condenser comprises a heat exchanger for heat exchange between the water vapor and the saline water exiting from the dehumidifier.

5. The zero liquid brine desalination and crystallization system of claim 1, wherein the HDH desalination system comprises a U-shaped structure wherein the U-shaped structure includes the humidifier, a first connection portion and the dehumidifier serially connected.

6. The zero liquid brine desalination and crystallization system of claim 5, wherein the HDH desalination system further comprises a second connection portion between the humidifier and the dehumidifier so that the humidifier, the first connection portion, the dehumidifier and the second connection portion are configured to define a closed path cycle for the carrier gas.

7. The zero liquid brine desalination and crystallization system of claim 1, wherein:
the crystallization system further comprises a separator configured to separate the salt crystals from the saline water.

8. The zero liquid brine desalination and crystallization system of claim 1, wherein:
the HDH desalination system further comprises a fan, wherein the dehumidifier, the fan and the humidifier are configured to define a closed path cycle for the carrier gas.

9. The zero liquid brine desalination and crystallization system of claim 1, wherein:
the humidifier comprises a spray tower humidifier, a bubble column humidifier, a wetted-wall tower humidifier or a packed bed tower humidifier.

10. The zero liquid brine desalination and crystallization system of claim 1, wherein the dehumidifier comprises a bubble column dehumidifier including:
a sparger configured to receive and sparge a humidified carrier gas into a column of desalinated water above the sparger; and
a tube going in and out of the bubble column dehumidifier and including a coil portion that is configured to be in contact with the column of desalinated water, while in operation, for heat exchange between the saline water in the tube and the column of desalinated water.

11. The zero liquid brine desalination and crystallization system of claim 1, wherein:
the humidifier comprises a multi-stage humidifier, and the dehumidifier comprises a multi-stage dehumidifier.

12. The zero liquid brine desalination and crystallization system of claim 1, wherein:
the zero liquid brine desalination and crystallization system comprises a plurality of the HDH desalination systems connected in series, and
the plurality of the HDH desalination systems and the crystallization system are connected at the condenser for heat exchange so that the condenser is configured to provide heat for the plurality of the HDH desalination systems.

13. The zero liquid brine desalination and crystallization system of claim 1, wherein:
the HDH desalination system further comprises a heater to heat the saline water, the carrier gas or both.

14. The zero liquid brine desalination and crystallization system of claim 1, wherein:
the dehumidifier and the condenser are one common dehumidifying condenser that is configured to dehumidify the carrier gas and condense the water vapor.

15. The zero liquid brine desalination and crystallization system of claim 14, further comprising:
a mixing chamber configured to receive the carrier gas from the humidifier and the water vapor from the evaporation chamber to form a gas mixture and discharge the gas mixture to the common dehumidifying condenser.

16. The zero liquid brine desalination and crystallization system of claim 15, wherein the common dehumidifying condenser comprises a bubble column dehumidifier including:
a sparger configured to receive and sparge the gas mixture into a column of desalinated water above the sparger; and
a tube going in and out of the bubble column dehumidifier and including a coil portion that is configured to be in contact with the column of desalinated water, while in operation, for heat exchange between the saline water in the tube and the column of desalinated water.

17. The zero liquid brine desalination and crystallization system of claim 14, wherein:
the evaporation chamber includes a top structure comprising a solar-absorbing material and a bottom structure comprising a parabolic reflector.

18. The zero liquid brine desalination and crystallization system of claim 14, wherein:
the crystallization system further comprises a separator configured to separate the salt crystals from the saline water.

19. The zero liquid brine desalination and crystallization system of claim 14, wherein:
the HDH desalination system further comprises a fan, wherein the common dehumidifying condenser, the fan and the humidifier are configured to define a closed path cycle for the carrier gas.

20. The zero liquid brine desalination and crystallization system of claim 14, wherein:
the humidifier comprises a spray tower humidifier, a bubble column humidifier, a wetted-wall tower humidifier or a packed bed tower humidifier.

\* \* \* \* \*